United States Patent
Ji et al.

(10) Patent No.: US 12,452,008 B2
(45) Date of Patent: Oct. 21, 2025

(54) METHOD AND APPARATUS TRANSMITTING SIGNAL FOR HIGH SPEED MOBILE TERMINAL IN WIRELESS COMMUNICATION SYSTEM

(71) Applicant: Samsung Electronics Co., Ltd., Suwon-si (KR)

(72) Inventors: Hyoungju Ji, Suwon-si (KR); Jinhyun Park, Suwon-si (KR); Hoondong Noh, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 17/917,406

(22) PCT Filed: May 14, 2021

(86) PCT No.: PCT/KR2021/006071
§ 371 (c)(1),
(2) Date: Oct. 6, 2022

(87) PCT Pub. No.: WO2021/230706
PCT Pub. Date: Nov. 18, 2021

(65) Prior Publication Data
US 2023/0344569 A1 Oct. 26, 2023

(30) Foreign Application Priority Data

May 15, 2020 (KR) .......... 10-2020-0058537
Mar. 23, 2021 (KR) .......... 10-2021-0037401

(51) Int. Cl.
*H04L 5/00* (2006.01)
(52) U.S. Cl.
CPC .......... *H04L 5/0035* (2013.01); *H04L 5/0048* (2013.01)

(58) Field of Classification Search
CPC ... H04L 5/0035; H04L 5/0048; H04L 5/0053; H04L 5/0094; H04L 5/0096
See application file for complete search history.

(56) References Cited

U.S. PATENT DOCUMENTS

| | | |
|---|---|---|
| 2019/0222302 A1 | 7/2019 | Lin et al. |
| 2019/0238216 A1 | 8/2019 | Avellan et al. |
| (Continued) | | |

FOREIGN PATENT DOCUMENTS

| | | |
|---|---|---|
| CN | 110545136 A | 12/2019 |
| KR | 10-2021-0121579 | 10/2021 |
| WO | 2020/089471 A1 | 5/2020 |

OTHER PUBLICATIONS

Nokia et al., Doppler Compensation, Uplink Timing Advance and Random Access in NTN, R1-1913017, 3GPP TSG RAN WG1 #99, Reno, USA, Nov. 9, 2019.

*Primary Examiner* — Michael Thier
*Assistant Examiner* — Prince A Mensah
(74) *Attorney, Agent, or Firm* — Jefferson IP Law, LLP

(57) ABSTRACT

The present disclosure relates to a communication technique merging IoT technology with a 5G communication system for supporting a data transmission rate higher than that of a 4G system; and a system therefor. The present disclosure can be applied to intelligent services (for example, smart homes, smart buildings, smart cities, smart cars or connected cars, healthcare, digital education, retail, security- and safety-related services, and the like) on the basis of 5G communication technology and IoT-related technology. The present disclosure presents a method and device transmitting/receiving a reference signal for efficiently using resources in a wireless communication system.

12 Claims, 23 Drawing Sheets

(56) References Cited

U.S. PATENT DOCUMENTS

2019/0335474 A1\* 10/2019 Tang .................... H04B 7/0695
2022/0393809 A1\* 12/2022 Gao ...................... H04W 72/21
2023/0107563 A1\* 4/2023 Huang ................. H04L 25/021
370/252

\* cited by examiner

METHOD AND APPARATUS TRANSMITTING SIGNAL FOR HIGH SPEED MOBILE TERMINAL IN WIRELESS COMMUNICATION SYSTEM

TECHNICAL FIELD

The disclosure relates to a method and an apparatus for transmitting or receiving a signal for a high-speed mobile terminal in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

DISCLOSURE OF INVENTION

Technical Problem

A technical problem to be solved by the disclosure is to provide a method and an apparatus for transmitting or receiving a reference signal for efficient uplink or downlink operation for various services in a mobile communication system.

Solution to Problem

A method performed by a base station in a wireless communication system according to an embodiment of the disclosure includes: transmitting, to a UE, multiple first reference signals through multiple transmission/reception points (TRPs); receiving, from the UE, second reference signals through the multiple TRPs; measuring a second frequency shift for each of the second reference signals received through the multiple TRPs; based on the second frequency shift for each of the multiple TRPs, determining a carrier frequency of each of multiple third reference signals to be transmitted through the multiple TRPs so that the multiple third reference signals are received at a single frequency by the UE; and transmitting, to the UE, the multiple third reference signals at each of the determined carrier frequencies through the multiple TRPs.

In the method according to an embodiment of the disclosure, the multiple first reference signals transmitted through the multiple TRPs are transmitted using different resources.

In addition, the method according to an embodiment of the disclosure may further include: receiving, from the UE, information on a first frequency shift for each of the multiple first reference signals; and determining a carrier frequency of each of the multiple third reference signals based on the first frequency shift for each of the multiple TRPs.

In addition, the method according to an embodiment of the disclosure may further include transmitting, to the UE, multiple signals having different carrier frequencies determined based on the second frequency shift through the multiple TRPs, wherein the multiple transmitted signals are received at a single frequency by the UE.

Here, the single frequency according to an embodiment of the disclosure may be determined based on a result of reception channel equalization, which is performed by the UE based on the first frequency shift and a third frequency shift for each of the multiple third reference signals.

A method performed by a UE in a wireless communication system according to another embodiment of the disclosure includes: receiving, from multiple transmission/reception points (TRPs), multiple first reference signals; measuring a first frequency shift for each of the multiple first reference signals; transmitting second reference signals to the multiple TRPs; and receiving multiple third reference signals from the multiple TRPs, wherein a carrier frequency of each of the multiple third reference signals is determined based on a second frequency shift for each of the second reference signals.

A base station in a wireless communication system according to another embodiment of the disclosure may include: a transceiver configured to transmit or receive a signal; and a controller which is connected to the transceiver, wherein the transceiver includes multiple transmission/reception points (TRPs), and wherein the controller is configured to transmit, to a UE, multiple first reference signals through multiple transmission/reception points (TRPs); receive, from the UE, second reference signals through the multiple TRPs; measure a second frequency shift for each of the second reference signals received through the multiple TRPs; based on the second frequency shift for each of the multiple TRPs, determine a carrier frequency of each of multiple third reference signals to be transmitted through the multiple TRPs so that the multiple third reference signals are received at a single frequency by the UE; and transmit, to the UE, the multiple third reference signals at each of the determined carrier frequencies through the multiple TRPs.

A UE in a wireless communication system according to another embodiment of the disclosure may include: a transceiver configured to transmit or receive a signal; and a controller which is connected to the transceiver, wherein the controller is configured to: receive multiple first reference signals from multiple transmission/reception points (TRPs); measure a first frequency shift for each of the multiple first reference signals; transmit second reference signals to the multiple TRPs; and receive multiple third reference signals from the multiple TRPs, wherein a carrier frequency of each of the multiple third reference signals is determined based on a second frequency shift with respect to each of the second reference signals.

Advantageous Effects of Invention

According to embodiments of the disclosure, a method and an apparatus for transmitting a reference signal and data for stable uplink or downlink transmission/reception of a high-speed mobile terminal in a mobile communication system are provided.

MODE FOR THE INVENTION

Figure 1:
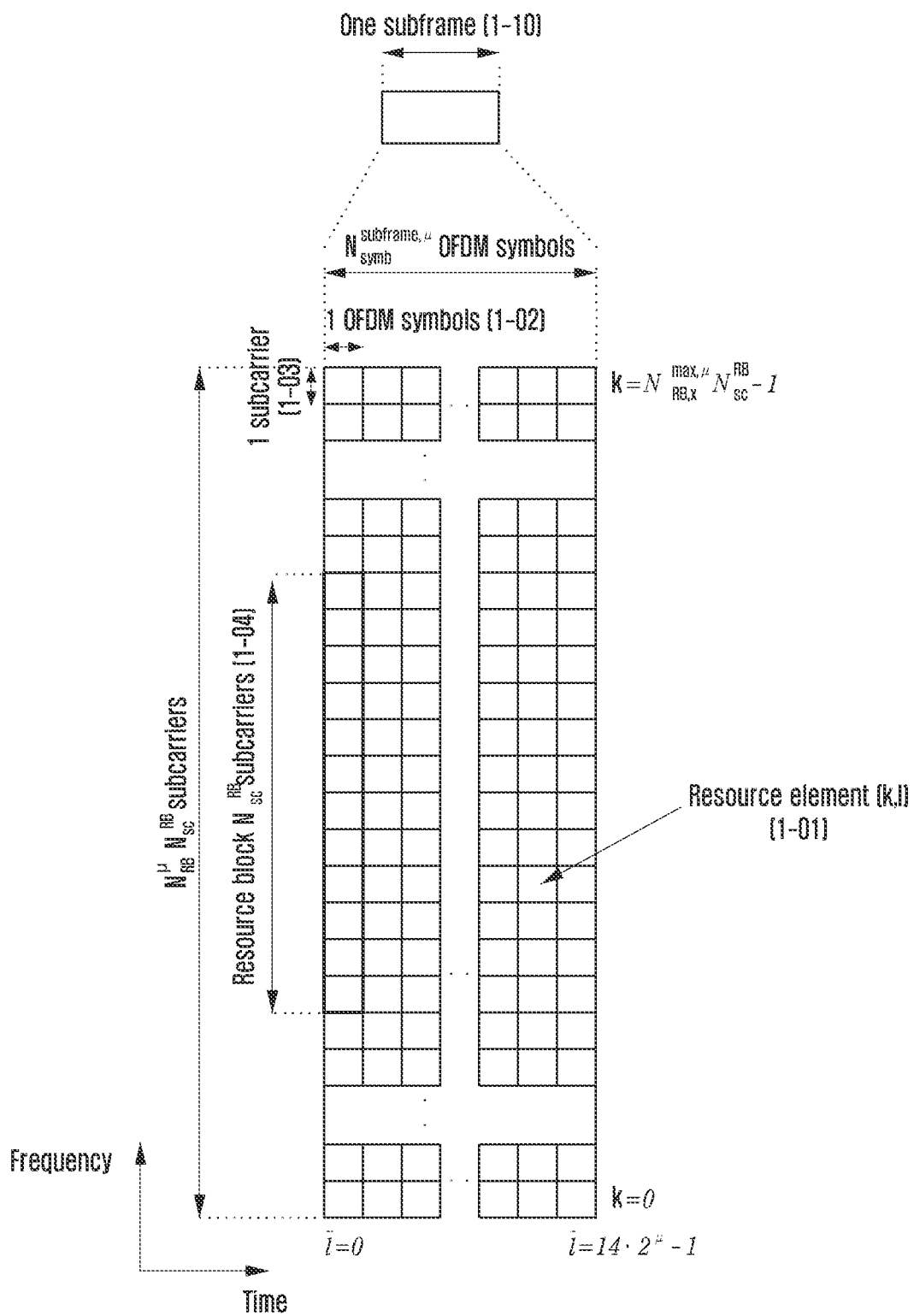
FIG. 1 illustrates a basic structure of a time-frequency domain, which is a radio resource domain of a 5G system according to an embodiment of the disclosure.

Hereinafter, embodiments of the disclosure will be described in detail with reference to the accompanying drawings.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, according to some embodiments, the "unit" may include one or more processors.

Hereinafter, the operation principle of the disclosure will be described in detail with reference to the accompanying drawings. In the following description of the technical idea of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. In the following description of the disclosure, technology for receiving broadcast information from a base station by a terminal in a wireless communication system will be described. The disclosure relates to a communication technique for converging Internet of things (IoT) technology with 5th generation (5G) communication systems designed to support a higher data transfer rate beyond 4th generation (4G) systems, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms referring to control information, terms related to communication coverage, terms referring to state changes (e.g., an event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project long term evolution ((3GPP LTE) standards may be used for the convenience of description. However, the disclosure is not limited by these terms and names, and may be applied in the same way to systems that conform other standards.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to some embodiments, eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also requires a design for assigning a large number of resources in a frequency band in order to secure reliability of a communication link. However, the above-described mMTC, URLLC, and eMBB are only examples of different types of services, and service types to which the disclosure is applicable are not limited to the above-described examples.

The above-described services considered in the 5G communication system must be converged with each other so as to be provided based on one framework. That is, the respective services are preferably integrated into a single system and controlled and transmitted in the integrated single system, instead of being operated independently, for efficient resource management and control.

Further, in the following description of embodiments of the disclosure, LTE, LTE-A, LTE Pro, or NR systems will be described by way of example, but the embodiments of the disclosure may be applied to other communication systems having similar technical backgrounds or channel types. In addition, based on determinations by those skilled in the art, the embodiments of the disclosure may be applied to other communication systems through some modifications without significantly departing from the scope of the disclosure.

Hereinafter, the frame structure of the 5G system will be described in more detail with reference to the drawings.

FIG. 1 illustrates a basic structure of a time-frequency domain, which is a radio resource domain in which data or a control information is transmitted in a wireless communication system according to an embodiment of the disclosure.

Referring to FIG. 1, the horizontal axis and the vertical axis of a time-frequency domain shown in FIG. 1 represent a time domain and a frequency domain, respectively. A basic unit of a resource in the time and frequency domain is a resource element (RE) 1-01 and may be defined as one orthogonal frequency division multiplexing (OFDM) symbol 1-02 on the time domain and one subcarrier 1-03 on the frequency domain. As an example, in the frequency domain, 12 consecutive REs ($N_{sc}^{RB}$ may configure one resource block (RB) 1-04. In an embodiment, one subframe 1-10 may be configured by multiple OFDM symbols.

Figure 2:
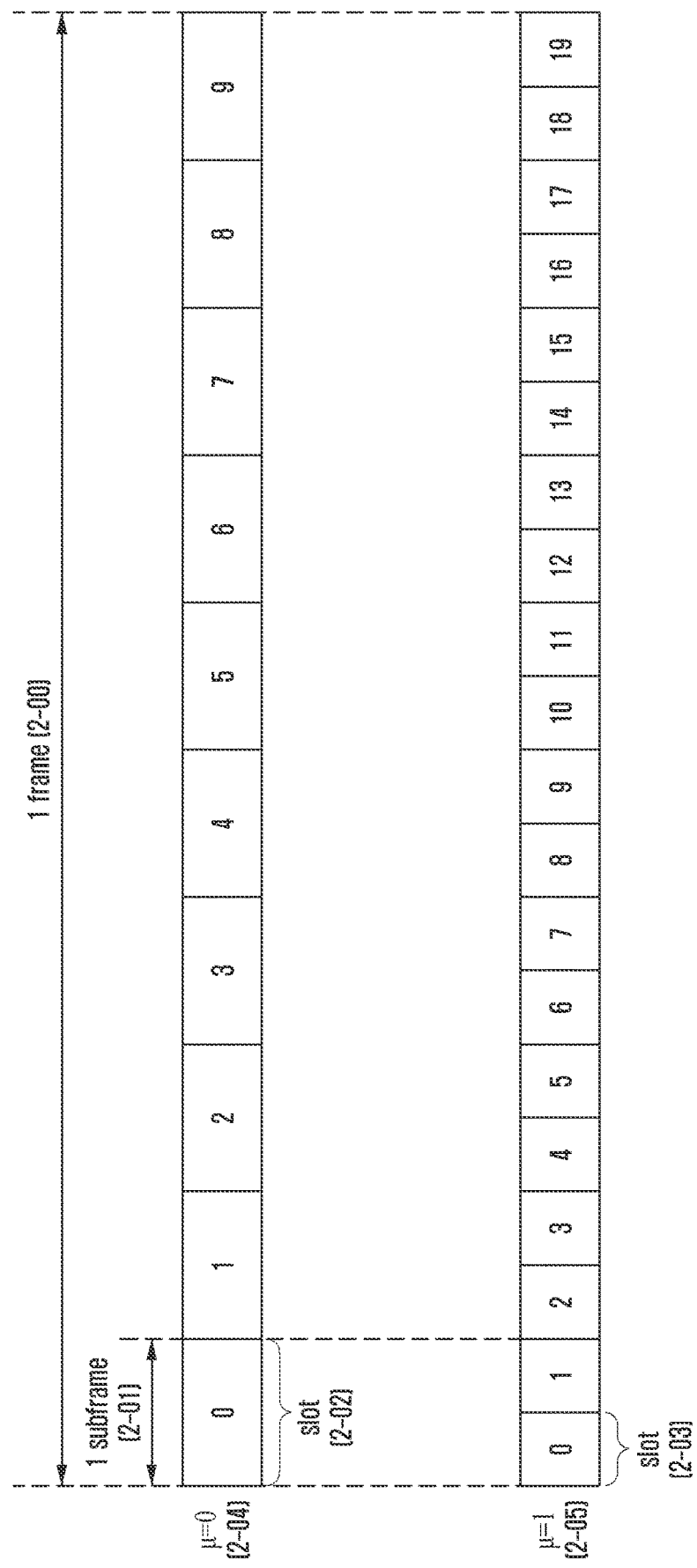
FIG. 2 illustrates the structure of a slot considered in a 5G system according to an embodiment of the disclosure.

FIG. 2 illustrates an example of the structure of a slot used in a wireless communication system according to an embodiment of the disclosure.

Referring to FIG. 2, one frame 2-00 may include one or more subframes 2-01, and one subframe may include one or more slots 2-02. As an example, one frame 2-00 may be defined as 10 ms. One subframe 2-01 may be defined as 1 ms, and here one frame 2-00 may be configured by a total of 10 subframes 2-01. One slot 2-02 or 2-03 may be defined as 14 OFDM symbols. That is, the number of symbols per slot ($N_{symb}^{slot}$) may has a value of 14. One subframe 2-01 may be configured by one or more slots 2-02 and 2-03, and the number of slots 2-02 and 2-03 per one subframe 2-01 may differ according to configuration value (μ) 2-04 or 2-05 for a subcarrier spacing. In the example of FIG. 2, a case in which the subcarrier spacing configuration value (μ) has a value of '0' (indicated by reference numeral 2-04) and a case in which the subcarrier spacing configuration value (μ) has a value of '1' (indicated by reference numeral 2-05) are illustrated. In a case of μ=0 (indicated by reference numeral 2-04), one subframe 2-01 may include one slot 2-02, and in a case of μ=1 (indicated by reference numeral 2-05), one subframe 2-01 may include two slots 2-03. That is, the number of slots per one subframe ($N_{slot}^{subframe,\mu}$) may differ according to a subcarrier spacing configuration value (μ), and accordingly, the number of slots per one frame ($N_{slot}^{frame,\mu}$) may differ. The number of slots per subframe ($N_{slot}^{subframe,\mu}$) and the number of slots per frame ($N_{slot}^{frame,\mu}$) according to each subcarrier spacing configuration (μ) may be defined as Table 1 below.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, a synchronization signal block (SSB, SS block, SS/PBCH block, etc. may be interchangeably used therewith) may be transmitted for initial access, and the synchronization signal block may be configured by a primary synchronization signal (PSS), a secondary synchronization signal (SSS), and a physical broadcast channel (PBCH). More specifically, the synchronization signal block may be defined as follows.

PSS: may serve as a signal for a reference for downlink time/frequency synchronization and provide some information of a cell ID.

SSS: may serve as a reference for downlink time/frequency synchronization, and provide the remaining cell ID information that is not provided by the PSS. In addition, the SSS may serve as a reference signal for demodulation of the PBCH.

PBCH: may provide essential system information required for transmission or reception of a data channel and a control channel of a UE. The essential system information may include search space related control information indicating radio resource mapping information of a control channel, scheduling control information for a separate data channel for transmission of system information, and the like.

SS/PBCH block: the SS/PBCH block may include a combination of a PSS, an SSS, and a PBCH. One or multiple SS/PBCH blocks may be transmitted within 5 ms, and each of the transmitted SS/PBCH blocks may be distinguished by indices.

In an initial access stage in which a UE accesses a system for the first time, the UE may first acquire downlink time and frequency domain synchronization from a synchronization signal through cell search, and acquire cell ID. The synchronization signal may include PSS and SSS. The synchronization signal is a reference signal for cell search, and may be transmitted by applying a subcarrier spacing suitable for a channel environment such as phase noise for each frequency band. The 5G base station may transmit multiple synchronization signal blocks according to the number of analog beams to be operated. The PSS and SSS may be mapped over 12 RBs and transmitted, and the PBCH may be mapped over 24 RBs and transmitted.

Next, a UE may receive a PBCH for transmission of a master information block (MIB) from a base station to obtain system information related to transmission and reception, such as a system bandwidth, and basic parameter values. The system information includes configuration information for control region #0. The UE may monitor the control region #0 under an assumption that the selected SS/PBCH block and demodulation reference signal DMRS transmitted in the control region #0 are quasi co-located (QCL). The UE acquires scheduling information for a physical downlink shared channel (PDSCH) containing a system information block (SIB) through downlink control information transmitted from the control region #0, that is, a physical downlink control channel (PDCCH). The UE may acquire configuration information related to a random access channel (RACH) required for initial access from the system information block. The UE may transmit a physical RACH (PRACH) to the base station by considering the index of the selected SS/PBCH, and the base station having received the PRACH may acquire information on the SS/PBCH block index selected by the UE. The base station may be aware that, based on the acquired information on the SS/PBCH block index, a block selected by the UE from among the SS/PBCH blocks, and that the UE monitors the control region #0 corresponding to the selected SS/PBCH block. Thereafter, the UE may be subjected to an operation such as registration and authentication with the base station, and may then initially access a network.

Next, the configuration of bandwidth part (BWP) in a 5G communication system will be described in detail with reference to the drawings.

In NR system, one component carrier (CC) or serving cell may include up to 250 RBs or more. Therefore, when a UE always receives the entire serving cell bandwidth, such as in the LTE system, power consumption of the UE may be extreme. In order to solve this problem, it is possible for a base station to configure one or more bandwidth parts (BWPs) for the UE so as to support the UE to change a reception area within a cell. In the NR system, the base station may configure an "initial BWP", which is a bandwidth of control region #0, that is, control resource set (CORESET) #0 or common search space (CSS), for the UE via a master information block (MIB). Thereafter, the base station may configure a first BWP of the UE via RRC signaling, and may notify the UE of one BWP configuration information that can be indicated through downlink control information (DCI) in the future. Thereafter, the base station may notify the UE of a BWP ID via DCI so as to indicate which band the UE is to use. In case that the UE fails to receive DCI in a currently allocated BWP for a specific period of time or more, the UE may return to a "default BWP" and attempt to receive DCI.

Figure 3:
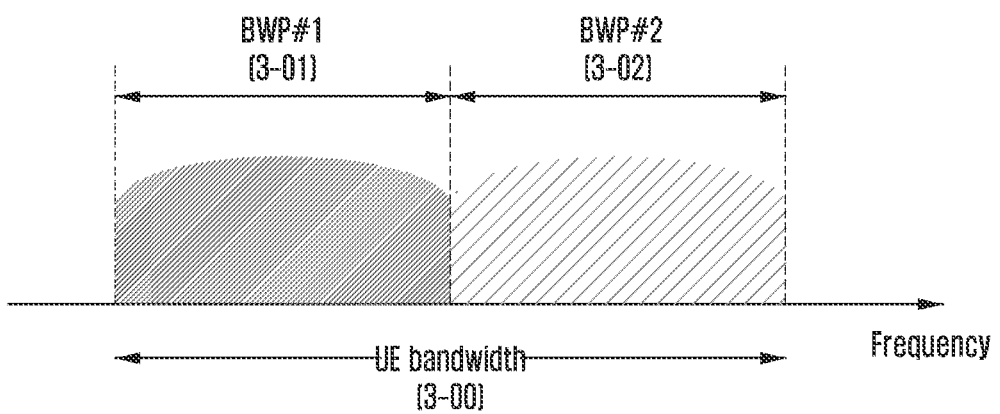
FIG. 3 illustrates an example of configuration a bandwidth part in a 5G communication system according to an embodiment of the disclosure.

FIG. 3 illustrates an example of configuration about a bandwidth part (BWP) in a wireless communication system according to an embodiment of the disclosure.

Referring to FIG. 3, an example, in which a UE bandwidth 3-00 is configured by two BWPs, that is, BWP #1 3-05 and BWP #2 3-10, is shown in FIG. 3. The base station may configure one or more BWPs for the UE, and may configure pieces of information as shown in Table 2 below for each bandwidth part.

TABLE 2

| | |
|---|---|
| BWP ::= | SEQUENCE { |
| bwp-Id | BWP-Id, |
| (Bandwidth part identity) | |
| locationAndBandwidth | INTEGER (1..65536), |
| Bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (Cyclic prefix) | |
| } | |

Embodiments of the disclosure are not limited to the above example, and in addition to the configuration information, various parameters related to a BWP may be configured for the UE. The information described above may be transmitted by the base station to the UE via higher layer signaling (e.g., RRC signaling). At least one BWP among the configured one or more BWPs may be activated. Information indicating whether the configured BWP has been activated may be semi-statically transmitted from the base station to the UE via RRC signaling or may be dynamically transmitted through medium access control (MAC) control element (CE) or DCI. According to some embodiments, a UE before radio resource control (RRC) connection may be configured with an initial BWP for initial access from a base station through a master information block (MIB). More specifically, the UE may receive configuration information about a search apace and a control resource set (CORESET) in order to receive system information required for initial access through MIB in the initial access stage. For example, the system information may correspond to remaining system information (RMSI) or system information block 1 (SIB 1). The control resource set (CORESET) and search space, which are configured through the MIB, may be regarded as identity (ID) 0, respectively. The base station may notify the UE of configuration information, such as frequency allocation information, time allocation information, and numerology for the control resource set #0 through the MIB. In addition, the base station may notify the UE of configuration information regarding the monitoring periodicity and occasion for the control resource set #0, that is, configuration information regarding the search space #0, through the MIB. The UE may regard the frequency domain configured as the control resource set #0, obtained from the MIB, as an initial BWP for initial access. Here, the identifier (ID) of the initial BWP may be regarded as zero.

The configuration of the BWP supported by the above-described next-generation mobile communication system (5G or NR system) may be used for various purposes.

As an example, in case that a bandwidth supported by the UE is less than a system bandwidth, the configuration about the BWP may be used. For example, a frequency location (configuration information 2) of the BWP is configured for the UE to enable the UE to transmit or receive data at a specific frequency location within the system bandwidth.

As another example, the base station may configure multiple BWPs in the UE for the purpose of supporting different numerologies. For example, in order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed (FDMed), and when attempting to transmit or receive data at a specific subcarrier spacing, the BWP configured with the corresponding subcarrier spacing may be activated.

As still another example, the base station may configure, in the UE, the BWPs having bandwidths of different sizes for the purpose of reducing power consumption of the UE. For example, when the UE supports a very large bandwidth, for example, a bandwidth of 100 MHz, and always transmits or receives data at the corresponding bandwidth, the transmission or reception may cause very high power consumption in the UE. In particular, when the UE performs monitoring on an unnecessary downlink control channels of an unnecessarily large bandwidth of 100 MHz even when there is no traffic, the monitoring may be very inefficient in terms of power consumption. Therefore, in order to reduce power consumption of the UE, the base station may configure, for the UE, a BWP of a relatively small bandwidth, for example, a BWP of 20 MHz. In a situation without traffic, the UE may perform a monitoring operation on a BWP of 20 MHz. When data has occurred, the UE may transmit or receive data in a BWP of 100 MHz according to an indication of the base station.

In a method for configuring the BWP, the UEs before the RRC connection may receive configuration information about the initial bandwidth part through the master information block (MIB) in the initial connection operation. More specifically, the UE may be configured with a control region or control resource set (CORESET) for a downlink control channel through which downlink control information (DCI) for scheduling a system information block (SIB) can be transmitted from a MIB of a physical broadcast channel (PBCH). The bandwidth of the control resource set configured through the MIB may be regarded as the initial BWP. The UE may receive, through the configured initial BWP, a physical downlink shared channel (PDSCH) through which the SIB is transmitted. The initial BWP may be used for other system information (OSI), paging, and random access as well as the reception of the SIB.

When one or more BWPs have been configured for a UE, the base station may indicate the UE to switch the BWP by using a bandwidth part indicator field in DCI. As an example, in FIG. 3, when the currently activated BWP of the UE is BWP #1 3-05, the base station may indicate BWP #2 3-10 to the UE by using the BWP indicator in DCI, and the UE may perform a BWP switch to the BWP #2 3-10 indicated by the BWP indicator in the received DCI.

As described above, since the DCI-based BWP switch may be indicated by DCI scheduling the PDSCH or physical uplink shared channel (PUSCH), when receiving a request to switch the BWP, the UE should smoothly receive or transmit the PDSCH or PUSCH, which is scheduled by the DCI, without difficulty in the switched BWP. To this end, the standard stipulates the requirements for a delay time ($T_{BWP}$) required when switching the BWP, and may be defined, for example, as shown in Table 3 below.

TABLE 3

| | | BWP switch delay $T_{BWP}$ (slots) | |
|---|---|---|---|
| μ | NR Slot length (ms) | Type 1(Note 1) | Type 2(Note 1) |
| 0 | 1 | 1 | 3 |
| 1 | 0.5 | 2 | 5 |
| 2 | 0.25 | 3 | 9 |
| 3 | 0.125 | 6 | 17 |

(Note 1): Depends on UE capability.
(Note 2): If the BWP switch involves changing of SCS, the BWP switch delay is determined by the larger one between the SCS before BWP switch and the SCS after BWP switch.

Figure 4:
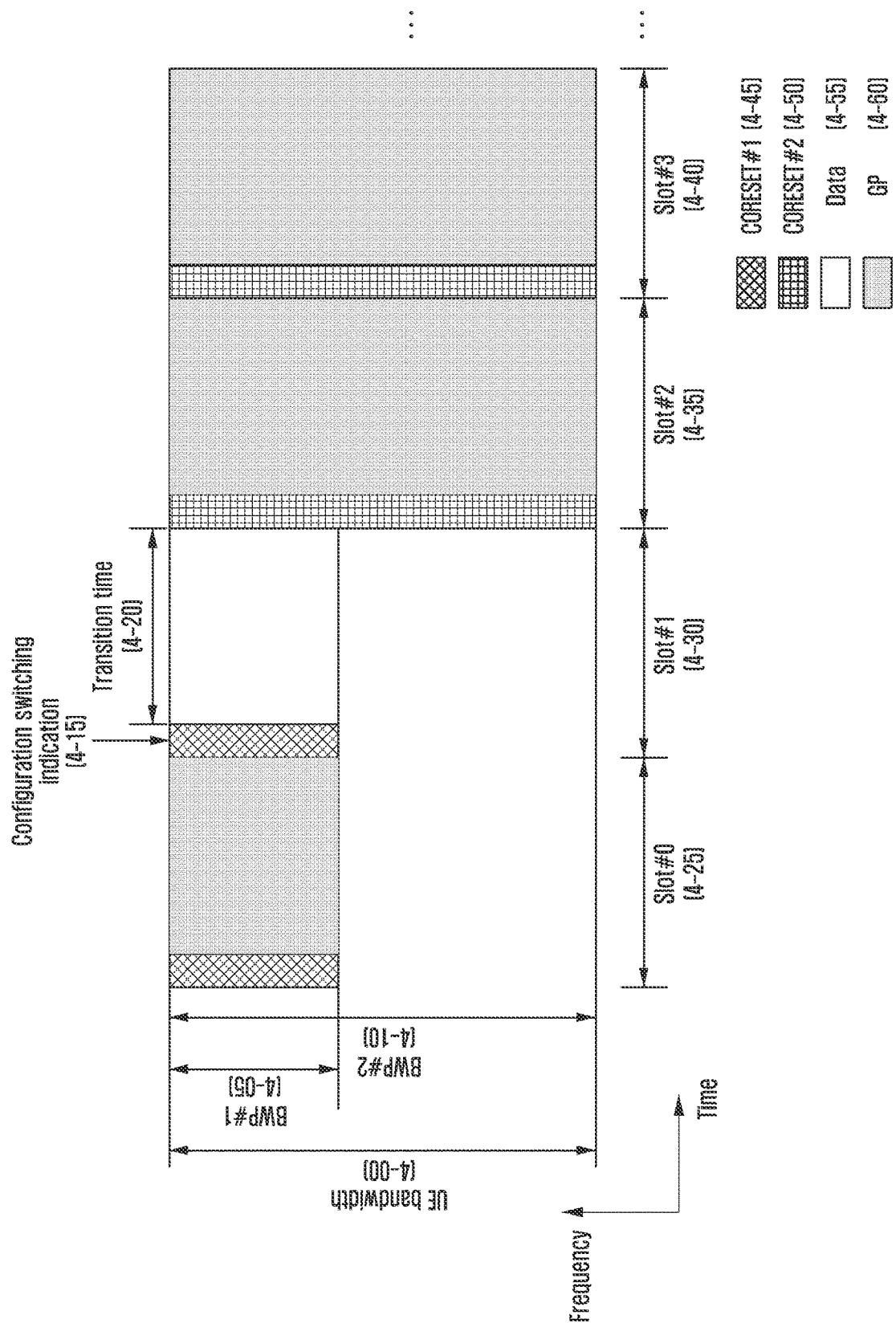
FIG. 4 illustrates an example of a bandwidth part switching procedure in a 5G communication system according to an embodiment of the disclosure.

The requirements for the BWP switching delay time support type 1 or type 2 depending on UE capability. The UE may report a supportable BWP delay time type to the base station. FIG. 4 illustrates an example of a bandwidth switching method according to an embodiment of the disclosure. Referring to FIG. 4, according to the requirements for the BWP switching delay time described above, when a UE receives DCI including a BWP switching indicator in slot n (indicated by reference numeral 4-15), the UE may complete switching to a new bandwidth part indicated by the BWP switch indication at a time point not later than slot (n+$T_{BWP}$), and may perform transmission/reception for a data channel scheduled by the corresponding DCI in the switched new bandwidth part 4-10. When a data channel is to be scheduled in the new bandwidth part, the base station may determine time domain resource allocation for the data channel by considering the BWP switching delay time ($T_{BWP}$) 4-20 of the UE. That is, when a data channel is scheduled in a new bandwidth part, the base station may schedule the corresponding data channel after the BWP switching delay time (indicated by reference numerals 4-35 and 4-40) with regard to a method for determining the time domain resource allocation for the data channel. Accordingly, the UE may expect that the DCI indicating the BWP switch does not indicate a slot offset (K0 or K2) value smaller than the BWP switching delay time ($T_{BWP}$) 4-20.

In case that the UE has received DCI (e.g., DCI format 1_1 or 0_1) indicating a BWP switch, the UE may not perform any transmission or reception during a time period from the third symbol of a slot, in which a PDCCH including the DCI is received, to the start point of a slot, which is indicated by the slot offset (K0 or K2) value indicated by a time domain resource allocation indicator field in the corresponding DCI. For example, in case that the UE has received a DCI indicating a BWP switch in slot n, and the slot offset value indicated by the DCI is K, the UE may not perform any transmission or reception from the third symbol of slot n to the symbol before slot (n+K) (that is, the last symbol of slot (n+K−1)).

Next, a method for configuring transmission/reception related parameters for each bandwidth part in the 5G system will be described.

A UE may receive one or multiple bandwidth parts configured from a base station, and may additionally receive parameters to be used for transmission/reception (e.g., uplink/downlink data channel and control channel related configuration information, etc.) configured for each bandwidth part. For example, in FIG. 3, when the UE receives the configuration of BWP #1 3-05 and BWP #2 3-10, the UE may receive transmission/reception parameter #1 configured for the BWP #1 3-05, and may receive transmission/reception parameter #2 configured for the BWP #2 3-10. When the BWP #1 3-05 is activated, the UE may perform transmission/reception to/from the base station based on the transmission/reception parameter #1, and when the BWP #2 3-10 is activated, the UE may perform transmission/reception to/from the base station based on transmission/reception parameter #2.

More specifically, the following parameters may be configured from the base station to the UE.

First, with respect to the uplink bandwidth part, the following pieces of information may be configured.

TABLE 4

```
BWP-Uplink ::= SEQUENCE {
bwp-Id    BWP-Id,
(bandwidth part identity)
bwp-Common      BWP-UplinkCommon OPTIONAL, -- Cond SetupOtherBWP
(cell-specific or common parameter)
bwp-Dedicated    BWP-UplinkDedicated OPTIONAL, -- Cond SetupOtherBWP
(UE-specific parameter)
...
}
BWP-UplinkCommon ::= SEQUENCE {
genericParameters    BWP,
(general parameter)
rach-ConfigCommon    SetupRelease { RACH-ConfigCommon } OPTIONAL, --
Need M
(random access-related common parameter)
pusch-ConfigCommon     SetupRelease { PUSCH-ConfigCommon } OPTIONAL, -
- Need M
(PUSCH related common parameter)
pucch-ConfigCommon     SetupRelease { PUCCH-ConfigCommon } OPTIONAL,
-- Need M
(PUSCH related common parameter)
...
}
BWP-UplinkDedicated ::= SEQUENCE {
pucch-Config           SetupRelease { PUCCH-Config } OPTIONAL, -- Need M
(PUCCH related UE-specific parameter)
pusch-Config           SetupRelease { PUSCH-Config } OPTIONAL, -- Need M
(PUSCH related UE-specific parameter)
configuredGrantConfig
(Configured grant related parameter)   SetupRelease { ConfiguredGrantConfig }
OPTIONAL, -- Need M
srs-Config
(SRS related parameter)
SetupRelease { SRS-Config } OPTIONAL, -- Need M
beam FailureRecoveryConfig
(beam failure recovery related parameter)   SetupRelease {
BeamFailureRecoveryConfig } OPTIONAL, -- Cond SpCellOnly
...
}
```

According to the above table, the UE receives cell-specific (or cell common or common) transmission-related parameters configured from the base station (e.g., a random access channel (RACH), an uplink control channel (physical uplink control channel (PUCCH), uplink data channel (physical uplink shared channel) related parameters) (corresponding to BWP-UplinkCommon). In addition, the UE may receive UE-specific (or dedicated) transmission-related parameters configured from the base station (e.g., PUCCH, PUSCH, non-grant-based uplink transmission (configured grant PUSCH), and sounding reference signal (SRS) related parameters (corresponding to BWP-UplinkDedicated).

Next, with respect to the downlink bandwidth part, the following pieces of information may be configured.

TABLE 5

```
BWP-Downlink ::= SEQUENCE {
bwp-Id    BWP-Id,
(bandwidth part identity)
bwp-Common       BWP-DownlinkCommon OPTIONAL, -- Cond
SetupOtherBWP
(cell-specific or common parameter)
bwp-Dedicated    BWP-DownlinkDedicated OPTIONAL, -- Cond
SetupOtherBWP
(UE-specific parameter)
. . .
}
BWP-DownlinkCommon ::= SEQUENCE {
genericParameters    BWP,
(general parameter)
pdcch-ConfigCommon      SetupRelease { PDCCH-ConfigCommon } OPTIONAL,
-- Need M
(PDCCH related common parameter)
pdsch-ConfigCommon      SetupRelease { PDSCH-ConfigCommon } OPTIONAL,
-- Need M
(PDSCH related common parameter)
. . .
}
BWP-DownlinkDedicated ::= SEQUENCE {
pdcch-Config             SetupRelease { PDCCH-Config } OPTIONAL, -- Need M
(PDCCH related UE-specific parameter)
pdsch-Config             SetupRelease { PDSCH-Config } OPTIONAL, -- Need M
(PDSCH related UE-specific parameter)
sps-Config
(SPS related parameter)   SetupRelease { SPS-Config } OPTIONAL, -- Need M
radioLink MonitoringConfig
(RLM related parameter)   SetupRelease { radioLinkMonitoringConfig} OPTIONAL,
-- Cond SpCellOnly
. . .
}
```

According to the above table, the UE may receive cell-specific (or cell common or common) reception-related parameters configured from the base station (e.g., a downlink control channel (physical downlink control channel (PDCCH)), a downlink data channel (physical downlink shared channel) related parameters) (corresponding to BWP-DownlinkCommon). In addition, the UE may receive UE-specific (or dedicated) reception related parameters configured from the base station (e.g., PDCCH, PDSCH, non-grant-based downlink data transmission (semi-persistent scheduled PDSCH), and radio link monitoring (RLM) related parameters) (corresponding to BWP-DownlinkDedicated).

Figure 5:
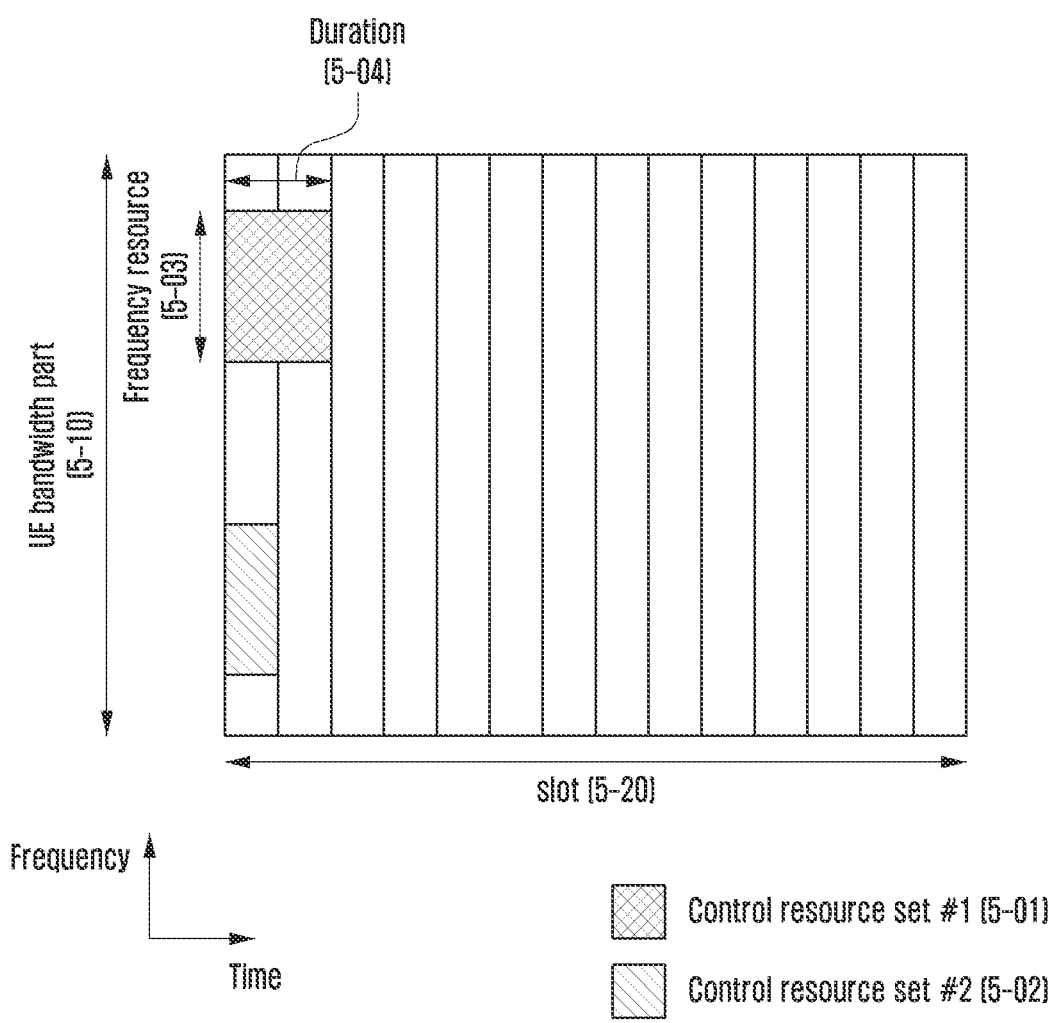
FIG. 5 illustrates an example of a control resource set (CORESET) through which a downlink control channel is transmitted in a 5G wireless communication system according to an embodiment of the disclosure.

FIG. 5 illustrates a control resource set (CORESET) through which a downlink control channel is transmitted in a wireless communication system according to an embodiment of the disclosure.

FIG. 5 illustrates an example in which a UE bandwidth part 510 is configured in a frequency domain and two control resource sets (control resource set #1 5-01 and control resource set #2 5-02) are configured in 1 slot 5-20 in a time domain. The control resource sets 5-01 and 5-02 may be configured in a specific frequency resource 5-03 within the entire UE bandwidth part 510 in the frequency domain. The control resource set may be configured with one or multiple OFDM symbols in the time domain, and this may be defined as a control resource set duration 5-04. Referring to an example illustrated in FIG. 5, the control resource set #1 5-01 is configured with the control resource set duration of two symbols, and the control resource set #2 5-02 is configured with the control resource set duration of one symbol.

The above described control resource set in the 5G system may be configured for the UE by the base station via higher layer signaling (e.g., system information, master information block (MIB), or radio resource control (RRC) signaling). The configuration of the control resource set for the UE may be understood as providing information such as a control resource set identity, a frequency location of the control resource set, a symbol length of the control resource set, and the like. The configuration information may include, for example, pieces of information below.

TABLE 6

```
ControlResourceSet ::=              SEQUENCE {
Corresponds to L1 parameter 'CORESET-ID'
controlResourceSetId         ControlResourceSetId,
(control region set Identity)
frequency DomainResources    BIT STRING (SIZE (45)),
(frequency domain resource allocation information)
duration                      INTEGER
(1..maxCoReSetDuration),
(time domain resource allocation information)
cce-REG-MappingType            CHOICE {
(CCE-to-REG mapping type)      SEQUENCE {
interleaved                    ENUMERATED {n2, n3,
reg-BundleSize
n6},
```

TABLE 6-continued

| | |
|---|---|
| (REG bundle size) | |
| precoderGranularity | ENUMERATED {sameAsREG-bundle, allContiguousRBs}, |
| interleaverSize (interleaver size) | ENUMERATED {n2, n3, n6} |
| shiftIndex INTEGER(0..maxNrofPhysicalResourceBlocks-1) OPTIONAL (interleaver shift (Shift)) }, | |
| nonInterleaved }, | NULL |
| tci-StatesPDCCH (1..maxNrofTCI-StatesPDCCH)) OF TCI-StateId (QCL configuration information) | SEQUENCE(SIZE OPTIONAL, ENUMERATED |
| tci-PresentInDCI {enabled} OPTIONAL, -- Need S } | |

In a 5G system, the control resource set may include $N_{RB}^{CORESET}$ RBs in the frequency domain, and may include $N_{symb}^{CORESET} \in \{1,2,3\}$ symbols in a time axis. One CCE may include 6 REGs, and each REG may be defined as one RB during one OFDM symbol. REGs in one control resource set may be indexed in a time-first manner, starting with REG index 0 from the first OFDM symbol and a lowest-numbered RB in the control resource set. In a 5G system, as a transmission method for PDCCH, an interleaved method and a non-interleaved method are supported. A base station may configure whether to perform interleaving transmission or non-interleaving transmission for each control resource set in a UE through higher layer signaling. Interleaving may be performed in units of REG bundles. The term 'REG bundle' may be defined as a set of one or multiple REGs. The UE may determine a CCE-to-REG mapping method in the control resource set by using the following method based on whether to perform interleaving or non-interleaving transmission configured from the base station.

TABLE 7

The CCE-to-REG mapping for a control-resource set can be interleaved or non-interleaved and is described by REG bundles:
REG bundle i is defined as REGs {iL,iL + 1,...,iL + L 1} where L is the REG bundle size, i = 0,1, ... , $N_{REG}^{CORESET}$/L − 1, and $N_{REG}^{CORESET} = N_{RB}^{CORESET} N_{symb}^{CORESET}$ is the number of REGs in the CORESET
CCE j consists of REG bundles {f(6j/L), f(6j/L + 1),..., f(6j/L + 6/L − 1)} where f(·) is an interleaver
For non-interleaved CCE-to-REG mapping, L = 6 and f (x) = x.
For interleaved CCE-to-REG mapping, L ∈ {2,6}for $N_{symb}^{CORESET} = 1$ and L ∈ {$N_{symb}^{CORESET}$, 6} for $N_{symb}^{CORESET} \in \{2,3\}$. The interleaver is defined by
 f (x) = (rC + c + $n_{shift}$) mod ($N_{REG}^{CORESET}$/L)
 x = cR + r
 r = 0,1, ... , R − 1

TABLE 7-continued c = 0,1, ... , C − 1
 C = $N_{REG}^{CORESET}$/(LR)
where R ∈ {2,3,6} .

A basic unit of a DL control channel, i.e., an REG, may include REs to which DCI is mapped and a region to which a demodulation reference signal (DMRS), which is a reference signal (RS) for decoding the REs, is mapped. One REG may include three DMRS REs. The number of CCEs required to transmit a PDCCH may be 1, 2, 4, 8, or 16 according to an aggregation level (AL), and different number of CCEs may be used to implement link adaptation of the DL control channel. For example, when AL=L, one DL control channel may be transmitted through L CCEs. A UE should detect a signal without knowing information on the DL control channel, and a search space indicating a set of CCEs for blind decoding may be defined. The search space may be a set of DL control channel candidates including CCEs that the UE should attempt to decode at a given AL. since there are various ALs for bundling up 1, 2, 4, 8 or 16 CCEs, the UE may have multiple search spaces. A search space set may be defined as a set of search spaces at all configured ALs.

A search space may be classified into a common search space and a UE-specific search space. A group of UEs or all UEs may investigate a common search space of a PDCCH in order to receive cell-common control information such as a paging message or dynamic scheduling for system information. For example, the UEs may receive PDSCH scheduling allocation information for SIB transmission including cell service provider information or the like by investigating the common search space of the PDCCH. Since a predetermined group of UEs or all UEs should receive a PDCCH, a common search space may be defined as a set of CCEs that are previously agreed on. A UE may receive scheduling allocation information for a UE-specific PDSCH or PUSCH by investigating a UE-specific search space of a PDCCH. The UE-specific search space may be UE-specifically defined through a function of various system parameters and an identity of the UE.

In a 5G system, parameters for a search space of a PDCCH may be configured by a base station in a UE through higher layer signaling (e.g., SIB, MIB, or RRC signaling). For example, the base station may configure, in the UE, the number of PDCCH candidates at each AL L, a monitoring period for the search space, a monitoring occasion of a symbol unit within a slot for the search space, a search space type (i.e., a common search space or a UE-specific search space), a combination of an RNTI and a DCI format to be monitored in the corresponding search space, and an index of a control resource set for monitoring the search space. For example, the parameters for the search space of the PDCCH may include the following pieces of information.

TABLE 8

| | |
|---|---|
| SearchSpace ::= | SEQUENCE { |
| Identity of the search space. SearchSpaceId = 0 identifies the SearchSpace configured via PBCH (MIB) or ServingCellConfigCommon. | |
| searchSpaceId (Search space identity) | SearchSpaceId, |
| controlResourceSetId (Control resource set identity) | ControlResourceSetId, |
| monitoringSlotPeriodicity AndOffset (Monitoring slot level periodicity) | CHOICE { |
| sl1 | NULL, |
| sl2 | INTEGER (0..1), |

TABLE 8-continued

```
sl4                                  INTEGER (0..3),
sl5                                  INTEGER (0..4),
sl8                                  INTEGER (0..7),
sl10                                 INTEGER (0..9),
sl16                                 INTEGER (0..15),
sl20                                 INTEGER (0..19)
}
                                     OPTIONAL,
duration(Monitoring duration)        INTEGER (2..2559)
monitoringSymbols Within Slot        BIT STRING (SIZE
(14))
    OPTIONAL,
(Monitoring symbol within slot)
nrofCandidates                       SEQUENCE {
(Number of PDCCH candidates per aggregation level)
aggregationLevel1                    ENUMERATED {n0, n1, n2,
n3, n4, n5, n6, n8},
aggregationLevel2                    ENUMERATED {n0, n1, n2,
n3, n4, n5, n6, n8},
aggregationLevel4                    ENUMERATED {n0, n1, n2,
n3, n4, n5, n6, n8},
aggregationLevel8                    ENUMERATED {n0, n1, n2,
n3, n4, n5, n6, n8},
aggregationLevel16                   ENUMERATED {n0, n1, n2,
n3, n4, n5, n6, n8}
},
searchSpaceType                      CHOICE {
(Search space type)
Configures this search space as common search space (CSS) and DCI formats to monitor.
common                               SEQUENCE {
(Common search space)
}
ue-Specific                          SEQUENCE {
(UE-specific search space)
Indicates whether the UE monitors in this USS for DCI formats 0-0 and 1-0 or for formats
0-1 and 1-1.
formats                              ENUMERATED
{formats0-0-And-1-0, formats0-1-And-1-1},
. . .
}
```

The base station may configure one or more search space sets in the UE according to configuration information. According to some embodiments, the base station may configure a search space set 1 and a search space set 2 in the UE. In the search space set 1, a DCI format A scrambled by an X-RNTI may be configured to be monitored by the UE in a common search space, and in the search space set 2, a DCI format B scrambled by a Y-RNTI may be configured to be monitored by the UE in a UE-specific search space. According to the configuration information, one or more search space sets may exist in the common search space or the UE-specific search space. For example, a search space set #1 and a search space set #2 may be configured in the common search space, and a search space set #3 and a search space set #4 may be configured in the UE-specific search space. The common search space may be classified into a specific type of search space set according to a purpose. An RNTI to be monitored may be different according to a determined search space set type. For example, the common search space type, purpose, and RNTI to be monitored may be classified as shown in Table 13 below.

TABLE 9

| Search space type | Purpose | RNTI |
|---|---|---|
| Type0 CSS | PDCCH transmission for SIB schedule | SI-RNTI |
| Type0A CSS | PDCCH transmission for SI schedule (SIB2 etc.) other than SIB1 | SI-RNTI |
| Type1 CSS | PDCCH transmission for random access response (RAR) schedule, Msg3 retransmission schedule, and Msg4 schedule | RA-RNTI, TC-RNTI |
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
| | For PCell, PDCCH transmission for data schedule | C-RNTI, MCS-C-RNTI, CS-RNTI |

In the common search space, a combination of a DCI format and an RNTI as follows may be monitored. However, the disclosure is not limited to the following examples.
　　DCI format 0_0/1_0 with CRC scrambled by C-RNTI, CS-RNTI, SP-CSI-RNTI, RA-RNTI, TC-RNTI, P-RNTI, SI-RNTI
　　DCI format 2_0 with CRC scrambled by SFI-RNTI
　　DCI format 2_1 with CRC scrambled by INT-RNTI
　　DCI format 2_2 with CRC scrambled by TPC-PUSCH-RNTI, TPC-PUCCH-RNTI
　　DCI format 2_3 with CRC scrambled by TPC-SRS-RNTI
In the UE-specific search space, a combination of a DCI format and an RNTI as follows may be monitored. However, the disclosure is not limited to the following examples.

DCI format 0_0/1_0 with CRC scrambled by C-RNTI, CS-RNTI, TC-RNTI

DCI format 0_1/0_2 with CRC scrambled by C-RNTI, CS-RNTI, TC-RNTI, SP-CSI-RNTI

DCI format 1_1/1_2 with CRC scrambled by C-RNTI, CS-RNTI, TC-RNTI

Specified RNTIs may comply with the following definitions and uses below.

Cell RNTI (C-RNTI): used for scheduling a UE-specific PDSCH

Temporary Cell RNTI (TC-RNTI): used for scheduling a UE-specific PDSCH

Configured scheduling RNTI (CS-RNTI): used for scheduling a semi-statically configured UE-specific PDSCH Random access RNTI (RA-RNTI): used for scheduling a PDSCH in a random access stage Paging RNTI (P-RNTI): used for scheduling a PDSCH for transmitting paging System information RNTI (SI-RNTI): used for scheduling a PDSCH for transmitting system information Interruption RNTI (INT-RNTI): used for notifying of whether a PDSCH is punctured Transmit power control for PUSCH RNTI (TPC-PUSCH-RNTI): used for indicating a power control command for a PUSCH Transmit power control for PUCCH RNTI (TPC-PUCCH-RNTI): used for indicating a power control command for a PUCCH Transmit power control for SRS RNTI (TPC-SRS-RNTI): used for indicating a power control command for an SRS The above-described DCI formats may comply with the following definitions.

TABLE 10

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

In a 5G system, a search space of an AL L in a control resource set p and a search space set s may be expressed as Equation 1.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{Equation 1}$$

L: Aggregation level $n_{CI}$: Carrier index $N_{CCE,p}$: Total number of CCEs existing in control resource set p $n_{s,f}^\mu$: Slot index $M_{p,s,max}^{(L)}$: Number of PDCCH candidates of aggregation level L $M_{s n_{CI}}=0, \ldots, M_{p,s,max}^{(L)}-1$: PDCCH candidate group index of aggregation level L $i=0, \ldots, L-1$ $Y_{p,n_{s,f}^\mu} = (A_p \cdot Y_{p,n_{s,f}^\mu-1}) \mod D, Y_{p,-1}=n_{RNTI} \neq 0$ $A_0=39827, A_1=399829, A_2=39839, D=65537$ $n_{RNTI}$: UE identifier In a case of the common search space, the $Y\_(p,n_{s,f}^\mu)$ value may correspond to zero.

In a case of the UE-specific search space, the $Y\_(p,n_{s,f}^\mu)$ value may correspond to a value that changes according to the UE ID (C-RNTI or ID configured by the base station for the UE) and a time index.

Next, a method for configuring a transmission configuration indication (TCI) state, which is a means for indicating or exchanging quasi co-location (QCL) information between a UE and a base station in a 5G communication system, will now be described in detail.

In a wireless communication system, one or more different antenna ports (or can be replaced by one or more channels, signals, and combinations thereof, but in the description of the disclosure in the future, for convenience, collectively referred to as "different antenna ports") may be associated with each other by the QCL configuration as shown in Table 11 below.

TABLE 11

| QCL-Info ::= | SEQUENCE { |
|---|---|
| cell | ServCellIndex(Serving cell index to which QCL reference RS is transmitted) OPTIONAL, -- Need R |
| bwp-Id | BWP-Id(BWP index to which QCL reference RS is transmitted) OPTIONAL, -- Cond CSI-RS-Indicated |
| referenceSignal | CHOICE {( Indicator indicating one of CSI-RSa nd SS/PBCH block as QCL reference RS) |
| csi-rs | NZP-CSI-RS-ResourceId, |
| ssb | SSB-Index |
| }, | |
| qcl-Type | ENUMERATED {typeA, typeB, typeC, typeD},(QCL-Type indicator) |
| ... | |
| } | |

Specifically, the statistical characteristics of a channel defined by the QCL configuration (indicated by a parameter qcl-Type in the QCL configuration) may be classified as follows according to the QCL type.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

Here, although the QCL types are not limited to the above four types, not all possible combinations are listed in order not to obscure the gist of the description. In the above, QCL-TypeA is a QCL type used when all statistical characteristics measurable in the frequency and time axes can be referenced since both the bandwidth and transmission section of the target antenna port are sufficient compared to those of the reference antenna port (that is, in case that the number of samples and the transmission band/time of the target antenna port on both the frequency axis and the time axis are greater than the number of samples and the transmission band/time of the reference antenna port). QCL-TypeB is a QCL type used when the transmission section of the reference antenna port is sufficient to measure statistical characteristics, which are measurable on the time axis, that is, Doppler shift and Doppler spreads. QCL-TypeC is a QCL type used when only first-order statistics, that is, Doppler shift and average delay can be referenced since the bandwidth and transmission section of the reference antenna port are insufficient to measure second-order statistics, that is, Doppler spread and delay spreads. QCL-TypeD is a QCL type configured when spatial reception filter values used when receiving the reference antenna port can be used when receiving the target antenna port.

On the other hand, the base station can configure or indicate up to two QCL configurations in one target antenna port through the following TCI state configuration as shown in Table 12.

TABLE 12

```
TCI-State ::=       SEQUENCE {
tci-StateId         TCI-StateId(TCI state indicator),
qcl-Type1           QCL-Info, (First QCL configuration for a target
antenna port to which a corresponding TCI state is applied)
qcl-Type2           QCL-Info (Second QCL configuration for a target
antenna port to which a corresponding TCI state is applied)
OPTIONAL, -- Need R
. . .
}
```

The first QCL configuration among two QCL configurations included in one TCI state configuration may be configured to be one of QCL-TypeA, QCL-TypeB, and QCL-TypeC. Here, the configurable QCL type is specified according to the types of the target antenna port and the reference antenna port, and will be described in detail below. In addition, the second QCL configuration among two QCL configurations included in the one TCI state configuration may be configured to be QCL-TypeD, and may be omittable in some cases.

Tables 13 to 17 below are tables showing valid TCI state configurations according to the types of target antenna port.

Table 13 shows valid TCI state configurations when a target antenna port is CSI-RS for tracking (TRS). The TRS refers to an NZP CSI-RS, in which a repetition parameter is not configured and trs-Info is configured to true, among CSI-RSs. The configuration of No. 3 in Table 13 can be used for aperiodic TRS.

TABLE 13

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 14 shows valid TCI state configurations when a target antenna port is CSI-RS for CSI. The CSI-RS for CSI refers to an NZP CSI-RS, which is not used for beam management (e.g., a repetition parameter is not configured) and trs-Info is also not configured to true, among CSI-RSs.

TABLE 14

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 15 shows valid TCI state configurations when a target antenna port is CSI-RS for beam management (the same meaning as BM, CSI-RS for L1 RSRP reporting). The CSI-RS for BM refers to an NZP CSI-RS, in which a repetition parameter is configured and has a value of On or Off, and trs-Info is not configured to true, among CSI-RSs.

TABLE 15

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 16 shows valid TCI state configurations when a target antenna port is PDCCH DMRS.

TABLE 16

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 17 shows valid TCI state configurations when a target antenna port is PDSCH DMRS.

TABLE 17

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration method according to Tables 13 to 17, the target antenna port and the reference antenna port for each stage are configured and operated as "SSB"→"TRS"→"CSI-RS for CSI, or CSI-RS for BM, or PDCCH DMRS, or PDSCH DMRS". Through this, it is possible to help the reception operation of the UE by associating the statistical characteristics that can be measured from the SSB and TRS with each antenna port.

Methods of allocating time and frequency resources for data transmission in NR are described below.

Figure 6:
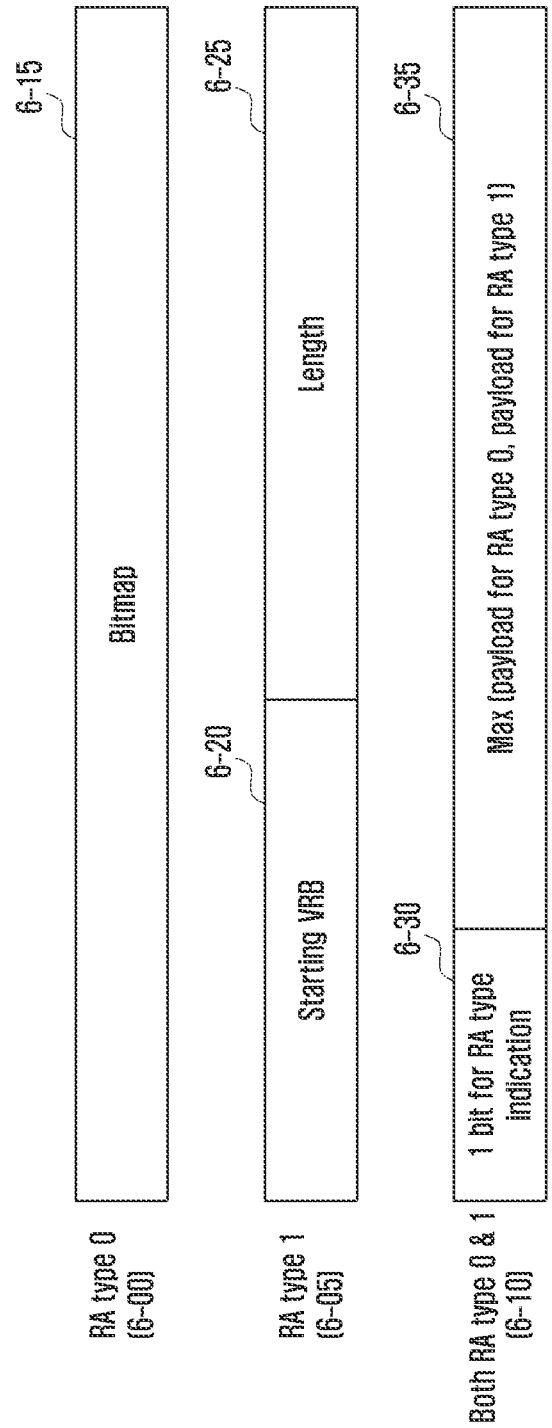
FIG. 6 illustrates frequency axis resource allocation methods in a 5G wireless communication system according to an embodiment of the disclosure.

In NR, the following detailed frequency domain resource allocation (FD-RA) methods may be provided in addition to frequency-domain resource candidate allocation through BWP indication. FIG. 6 illustrates an example of frequency-domain resource allocation of a PDSCH in a wireless communication system according to an embodiment of the disclosure.

FIG. 6 illustrates three frequency-domain resource allocation methods of type 0 (6-00), type 1 (6-05), and dynamic switch (6-10) configurable in a wireless communication system according to an embodiment of the disclosure.

Referring to FIG. 6, in case that a UE is configured to use only resource type 0 via higher layer signaling (indicated by reference numeral 6-00), partial downlink control information (DCI) for allocation of PDSCH to the corresponding UE includes a bitmap configured by NRBG bits. Conditions for this will be described again later. Here, NRBG denotes the number of resource block groups (RBGs) determined as shown in Table 18 below according to a BWP size allocated by a BWP indicator and a higher layer parameter rbg-Size, and data is transmitted to RBG indicated as "1" by the bitmap.

TABLE 18

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

In case that the UE is configured to use only resource type 1 via higher layer signaling (indicated by reference numeral 6-05), partial DCI for allocation of the PDSCH to the UE includes frequency-domain resource allocation information configured by $[\log_2(N_{RB}^{DLBWP}(N_{RB}^{DLBWP}+1)/2)]$ bits. Conditions for this will be described again later. Through this information, the base station may configure a starting VRB 6-20 and the length of frequency-domain resources 6-25 continuously allocated therefrom.

In case that the UE is configured to use both resource type 0 and resource type 1 via higher layer signaling (indicated by reference numeral 6-10), partial DCI for allocation of PDSCH to the UE includes frequency-domain resource allocation information configured by bits of a greater value 6-35 among a payload 6-15 for configuration of resource type 0 and payloads 6-20 and 6-25 for configuration of resource type 1, and the conditions for the same will be described later. Here, one bit may be added to the most significant bit (MSB) of the frequency-domain resource allocation information in the DCI, the bit may indicate that resource type 0 is used when the corresponding bit has a value of 0, and the bit may indicate that resource type 1 is used when the corresponding bit has a value of 1.

Figure 7:
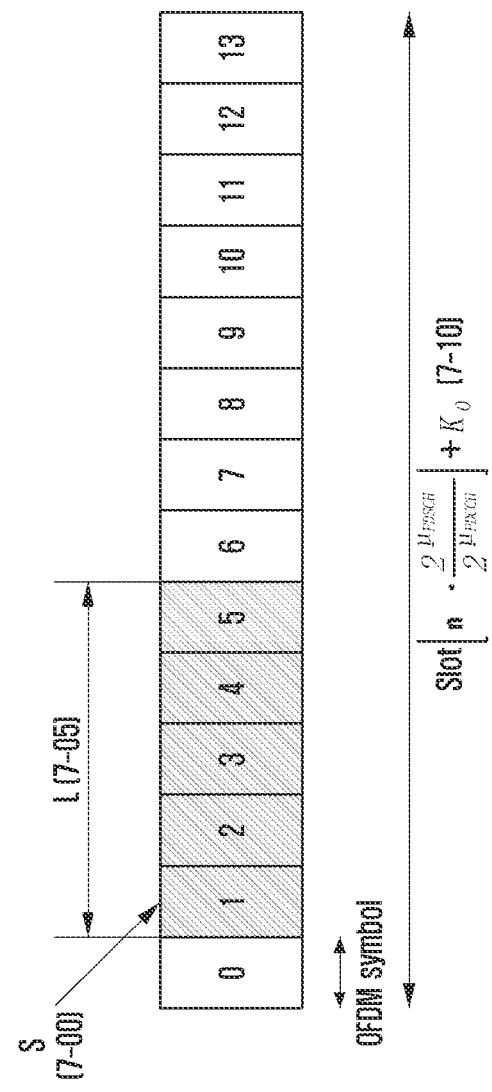
FIG. 7 illustrates an example of time axis resource allocation of NR according to an embodiment of the disclosure.

FIG. 7 illustrates an example of time-domain resource allocation of a physical downlink shared channel (PDSCH) in a wireless communication system according to an embodiment of the disclosure.

Referring to FIG. 7, a base station may indicate the time-axis position of a PDSCH resource according to subcarrier spacing (SCS) ($\mu_{PDSCH}$, $\mu_{PDCCH}$) of a data channel and a control channel configured through a higher layer, the value of a scheduling offset ($K_0$), and a start position 7-00 and a length 7-05 of an OFDM symbol in one slot 7-10, dynamically indicated through DCI.

Figure 8:
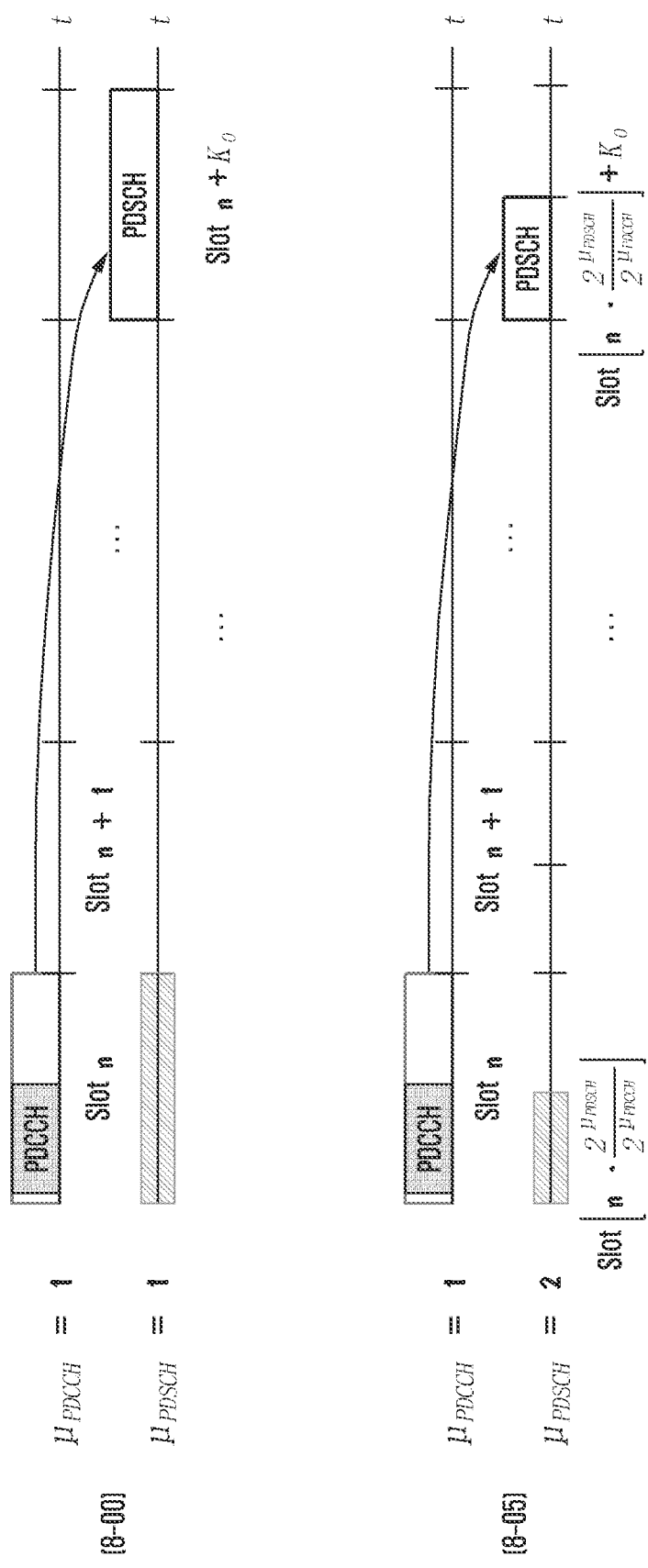
FIG. 8 illustrates an example of time-domain resource allocation according to subcarrier spacing of a data channel and a control channel in a wireless communication system according to an embodiment of the disclosure.

FIG. 8 illustrates an example of time-domain resource allocation according to a subcarrier spacing of a data channel and a control channel in a wireless communication system according to an embodiment of the disclosure.

Referring to FIG. 8, when a data channel and a control channel have the same subcarrier spacing (8-00, $\mu_{PDSCH}=\mu_{PDCCH}$), since a slot number for the data channel and a slot number for the control channel are the same, a base station and a UE may identity that a scheduling offset occurs in accordance with predetermined slot offset $K_0$. On the other hand, when the subcarrier spacing of the data channel and the subcarrier spacing of the control channel are different (8-05, $\mu_{PDSCH}\neq\mu_{PDCCH}$), the slot number for the data channel and the slot number for the control channel are different, and thus the base station and the UE may identify that a scheduling offset occurs in accordance with predetermined slot offset $K_0$ based on the subcarrier spacing of the PDCCH.

In FIG. 8, an offset interpretation method for a case in which subcarrier spacing between a data channel and a control channel is the same or different has been described, but the above method is not limited thereto. Similarly, the above method may be applied to a case in which subcarrier spacing of different channels or reference signals is the same or different, such as when subcarrier spacing between a CSI-RS and a control channel is different or a subcarrier spacing between an SRS and a control channel is different.

Hereinafter, downlink control information (hereinafter, referred to as DCI) in a next-generation mobile communication system (5G or NR system) will be described in detail.

In the next generation system (5G or NR system), scheduling information about uplink data (or physical uplink shared channel (PUSCH) or downlink data (or physical downlink shared channel (PDSCH)) is transmitted from a base station to a UE through DCI. The UE may monitor a fallback DCI format and a non-fallback DCI format with regard to the PUSCH or the PDSCH. The fallback DCI format may include a predefined field between the base station and the UE, and the non-fallback DCI format may include a configurable field.

The DCI may be transmitted through a PDCCH which is a physical downlink control channel after channel coding and modulation processing is performed thereon. A cyclic redundancy check (CRC) may be attached to a DCI message payload, and the CRC may be scrambled by a radio network temporary identifier (RNTI) corresponding to the identification information of the UE. Depending on the purpose of the DCI message, different RNTIs may be used for scrambling of the CRC attached to the payload of the DCI message. For example, the purpose of the DCI message may include a UE-specific data transmission, a power adjustment command, or a random access response. That is, the RNTI is not explicitly transmitted, but is included in a CRC calculation process and then transmitted. When receiving the DCI message transmitted through the PDCCH, the UE may check a CRC by using an assigned RNTI. When a CRC check result is correct, the UE may identify that the corresponding message has been transmitted to the UE.

For example, DCI for scheduling a PDSCH for system information (SI) may be scrambled by an SI-RNTI. DCI for scheduling a PDSCH for a random access response (RAR) message may be scrambled by a random access (RA)-RNTI. DCI for scheduling a PDSCH for a paging message may be scrambled by a paging (P)-RNTI. DCI for notifying of a slot format indicator (SFI) may be scrambled by an SFI-RNTI. DCI for notifying of transmit power control (TPC) may be scrambled by a TPC-RNTI. DCI for scheduling UE-specific PDSCH or PUSCH may be scrambled by a cell RNTI (C-RNTI).

DCI format 0_0 may be used as a fallback DCI for scheduling a PUSCH. Here, a CRC may be scrambled by a C-RNTI, a configured scheduling (CS)-RNTI, or a modulation coding scheme (MCS)-cell (C)-RNTI. In an embodiment, the DCI format 0_0 in which the CRC is scrambled by the C-RNTI may include, for example, pieces of information such as Table 19 below.

TABLE 19

Identifier for DCI formats - [1] bit
Frequency domain resource assignment - $\lceil \log_2 (N_{RB}^{UL,\ BWP} (N_{RB}^{UL,\ BWP} + 1)/2) \rceil$ bits
Time domain resource assignment - 4 bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
- Uplink (UL)/ Supplementary UL (SUL) indicator - 0 or 1 bit DCI format 0_1 may be used as a non-fallback DCI for scheduling a PUSCH. Here, a CRC may be scrambled by a C-RNTI, a CS-RNTI, a semi persistent (SP)-channel state information (CSI)-RNTI, or a MCS-C-RNTI. In an embodiment, the DCI format 0_1 in which the CRC is scrambled by the C-RNTI may include, for example, pieces of information of Table 20 below.

TABLE 20

Carrier indicator - 0 or 3 bits
UL/SUL indicator - 0 or 1 bit
Identifier for DCI formats -1 bits
Bandwidth part indicator - 0, 1 or 2 bits
Frequency domain resource assignment
   For resource allocation type 0, $N_{RBG}$ bits
   For resource allocation type 1.
   $\lceil \log_2(N_{RB}^{UL,BWP}(N_{RB}^{UL,BWP} + 1)/2) \rceil$ bits
   If both resource allocation type 0 and 1 are configured,
   $\max (\lceil \log_2(N_{RB}^{UL,BWP}(N_{RB}^{UL,BWP} + 1)/2) \rceil, N_{RBG}) + 1$ bits
Time domain resource assignment -1, 2, 3, 4, 5, or 6 bits
Frequency hopping flag - 0 or 1 bit, only for resource allocation type 1.
   0 bit if only resource allocation type 0 is configured;
   1 bit otherwise.
Modulation and coding scheme - 5 bits
New data indicator - 1 bit
Redundancy version - 2 bits
HARQ process number - 4 bits
1st downlink assignment index - 1 or 2 or 4 bits
   1 bit for semi-static HARQ-ACK codebook:
   2 bits for dynamic HARQ-ACK codebook, or for enhanced dynamic HARQ-ACK codebook without UL-TotalDAI-Included-r16.
   4 bits for enhanced dynamic HARQ-ACK codebook with UL-TotalDAI-Included-r16.
2nd downlink assignment index - 0 or 2 bits
   2 bits for dynamic HARQ-ACK codebook, or for enhanced dynamic HARQ-ACK codebook without UL-TotalDAI-Included-r16.
   4 bits for enhanced dynamic HARQ-ACK codebook with UL-TotalDAI-Included-r16.
   0 bit otherwise.
TPC command for scheduled PUSCH - 2 bits SRS resource indicator $\cdot \left\lceil \log_2\left( \sum_{k=1}^{\min\{L_{max},N_{SRS}\}} \binom{N_{SRS}}{k} \right) \right\rceil$ or $\lceil \log_2(N_{SRS}) \rceil$ bits $\left\lceil \log_2\left( \sum_{k=1}^{\min\{L_{max},N_{SRS}\}} \binom{N_{SRS}}{k} \right) \right\rceil$ bits for non-codebook based PUSCH transmission:

$\lceil \log_2(N_{SRS}) \rceil$ bits for non-codebook based PUSCH transmission.

TABLE 20-continued

Precoding information and number of layers-up to 6 bits
Antenna ports - up to 5 bits
SRS request - up to 3 bits
CSI request (channel state information request) - 0, 1. 2, 3, 4, 5. or 6 bits
CBG transmission information (code block group transmission information)- 0, 2, 4, 6, or 8 bits
PTRS-DMRS association (phase tracking reference signal-demodulation reference signal association) - 0 or 2 bits.
beta_offset indicator - 0, 1, or 2 bits
DMRS sequence initialization (demodulation reference signal sequence initialization) - 0 or 1 bit
UL-SCH indicator (indicator indicating whether to transmit TB) -0 or 1 bit
Open-loop power control parameter set indication - up to 2 bits
SCell dormancy indication (SCell dormancy state switching indication) up to 5 bits DCI format 0_2 may be used as non-fallback DCI for scheduling PUSCH, and DCI payload may be configured more flexibly compared to DCI format 0_1. Here, the CRC may be scrambled by a C-RNTI, a CS-RNTI, an SP-CSI-RNTI, or a MCS-C-RNTI. In an embodiment, DCI format 0_2 in which CRC is scrambled by C-RNTI may include information as shown in Table 21 below.

TABLE 21

Carrier indicator - up to 3 bits
UL/SUL indicator - 0 or 1 bit
Identifier for DCI formats - 1 bits
Bandwidth part indicator - 0, 1 or 2 bits
Frequency domain resource assignment
   For resource allocation type 0, $N_{RBG}$ bits
   For resource allocation type 1.
   $\lceil \log_2(N_{RBG,K1}(N_{RBG,K1} + 1)/2) \rceil$ bits
   If both resource allocation type 0 and 1 are configured,
   $\max (\lceil \log_2(N_{RBG,K1}(N_{RBG,K1} + 1)/2) \rceil, N_{RBG}) + 1$ bits
Time domain resource assignment -1, 2, 3, 4, 5, or 6 bits
Frequency hopping flag - 0 or 1 bit, only for resource allocation type 1.
   0 bit if only resource allocation type 0 is configured;
   1 bit otherwise.
Modulation and coding scheme - 5 bits
New data indicator - 1 bit
Redundancy version - up to 2 bits
HARQ process number - up to 4 bits
Downlink assignment index - 0 or 1 or 2 or 4 bits
   0 bit if the higher layer parameter Downlinkassignment index-ForDCIFormat0_2 is not configured
   1st downlink assignment index - 1 or 2 bits
      1 bit for semi-static HARQ-ACK codebook;
      2 bits for dynamic HARQ-ACK codebook with single HARQ-ACK codebook.
   2nd downlink assignment index - 0 or 2 bits
      2 bits for dynamic HARQ-ACK codebook with two HARQ-ACK sub-codebooks;
      0 bit otherwise.
TPC command for scheduled PUSCH - 2 bits SRS resource indicator $\cdot \left\lceil \log_2\left( \sum_{k=1}^{L_{min}} \binom{N_{SRS}}{k} \right) \right\rceil$ or $\lceil \log_2(N_{SRS}) \rceil$ bits $\left\lceil \log_2\left( \sum_{k=1}^{L_{min}} \binom{N_{SRS}}{k} \right) \right\rceil$ bits for non-codebook based PUSCH transmission:

$\lceil \log_2(N_{SRS}) \rceil$ bits for non-codebook based PUSCH transmission.
Precoding information and number of layers -up to 6 bits
Antenna ports - up to 5 bits
SRS request - up to 3 bits
CSI request (channel state information request) - 0, 1, 2, 3, 4, 5, or 6 bits
CBG transmission information (code block group transmission information)- 0, 2, 4, 6, or 8 bits
PTRS-DMRS association (phase tracking reference signal-

TABLE 21-continued demodulation reference signal association) - 0 or 2 bits.
beta_offset indicator - 0 or 2 bits
DMRS sequence initialization (demodulation reference signal sequence initialization) - 0 or 1 bit
UL-SCH indicator (indicator indicating whether to transmit TB) - 1 bit
Open-loop power control parameter set indication - up to 2 bits
SCell dormancy indication (SCell dormancy state switching indication) - up to 5 bits DCI format 1_0 may be used as a fallback DCI for scheduling a PDSCH. Here, a CRC may be scrambled by a C-RNTI, a CS-RNTI, or a MCS-C-RNTI. In an embodiment, the DCI format 1_0 in which the CRC is scrambled by the C-RNTI may include, for example, the following pieces of information of Table 2] below.

TABLE 22

- Identifier for DCI formats - 1 bit
- Frequency domain resource assignment - $\lceil \log_2 (N_{RB}^{DL, BWP} (N_{RB}^{DL, BWP} + 1)/2)\rceil$ bits
- Time domain resource assignment - 4 bits
- Frequency hopping flag - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH ( transmit power control command for scheduled PUCCH )- 2 bits
- PUCCH resource indicator ( physical uplink control channel(PUCCH) resource indicator ) - 3 bits
- PDSCH-to-HARQ feedback timing indicator - 3 bits DCI format 1_1 may be used as a non-fallback DCI for scheduling a PDSCH. Here, a CRC may be scrambled by a C-RNTI, a CS-RNTI, or a MCS-C-RNTI. In embodiment, the DCI format 1_1 in which the CRC is scrambled by the C-RNTI may include, for example, pieces of information of Table 23 below.

TABLE 23

- Carrier indicator - 0 or 3 bits
- Identifier for DCI formats -1 bits
- Bandwidth part indicator - 0, 1 or 2 bits
- Frequency domain resource assignment
  • For resource allocation type 0, $N_{RBG}$ bits
  • For resource allocation type 1,
    $\lceil \log_2(N_{RB}^{DL,BWP} (N_{RB}^{DL,BWP} + 1)/2)\rceil$ bits
  • If both resource allocation type 0 and 1 are configured,
    $\max (\lceil \log_2 (N_{RB}^{DL,BWP} (N_{RB}^{DL,BWP} + 1)/2)\rceil, N_{RBO})$ + 1 bits
- Time domain resource assignment -0, 1, 2, 3, or 4 bits
- VRB-to-PRB mapping - 0 or 1 bit, only for resource allocation type 1.
  • 0 bit if only resource allocation type 0 is configured;
  • 1 bit otherwise.
- PRB bundling size indicator ( physical resource block bundling size indicator ) - 0 or 1 bit
- Rate matching indicator - 0, 1, or 2 bits
- ZP CSI-RS trigger ( zero power channel state information-reference signal trigger ) - 0, 1, or 2 bits
For transport block 1 :
  - Modulation and coding scheme - 5 bits
  - New data indicator - 1 bit
  - Redundancy version 2 bits
For transport block 2:
  - Modulation and coding scheme - 5 bits
  - New data indicator 1 bit
  - Redundancy version - 2 bits
  - HARQ process number - 4 bits
  - Downlink assignment index - 2 or 4 or 6 bits
  - TPC command for scheduled PUCCH - 2 bits

TABLE 23-continued

- PUCCH resource indicator - 3 bits
- PDSCH-to-HARQ_feedback timing indicator - 3 bits
- Antenna ports - up to 6 bits
- Transmission configuration indication - 0 or 3 bits
- SRS request - up to 3 bits
- CBG transmission information ( code block group transmission information )- 0, 2, 4, 6, or 8 bits
- DMRS sequence initialization ( demodulation reference signal sequence initialization )- 0 or 1 bit
- Open-loop power control parameter set indication - up to 2 bits
- SCell dormancy indication ( SCell dormancy state switching indication ) - up to 5 bits DCI format 1_2 may be used as non-fallback DCI for scheduling PDSCH, and DCI payload may be configured more flexibly compared to DCI format 1_1. Here, the CRC may be scrambled by a C-RNTI, a CS-RNTI, or a MCS-C-RNTI. In an embodiment, DCI format 1_2 in which CRC is scrambled by C-RNTI may include information as shown in Table 24 below.

TABLE 24

- Carrier indicator - up to 3 bits
- Identifier for DCI formats -1 bits
- Bandwidth part indicator - 0, 1 or 2 bits
- Frequency domain resource assignment
  • For resource allocation type 0, $N_{RBG}$ bits
  • For resource allocation type 1,
    $\lceil \log_2 (N_{RBG,K2} (N_{RBG,K2} + 1)/2)\rceil$ bits
  • If both resource allocation type 0 and 1 are configured.
    $\max(\lceil \log_2 (N_{RBG,K2} (N_{RBG,K2} + 1)/2)\rceil, N_{RBG})$ + 1 bits
- Time domain resource assignment -0, 1, 2, 3, or 4 bits
- VRB-to-PRB mapping - 0 or 1 bit, only for resource allocation type 1.
  • 0 bit if only resource allocation type 0 is configured;
  • 1 bit otherwise.
- PRB bundling size indicator ( physical resource block bundling size indicator ) - 0 or 1 bit
- Rate matching indicator - 0, 1, or 2 bits
- ZP CSI-RS trigger ( zero power channel state information-reference signal trigger ) - 0, 1, or 2 bits
- Modulation and coding scheme - 5 bits
- New data indicator - 1 bit
- Redundancy version - up to 2 bits
- HARQ process number - up to 4 bits
- Downlink assignment index - 0, 1, 2 or 4 bits
- TPC command for scheduled PUCCH - 2 bits
- PUCCH resource indicator - up to 3 bits
- PDSCH-to-HARQ_feedback timing indicator - up to 3 bits
- Antenna ports - up to 6 bits
- Transmission configuration indication - up to 3 bits
- SRS request - up to 3 bits
- CBG transmission information ( code block group transmission information ) - 0, 2, 4, 6, or 8 bits
- DMRS sequence initialization ( demodulation reference signal sequence initialization )- 0 or 1 bit
- Open-loop power control parameter set indication - up to 2 bits
- SCell dormancy indication ( SCell donancy state switching indication ) - up to 5 bits The maximum number of DCIs of different sizes which the UE can receive per slot in the corresponding cell is 4. The maximum number of DCIs of different sizes scrambled by C-RNTIs which the UE can receive per slot in the corresponding cell is 3.

On the other hand, the antenna port indication field of the DCI format 1_1 or 1_2 may be configured as Table 25 to Table 28 as follows.

TABLE 25

| | Antenna port(s) (1000 + DMRS port), dmrs-Type = 1, maxLength = 1 One Codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 26

| Antenna port(s) (1000 + DMRS port), dmrs-Type = 1, maxLength = 2 | | | | | | | |
|---|---|---|---|---|---|---|---|
| One Codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 27

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 28

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |

TABLE 28-continued

| Antenna port(s) (1000 + DMRS port), dmrs-Type = 2, maxLength = 2 | | | | | | | |
|---|---|---|---|---|---|---|---|
| One codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
| 38 | 3 | 4, 5 | 2 | | | | |
| 39 | 3 | 6, 7 | 2 | | | | |
| 40 | 3 | 8, 9 | 2 | | | | |
| 41 | 5 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

Table 25 is a table used when dmrs-type is indicated as 1 and maxLength is indicated as 1, and Table 26 is a table used when dmrs-Type=1 and maxLength=2 are indicated. The DMRS port is indicated to be used based on Table 27 when dmrs-type=2 and maxLength=1, and used based on Table 28 when dims-type is 2 and maxLength=2.

In the table, numbers 1, 2, and 3 indicated by the number of DMRS CDM group(s) without data refer to CDM groups {0}, {0, 1}, {0, 1, 2}, respectively. DMRS port(s) indicates the index of a port to be used in order. Antenna port is indicated by the expression of (DMRS port+1000). The CDM group of the DMRS is connected to the method for generating the DMRS sequence and the antenna port, as shown in Tables 29 and 30. Table 29 indicates parameters when dmrs-type=1 is used, and Table 30 indicates parameters when dmrs-type=2 is used.

TABLE 29

Parameters for PDSCH DM-RS dmrs-type = 1.

| p | CDM group λ | Δ | $w_t(k')$ k' = 0 | $w_t(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 30

Parameters for PDSCH DM-RS dmrs-type = 2.

| p | CDM group λ | Δ | $w_t(k')$ k' = 0 | $w_t(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The DMRS sequence according to each parameter is determined by Equation 2 below.

$$a_{k,l}^{(p,\mu)} = \beta_{PDSCH}^{DMRS} w_t(k') w_t(l') r(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

Equation 2

Next, a process for measuring and reporting a channel state in a wireless communication system according to an embodiment of the disclosure will be described in detail.

In NR, a channel state information reference signal (CSI-RS) is supported as a reference signal for measuring a channel state by a UE, and each CSI-RS resource configuration configured by a higher layer may include at least the following detailed pieces of configuration information. However, the configuration information is not limited to the following examples.

NZP-CSI-RS-Resource ConfigID: ID of corresponding CSI-RS resource configurations NrofPorts: The number of CSI-RS ports included in corresponding CSI-RS resource CSI-RS-timeConfig: Transmission period and slot offset of corresponding CSI-RS resource CSI-RS-ResourceMapping: Location of OFDM symbol in a slot of corresponding CSI-RS resource and location of subcarrier in a PRB CSI-RS-Density: Frequency density of corresponding CSI-RS.

CDMType: CDM length and CDM RE pattern of corresponding CSI-RS.

CSI-RS-FreqBand: Transmission bandwidth and start location of corresponding CSI-RS Pc: A ratio between physical downlink shared channel (PDSCH) energy per RE (EPRE) and NZP CSI-RS EPRE powerControlOffset: A ratio between PDSCH energy per RE (EPRE) and CSI-RS EPRE powerControlOffsetSS: A ratio between SS/PBCH block EPRE and CSI-RS EPRE According to some embodiments, in NR, the number of CSI-RS ports corresponding to one among {1, 2, 4, 8, 12, 16, 24, 32} may be configured in one CSI-RS resource, and different degrees of freedom in configuration are supported according to the number of CSI-RS ports configured in a CSI-RS resource. Table 31 indicates the CSI-RS density, the CDM length and type, the frequency axis and time axis start location $(\bar{k},\bar{l})$ of a CSI-RS component RE pattern, and the number of frequency axis REs (k') and number of time axis Res (l') of a CSI-RS component RE pattern, which are configurable according to the number of NR CSI-RS ports (X).

According to some embodiments, a CSI-RS component RE pattern is a basic unit configuring a CSI-RS resource, and may be configured by a total of YZ REs including (Y=1+max(k')) REs adjacent on a frequency axis and (Z=1+max(l')) REs adjacent on a time axis. Referring to Table 26, in NR, different degrees of freedom in configuration of a frequency axis are supported according to the number of CSI-RS ports configured in a CSI-RS resource.

TABLE 31

| Row | Ports X | Density ρ | Ccdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0),(k_3, l_0),$ $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1),$ $(k_0, l_1), (k_1, l_1), (k_2, l_1), (k_0, l_0 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0),(k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0), (k_0, l_0 + 1), (k_1, l_0 + 1),$ $(k_2, l_0 + 1), (k_3, l_0 + 1), (k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1),$ $(k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

Figure 9:
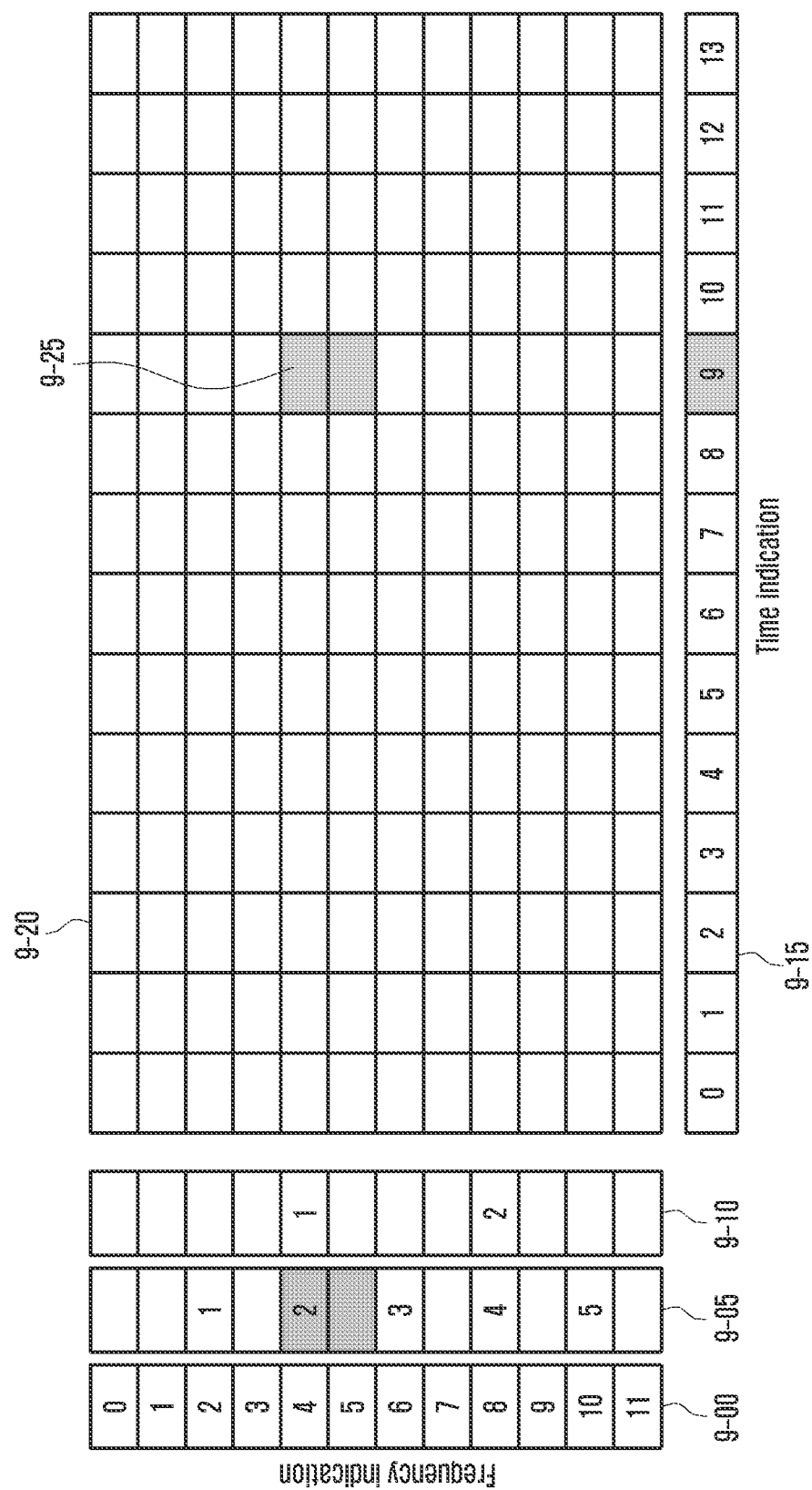
FIG. 9 illustrates a designation of a CSI-RS resource element (RE) by channel state information reference signal (CSI-RS) resource mapping in a wireless communication system according to an embodiment of the disclosure.

FIG. 9 illustrates a designation of a CSI-RS resource element by CSI-RS resource mapping in a wireless communication system according to an embodiment of the disclosure.

Referring to FIG. 9, FIG. 9 illustrates an example of designating a CSI-RS RE by CSI-RS-ResourceMapping configured by a higher layer. When the number of CSI-RS port is 1, it is possible to configure CSI-RS without subcarrier limitation in a PRB, and the UE may be designated with the CSI-RS RE location by a 12-bit bitmap (indicated by reference numeral 9-00). When the number of CSI-RS ports is one among {2, 4, 8, 12, 16, 24, 32} and Y=2, it is possible to configure the CSI-RSs for every two subcarriers in the PRB, and the UE can be designated with the CSI-RS RE location by a 6-bit bitmap (indicated by reference numeral 9-05). When the number of CSI-RS ports is 4 and Y=4, the CSI-RSs can be configured for every four subcarriers in the PRB, and the UE can be designated with the CSI-RS RE location by a 3-bit bitmap (indicated by reference numeral 9-10). Similarly, in a case of the time axis RE location, the UE can be designated with the CSI-RS by a bitmap of a total of 14 bits. Here, the length of a bitmap can be changed according to the Z value of Table 19 (CSI-RS locations within a slot), as in the frequency location designation. However, the principle is similar to the above description and thus a detailed description thereof will be omitted.

As an example, in case that X=2 port is configured, the base station may designate the RE location by the frequency indication 9-05. In case that the base station designates the subcarrier location by the value 2 of the frequency indication 9-05, and designates the OFDM symbol position by the value 9 of the time indication 9-15, the UE may know that the CSI-RS is transmitted at the RE position 9-25 in the PRB 9-20.

Next, a method of measuring and reporting a channel state in a 5G communication system will be described in detail.

Channel state information (channel state information, CSI) may include a channel quality indicator (channel quality information (CQI)), a precoding matrix index (precoding matrix indicator (PMI)), a CSI-RS resource indicator (CSI-RS resource indicator (CRI)), SS/PBCH block resource indicator (SSBRI), layer indicator (LI), rank indicator (RI), and/or L1-reference signal received power (RSRP). The base station may control time and frequency resources for CSI measurement and reporting of the UE.

For the above described CSI measurement and reporting, the UE may be configured with setting information for N (≥1) CSI reporting (CSI-ReportConfig), setting information for M (≥1) RS transmission resources (CSI-ResourceConfig), one or two trigger state (CSI-AperiodicTriggerStateList or CSI-SemiPersistentOnPUSCH-TriggerStateList) list information via higher layer signaling.

The configuration information for the afore-described CSI measurement and report may be as follows described in Table 32 to Table 38 in more detail.

TABLE 32

CSI-ReportConfig
The IE CSI-ReportConfig is used to configure a periodic or semi-persistent report sent
on PUCCH on the cell in which the CSI-ReportConfig is included, or to configure a
semi-persistent or aperiodic report sent on PUSCH triggered by DCI received on the
cell in which the CSI-ReportConfig is included (Here, the cell on which the report is
sent is determined by the received DCI). See TS 38.214 [19], clause 5.2.1.
CSI-ReportConfig information element
-- ASN1START
-- TAG-CSI-REPORTCONFIG-START
CSI-ReportConfig ::=            SEQUENCE {
  reportConfigId                  CSI-ReportConfigId,
  carrier                         ServCellIndex           OPTIONAL, -- Need S
  resourcesForChannelMeasurement  CSI-ResourceConfigId,
  csi-IM-ResourcesForInterference CSI-ResourceConfigId    OPTIONAL, -- Need R
  nzp-CSI-RS-ResourcesForInterference CSI-ResourceConfigId OPTIONAL, -- Need R
  reportConfigType                CHOICE {
    periodic                        SEQUENCE {
      reportSlotConfig                CSI-ReportPeriodicityAndOffset,
      pucch-CSI-ResourceList          SEQUENCE (SIZE (1..maxNrofBWPs)) OF PUCCH-CSI-Resource
    },
    semiPersistentOnPUCCH           SEQUENCE {
      reportSlotConfig                CSI-ReportPeriodicityAndOffset,
      pucch-CSI-ResourceList          SEQUENCE (SIZE (1..maxNrofBWPs)) OF PUCCH-CSI-Resource
    },
    semiPersistentOnPUSCH           SEQUENCE {
      report SlotConfig               ENUMERATED (s15, s110, s120, s140, s180, s1160, s1320},
      reportSlotOffsetList            SEQUENCE (SIZE (1..maxNrofUL-Allocations)) OF INTEGER(0..32),
      p0alpha                         P0-PUSCH-AlphaSet Id
    },
    aperiodic                       SEQUENCE {
      reportSlotOffsetList            SEQUENCE (SIZE (1..maxNrofUL-Allocations)) OF INTEGER(0..32)
    }
  },
  reportQuantity                  CHOICE {
    none                            NULL,
    cri-RI-PMI-CQI                  NULL,
    cri-RI-i1                       NULL,
    cri-RI-i1-CQI                   SEQUENCE {
      pdsch-BundleSizeForCSI          ENUMERATED {n2, n4}     OPTIONAL -- Need S
    },
    cri-RI-CQI                      NULL,
    cri-RSRP                        NULL,
    ssb-Index-RSRP                  NULL,
    cri-RI-LI-PMI-CQI               NULL TABLE 32-continued

```
},
reportFreqConfiguration               SEQUENCE {
    cqi-FormatIndicator               ENUMERATED { widebandPMI, subbandCQI }
    pmi-FormatIndicator               ENUMERATED { widebandCQI, subbandPMI }      OPTIONAL, -- Need R
    csi-ReportingBand                 CHOICE {
        subbands3                         BIT STRING(SIZE(3)),
        subbands4                         BIT STRING(SIZE(4)),
        subbands5                         BIT STRING(SIZE(5)),
        subbands6                         BIT STRING(SIZE(6)),
        subbands7                         BIT STRING(SIZE(7)),
        subbands8                         BIT STRING(SIZE(8)),
        subbands9                         BIT STRING(SIZE(9)),
        subbands10                        BIT STRING(SIZE(10)),
        subbands11                        BIT STRING(SIZE(11)).
        subbands12                        BIT STRING(SIZE(12)),
        subbands13                        BIT STRING(SIZE(13)),
        subbands14                        BIT STRING(SIZE(14));
        subbands15                        BIT STRING(SIZE(15)),
        subbands16                        BIT STRING(SIZE(16)),
        subbands17                        BIT STRING(SIZE(17)),
        subbands18                        BIT STRING(SIZE(18)),
        . . . ,
        subbands19-v1530                  BIT STRING(SIZE(19))
    } OPTIONAL -- Need S
                                                                                  OPTIONAL, -- Need R
}
timeRestrictionForChannelMeasurements         ENUMERATED {configured, notConfigured},
timeRestrictionForInterferenceMeasurements    ENUMERATED {configured, notConfigured},
codebookConfig                        CodebookConfig                              OPTIONAL, -- Need R
dummy                                 ENUMERATED {n1, n2}                         OPTIONAL, -- Need R
groupBasedBeamReporting               CHOICE {
    enabled                               NULL,
    disabled                              SEQUENCE {
        nrofReportedRS                        ENUMERATED {n1, n2, n3, n4}         OPTIONAL -- Need S
    }
},
cqi-Table                             ENUMERATED {table1, table2, table3, spare1} OPTIONAL, -- Need R
subbandSize                           ENUMERATED (value1, value2},
non-PMI-PortIndication                SEQUENCE (SIZE (1..maxNrofNZP-CSI-RS-ResourcesPerConfig)) OF PortIndexFor8Ranks
                                                                                  OPTIONAL, -- Need R
. . . ,
[[
semiPersistentOnPUSCH-v1530           SEQUENCE {
    reportSlotConfig-v1530                ENUMERATED (s14, s18, s116)
}                                                                                 OPTIONAL Need R
]]
}
CSI-ReportPeriodicityAndOffset ::=    CHOICE {
    slots4                                INTEGER(0..3),
    slots5                                INTEGER(0..4),
    slots8                                INTEGER(0..7),
    slots10                               INTEGER(0..9),
    slots16                               INTEGER(0..15),
    slots20                               INTEGER(0..19),
    slots40                               INTEGER(0..39),
    slots80                               INTEGER(0..79),
    slots160                              INTEGER(0..159),
    slots320                              INTEGER(0..319)
}
PUCCH-CSI-Resource ::=                SEQUENCE {
    uplinkBandwidthPartId                 BWP-Id,
    pucch-Resource                        PUCCH-ResourceId
}
PortIndexFor8Ranks ::=                CHOICE {
    portIndex8                            SEQUENCE{
        rank1-8                               PortIndex8                          OPTIONAL, -- Need R
        rank2-8                               SEQUENCE(SIZE(2)) OF PortIndex8     OPTIONAL, -- Need R
        rank3-8                               SEQUENCE(SIZE(3)) OF PortIndex8     OPTIONAL, -- Need R
        rank4-8                               SEQUENCE(SIZE(4)) OF PortIndex8     OPTIONAL, -- Need R
        rank5-8                               SEQUENCE(SIZE(5)) OF PortIndex8     OPTIONAL, -- Need R
        rank6-8                               SEQUENCE(SIZE(6)) OF PortIndex8     OPTIONAL, -- Need R
        rank7-8                               SEQUENCE(SIZE(7)) OF PortIndex8     OPTIONAL, -- Need R
        rank8-8                               SEQUENCE(SIZE(8)) OF PortIndex8     OPTIONAL -- Need R
    },
    portIndex4                            SEQUENCE{
        rank1-4                               portIndex4                          OPTIONAL, -- Need R
        rank2-4                               SEQUENCE(SIZE(2)) OF PortIndex4     OPTIONAL, -- Need R
        rank3-4                               SEQUENCE(SIZE(3)) OF PortIndex4     OPTIONAL, -- Need R
        rank4-4                               SEQUENCE(SIZE(4)) OF PortIndex4     OPTIONAL -- Need R
    },
    portIndex2                            SEQUENCE{
```

TABLE 32-continued

```
        rank1-2                              PortIndex2                              OPTIONAL, -- Need R
        rank2-2                              SEQUENCE(SIZE(2)) OF PortIndex2         OPTIONAL -- Need R
    },
    portIndex1                               NULL
}
PortIndex8::=                                INTEGER (0..7)
PortIndex4::=                                INTEGER (0..3)
PortIndex2::=                                INTEGER (0..1)
-- TAG-CSI-REPORTCONFIG-STOP
-- ASN1STOP
```

CSI-ReportConfig field descriptions
carrier
Indicates in which serving cell the CSI-ResourceConfig indicated below are to be found.
If the field is absent, the resources are on the same serving cell as this report
configuration.
codebookConfig
Codebook configuration for Type-1 or Type-II including codebook subset restriction.
cqi Format Indicator
Indicates whether the UE shall report a single (wideband) or multiple (subband) CQI.
(see TS 38.214 [19], clause 5.2.1.4).
cqi-Table
Which CQI table to use for CQI calculation (see TS 38.214 [19], clause 5.2.2.1).
csi-IM-ResourcesForInterference
CSI IM resources for interference measurement. csi-ResourceConfigId of a CSI-
ResourceConfig included in the configuration of the serving cell indicated with the
field "carrier" above. The CSI-ResourceConfig indicated here contains only CSI-IM
resources. The bwp-Id in that CSI-ResourceConfig is the same value as the bwp-Id in the
CSI-ResourceConfig indicated by resourcesForChannelMeasurement.
csi-ReportingBand
Indicates a contiguous or non-contiguous subset of subbands in the bandwidth part which
CSI shall be reported for. Each bit in the bit-string represents one subband. The
right-most bit in the bit string represents the lowest subband in the BWP. The choice
determines the number of subbands (subbands3 for 3 subbands, subbands4 for 4 subbands,
and so on) (see TS 38.214 [19], clause 5.2.1.4). This field is absent if there are less
than 24 PRBs (no sub band) and present otherwise, the number of sub bands can be from 3
(24 PRBs, sub band size 8) to 18 (72 PRBs, sub band size 4).
dummy
This field is not used in the specification. If received it shall be ignored by the UE.
groupBasedBeamReporting
Turning on/off group beam based reporting (see TS 38.214 [19], clause 5.2.1.4)
non-PMI-Port Indication
Port indication for RI/CQI calculation. For each CSI-RS resource in the linked
ResourceConfig for channel measurement, a port indication for each rank R, indicating
which R ports to use. Applicable only for non-PMI feedback (see TS 38.214 [19], clause
5.2.1.4.2).
The first entry in non-PMI-Port Indication corresponds to the NZP-CSI-RS-Resource
indicated by the first entry in nzp-CSI-RS-Resources in the NZP-CSI-RS-ResourceSet
indicated in the first entry of nzp-CSI-RS-ResourceSetList of the CSI-ResourceConfig
whose CSI-ResourceConfigId is indicated in a CSI-MeasId together with the above CSI-
ReportConfigId; the second entry in non-PMI-PortIndication corresponds to the NZP-CSI-
RS-Resource indicated by the second entry in nzp-CSI-RS-Resources in the NZP-CSI-RS-
ResourceSet indicated in the first entry of nzp-CSI-RS-ResourceSetList of the same CSI-
ResourceConfig, and so on until the NZP-CSI-RS-Resource indicated by the last entry in
nzp-CSI-RS-Resources in the in the NZP-CSI-RS-ResourceSet indicated in the first entry
of nzp-CSI-RS-ResourceSetList of the same CSI-ResourceConfig. Then the next entry
corresponds to the NZP-CSI-RS-Resource indicated by the first entry in nsp-CSI-RS-
Resources in the NZP-CSI-RS-ResourceSet indicated in the second entry of nzp-CSI-RS-
ResourceSetList of the same CSI-ResourceConfig and so on.
nrofReportedRS
The number (N) of measured RS resources to be reported per report setting in a non-
group-based report. N <= N_max, where N_max is either 2 or 4 depending on UE
capability.
(see TS 38.214 [19], clause 5.2.1.4) When the field is absent the UE applies the value
1
nzp-CSI-RS-ResourcesFor Interference
NZP CSI RS resources for interference measurement. csi-ResourceConfigId of a CSI-
ResourceConfig included in the configuration of the serving cell indicated with the
field "carrier" above. The CSI-ResourceConfig indicated here contains only NZP-CSI-RS
resources. The bwp-Id in that CSI-ResourceConfig is the same value as the bwp-Id in the
CSI-ResourceConfig indicated by resourcesForChannelMeasurement.
p0alpha
Index of the p0-alpha set determining the power control for this CSI report
transmission (see TS 38.214 [19], clause 6.2.1.2).
pdsch-BundleSizeForCSI
PRB bundling size to assume for CQI calculation when reportQuantity is CRI/RI/i1/CQI.
If the field is absent, the UE assumes that no PRB bundling is applied (see TS 38.214
[19], clause 5.2.1.4.2).
pmi-Format Indicator
Indicates whether the. UE shall report a single (wideband) or multiple (subband) PMI.
(see TS 38.214 [19], clause 5.2.1.4).

TABLE 32-continued pucch-CSI-ResourceList
Indicates which PUCCH resource to use for reporting on PUCCH.
reportConfigType
Time domain behavior of reporting configuration
reportFreqConfiguration
Reporting configuration in the frequency domain. (see TS 38.214 [19], clause 5.2.1.4).
reportQuantity
The CSI related quantities to report. Corresponds to L1 parameter 'ReportQuantity' (see
TS 38.214 [19], clause 5.2.1).
reportSlotConfig
Periodicity and slot offset (see TS 38.214 [19], clause 5.2.1.4).
reportSlotConfig-v1530
Extended value range for reportSlotConfig for semi-persistent CSI on PUSCH. If the
field is present, the UE shall ignore the value provided in the legacy field
(semiPersistentOnPUSCH. reportSlotConfig).
reportSlotOffsetList
Timing offset Y for semi persistent reporting using PUSCH. This field lists the allowed
offset values. This list must have the same number of entries as the pusch-
TimeDomainAllocationList in PUSCH-Config. A particular value is indicated in DCI. The
network indicates in the DCI field of the UL grant, which of the configured report slot
offsets the UE shall apply. The DCI value 0 corresponds to the first report slot offset
in this list, the DCI value 1 corresponds to the second report slot offset in this
list, and so on. The first report is transmitted in slot n+Y, second report in n+Y+P,
where P is the configured periodicity.
Timing offset Y for aperiodic reporting using PUSCH. This field lists the allowed
offset values. This list must have the same number of entries as the pusch-
TimeDomainAllocationList in PUSCH-Config. A particular value is indicated in DCI. The
network indicates in the DCI field of the UL grant, which of the configured report slot
offsets the UE shall apply. The DCI value 0 corresponds to the first report slot offset
in this list, the DCI value 1 corresponds to the second report slot offset in this
list, and so on (see TS 38.214 [19], clause 5.2.3).
resourcesForChannelMeasurement
Resources for channel measurement. csi-ResourceConfigId of a CSI-ResourceConfig
included in the configuration of the serving cell indicated with the field "carrier"
above. The CSI-ResourceConfig indicated here contains only NZP-CSI-RS resources and/or
SSB resources. This CSI-ReportConfig is associated with the DL BWP indicated by bwp-Id
in that CSI-ResourceConfig.
subbandSize
Indicates one out of two possible BWP-dependent values for the subband size as
indicated in TS 38.214 [19], table 5.2.1.4-2. If csi-ReportingBand is absent, the UE
shall ignore this field.
timeRestrictionForChannelMeasurements
Time domain measurement restriction for the channel (signal) measurements (see TS
38.214 [19], clause 5.2.1.1)
timeRestrictionForInterferenceMeasurements
Time domain measurement restriction for interference measurements (see TS 38.214 [19],
clause 5.2.1.1)

TABLE 33

CSI-ResourceConfig
The IE CSI-ResourceConfig defines a group of one or more NZP-CSI-RS-
ResourceSet, CSI-IM-ResourceSet and/or CSI-SSB-ResourceSet.
CSI-ResourceConfig information element
-- ASN1START
-- TAG-CSI-RESOURCECONFIG-START
```
CSI-ResourceConfig ::=      SEQUENCE {
   csi-ResourceConfigId       CSI-ResourceConfigId,
   csi-RS-ResourceSetList     CHOICE {
      nzp-CSI-RS-SSB            SEQUENCE {
         nzp-CSI-RS-ResourceSetList SEQUENCE (SIZE (1..maxNrofNZP-CSI-
         RS-ResourceSetsPerConfig)) OF NZP-CSI-RS-ResourceSetId
                     OPTIONAL, -- Need R
         csi-SSB-ResourceSetList    SEQUENCE (SIZE (1..maxNrofCSI-
         SSB-ResourceSetsPerConfig)) OF CSI-SSB-ResourceSetId
                     OPTIONAL -- Need R
      },
      csi-IM-ResourceSetList     SEQUENCE (SIZE (1..maxNrofCSI-IM-
      ResourceSetsPerConfig)) OF CSI-IM-ResourceSet Id
   },
   bwp-Id           BWP-Id,
   resourceType     ENUMERATED { aperiodic, semiPersistent, periodic },
   ...
```

TABLE 33-continued

```
}
-- TAG-CSI-RESOURCECONFIG-STOP
-- ASN1STOP
```
CSI-ResourceConfig field descriptions bwp-Id
The DL BWP which the CSI-RS associated with this CSI-ResourceConfig are located in (see TS 38.214 [19], clause 5.2.1.2
csi-ResourceConfigId
Used in CSI-ReportConfig to refer to an instance of CSI-ResourceConfig
csi-RS-ResourceSetList
Contains up to maxNrofNZP-CSI-RS-ResourceSetsPerConfig resource sets if ResourceConfigType is 'aperiodic' and 1 otherwise (see TS 38.214 [19], clause 5.2.1.2)
csi-SSB-ResourceSetList
List of SSB resources used for beam measurement and reporting in a resource set (see TS 38.214 [19], section FFS_Section)
resourceType
Time domain behavior of resource configuration (see TS 38.214 [19], clause 5.2.1.2). It does not apply to resources provided in the csi-SSB-ResourceSetList.

TABLE 34

NZP-CSI-RS-ResourceSet
The IE NZP-CSI-RS-ResourceSet is a set of Non-Zero-Power (NZP) CSI-RS resources (their IDs) and set-specific parameters.
NZP-CSI-RS-ResourceSet information element

```
-- ASN1START
-- TAG-NZP-CSI-RS-RESOURCESET-START
NZP-CSI-RS-ResourceSet ::=  SEQUENCE {
    nzp-CSI-ResourceSetId      NZP-CSI-RS-ResourceSet Id,
    nzp-CSI-RS-Resources       SEQUENCE (SIZE (1..maxNrofNZP-CSI-RS-ResourcesPerSet))
                               OF NZP-CSI-RS-ResourceId,
    repetition                 ENUMERATED { on, off }     OPTIONAL, -- Need S
    aperiodicTriggeringOffset; INTEGER(0..6)              OPTIONAL, -- Need S
    trs-Info                   ENUMERATED {true}          OPTIONAL, -- Need R
    ...
}
-- TAG-NZP-CSI-RS-RESOURCESET-STOP
-- ASN1STOP
```
NZP-CSI-RS-ResourceSet field descriptions aperiodicTriggeringOffset
Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0.
nzp-CSI-RS-Resources
NZP-CSI-RS-Resources associated with this NZP-CSI-RS resource set (see TS 38.214 [19], clause 5.2). For CSI, there are at most 8 NZP CSI RS resources per resource set
repetition
Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see TS 38.214 [10], clauses 5.2.2.3.1 and 5.1.6.1.2). Can only be configured for CSI-RS resource sets which are associated with CSI-ReportConfig with report of L1 RSRP or "no report"
trs-Info
Indicates that the antenna port for all NZP-CSI-RS resources in the CSI-RS resource set is same. If the field is absent or released the UE applies the value "false" (see TS 38.214 [19], clause 5.2.2.3.1).

TABLE 35

CSI-SSB-ResourceSet
The IE CSI-SSB-ResourceSet is used to configure one SS/PBCH block resource set which refers to SS/PBCH as indicated in ServingCellConfigCommon.
CSI-SSB-ResourceSet information element

```
-- ASN1START
-- TAG-CSI-IM-RESOURCESET-START
CSI-IN-ResourceSet ::=    SEQUENCE {
    csi-IM-ResourceSetId    CSI-IM-ResourceSet Id,
    csi-IM-Resources        SEQUENCE (SIZE(1..maxNrofCSI-IM-
                            ResourcesPerSet)) OF CSI-IM-ResourceId,
    ...
}
-- TAG-CSI-IM-RESOURCESET-STOP
-- ASN1STOP
```

TABLE 36

CSI-IM-ResourceSet
The IE CSI-IM-ResourceSet is used to configure a set of one or more CSI Interference Management (IM) resources (their IDs) and set-specific parameters.
CSI-IM-ResourceSet information element
-- ASN1START
-- TAG-CSI-IM-RESOURCESET-START
CSI-IN-ResourceSet ::=      SEQUENCE {
   csi-IM-ResourceSetId      CSI-IM-ResourceSet Id,
   csi-IM-Resources          SEQUENCE (SIZE(1..maxNrofCSI-IM-ResourcesPerSet)) OF CSI-IN-ResourceId,
...
}
-- TAG-CSI-IM-RESOURCESET-STOP
-- ASN1STOP
CSI-IM-ResourceSet field descriptions csi-IM-Resources
CSI-IM-Resources associated with this CSI-IM-ResourceSet (see TS 38.214 [19], clause 5.2)

TABLE 37

CSI-AperiodicTriggerStateList
The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.
CSI-AperiodicTriggerStateList information element
-- ASN1START
-- TAG-CSI-APERIODICTRIGGERSTATELIST-START
CSI-AperiodicTriggerStateList ::=   SEQUENCE (SIZE (1..maxNrOfCSI-AperiodicTriggers)) OF CSI-AperiodicTriggerState
CSI-AperiodicTriggerState ::=       SEQUENCE {
   associatedReportConfigInfoList      SEQUENCE (SIZE(1..maxNrofReportConfigPerAperiodicTrigger)) OF CSI-AssociatedReportConfigInfo,
   ...
}
CSI-AssociatedReportConfigInfo ::=  SEQUENCE {
   reportConfigId            CSI-ReportConfigId,
   resourcesForChannel       CHOICE {
      nzp-CSI-RS                SEQUENCE {
         resourceSet               INTEGER (1..maxNrofNZP-CSI-RS-ResourceSetsPerConfig),
         qcl-info                  SEQUENCE (SIZE(1..maxNrofAP-CSI-RS-ResourcesPerSet )) OF TCI-StateId OPTIONAL - Cond Aperiodic
      },
      csi-SSB-ResourceSet       INTEGER (1..maxNrofCSI-SSB-ResourceSetsPerConfig)
   },
   csi-IM-ResourcesFor Interference      INTEGER(1..maxNrofCSI-IM-ResourceSetsPerConfig)      OPTIONAL, - Cond CSI-IM-For Interference
   nzp-CSI-RS-ResourcesFor Interference INTEGER (1..maxNrofNZP-CSI-RS-ResourceSetsPerConfig)      OPTIONAL, - Cond NZP-CSI-RS-For Interference
   ...
}
-- TAG CSI-APERIODICTRIGGERSTATELIST-STOP
-- ASN1STOP
CSI-AssociatedReportConfigInfo field descriptions csi-IM-ResourcesFor Interference
CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.
csi-SSB-ResourceSet
CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).
nzp-CSI-RS-ResourcesForInterference
NZP-CSI-RS-ResourceSet for interference measurement. Entry number in nzp-CSI-RS-ResourceSetList in the CSI-ResourceConfig indicated by nzp-CSI-RS-ResourcesFor Interference in the CSI-ReportConfig indicated by reportConfigId above (1 corresponds to the first entry, 2 to the second entry, and so on).
qcl-info
List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qel-info-forChannel corresponds to second entry in nzp-CSI-RS-

TABLE 37-continued

Resources, and so on (see TS 38.214 [19], clause 5.2.1.5.1)
reportConfigId
The reportConfigId of one of the CSI-ReportConfigToAddMod configured in CSI-MeasConfig
resourceSet
NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to thesecond entry, and so on).

| Conditional Presence: | Explanation |
|---|---|
| Aperiodic | The field is mandatory present if the NZP-CSI-RS-Resources in the associated resourceSet have the resourceType aperiodic. The field is absent otherwise. |
| CSI-IM-For Interference | This field is optional need M if the CSI-ReportConfig identified by reportConfigId is configured with csi-IM-ResourcesFor Interference; otherwise it is absent. |
| NZP-CSI-RS-For Interference | This field is optional need M if the CSI-ReportConfig identified by reportConfigId is configured with nzp-CSI-RS-ResourcesFor Interference; otherwise it is absent. |

TABLE 38

CSI-SemiPersistentOnPUSCH-TriggerStateList
The CSI-SemiPersistentOnPUSCH-TriggerStateList IE is used to configure the UE with list of trigger states for semi-persistent reporting of channel state information on L1. See also TS 38.214 [19], clause 5.2.
CSI-SemiPersistentOnPUSCH-TriggerStateList information element
-- ASN1START
-- TAG-CSI-SEMIPERSISTENTONPUSCHTRIGGERSTATELIST-START
CSI-SemiPersistentOnPUSCH-TriggerStateList ::= SEQUENCE(SIZE (1..maxNrOfSemiPersistentPUSCH-Triggers))
OF CSI-SemiPersistentOnPUSCH-TriggerState
CSI-SemiPersistentOnPUSCH-TriggerState ::=    SEQUENCE {
    associatedReportConfigInfo                CSI-ReportConfigId,
    ...
}
-- TAG-CSI-SEMIPERSISTENTONPUSCHTRIGGERSTATELIST-STOP
-- ASN1STOP With regard to the aforementioned CSI report setting (CSI-ReportConfig), each report setting CSI-ReportConfig is associated with one or more CSI resource settings, that is, CSI-ResourceConfig. The association relationship between the CSI report setting and the CSI resource setting may be indicated by the following parameters in CSI-ReportConfig.

carrier: indicates a cell/component carrier (CC) to which a CSI resource setting associated with a CSI report setting belongs resourcesForChannelMeasurement: indicates a CSI resource setting for channel measurement associated with a CSI reporting setting.

csi-IM-ResourcesForinterference: indicates a CSI resource setting being configured by a CSI-IM resource for interference measurement associated with a CSI report setting nzp-CSI-RS-ResourcesForinterference: indicates a CSI resource setting being configured by a CSI-RS resource for interference measurement associated with a CSI report setting.

The UE performs CSI reporting based on the channel state information measured by the CSI-RS or the CSI-IM resource in the associated CSI resource setting according to the relationship.

As a time domain reporting operation with respect to each report setting CSI-ReportConfig, 'Aperiodic', 'Semi-Persistent', and 'Periodic' methods are supported, which may be configured by a base station to a UE by a reportConfigType parameter configured from a higher layer. The type of an uplink resource to which a CSI report is to be transmitted is determined according to a time domain reporting operation. Aperiodic CSI reporting of a UE is performed using a PUSCH, periodic CSI reporting is performed using a PUCCH, and with regard to semi-persistent CSI reporting, 'PUCCH-based semi-persistent (semi-PersistentOnPUCCH)' or 'PUSCH-based semi-persistent (semi-PersistentOnPUSCH)' reporting is supported. In case that semi-persistent CSI reporting is triggered or activated by DCI, the report is performed using a PUSCH, and when the semi-persistent CSI reporting is activated by a MAC control element (MAC CE), the report is performed using a PUCCH. In a case of the periodic or semi-persistent CSI reporting method, the UE may receive configuration of a PUCCH or PUSCH resource for transmitting CSI from the base station through higher layer signaling. The period and slot offset of the PUCCH or PUSCH resource for transmitting CSI may be given based on a numerology of an uplink (UL) bandwidth part configured to which a CSI report is to be transmitted. In a case of the aperiodic CSI reporting method, the UE may receive scheduling of a PUSCH resource for transmitting CSI from the base station through L1 signaling (DCI, for example, the DCI format 0_1 described above).

With regard to the above-described CSI resource setting (CSI-ResourceConfig), each CSI resource setting CSI-ReportConfig may include S (≥1) CSI resource sets (configured as a higher layer parameter csi-RS-ResourceSetList). The CSI resource set list may include a non-zero power (NZP) CSI-RS resource set and an SS/PBCH block set, or may include a CSI-interference measurement (CSI-IM) resource set. Each CSI resource configuration may be located in a downlink (DL) bandwidth part identified by a higher layer parameter bwp-id. The time domain operation of the CSI-RS resource in the CSI resource configuration may be configured as one of 'aperiodic', 'periodic', or 'semi-persistent' from a higher layer parameter resourceType. With regard to periodic or semi-persistent CSI resource setting, the number of CSI-RS resource sets may be limited to S=1, and the configured period and slot offset may be given based on a numerology of a downlink bandwidth part identified by bwp-id.

There is a limitation on mutual time domain operation between the CSI reporting setting and the CSI resource setting associated therewith. For example, it is not possible to associate the aperiodically configured CSI resource setting with the periodically configured CSI reporting setting. A combination between the CSI reporting settings and the CSI resource configuration may be supported based on the Table 39 below.

TABLE 39

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI report may be triggered by a "CSI request" indicator field of the aforementioned DCI format 0_1 or 0_2 corresponding to the scheduling DCI for a PUSCH. The UE may monitor a PDCCH, obtain control information accompanied with DCI format 0_1 or 0_2, and obtain scheduling information for the PUSCH and a CSI request indicator from the control information. The CSI request indicator may be configured to be NTS(=0, 1, 2, 3, 4, 5, or 6) bits, and the number of bits of the CSI request indicator may be determined via higher layer signaling (reportTriggerSize). The CSI request indicator field may be mapped to one trigger state, and the mapping between the indicator field and the trigger state is indicated by a higher layer parameter CSI-AperiodicTriggerStateList. Each trigger state may indicate one CSI resource set in one aperiodic CSI reporting setting and the CSI resource setting associated therewith. The indicating of the CSI resource set is to notify that, when two or more CSI resource sets are included in the CSI resource setting, CSI reporting is performed based on a CSI resource set among the CSI resource sets. On the other hand, the number of fields of the CSI request indicator and the number of trigger states of the higher layer parameter CSI-AperiodicTriggerStateList may be inconsistent. In this regard, the CSI request indicator may be interpreted as follows.

When the CSI request indicator indicates 0 (all bit values are 0), this may denote that no CSI report is requested.

In case that the number (M) of CSI trigger states in the configured CSI-AperiodicTriggerStateLite is greater than $2^{NTs}-1$, M CSI trigger states may be mapped to $2^{NTs}-1$ according to a predefined mapping relationship, and one trigger state among $2^{NTs}-1$ trigger states may be indicated by a CSI request field.

In case that the number (M) of CSI trigger states in the configured CSI-AperiodicTriggerStateList is less than or equal to $2^{NTs}-1$, one of the M CSI trigger states may be indicated by the CSI request field.

Table 40 below shows an example of a relationship between a CSI request indicator and a CSI trigger state that may be indicated by the indicator.

TABLE 40

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1<br>CSI report#2 | CSI resource#1,<br>CSI resource#2 |
| 10 | CSI trigger state#2 | CSI report#3 | CSI resource#3 |
| 11 | CSI trigger state#3 | CSI report#4 | CSI resource#4 |

Figure 10:
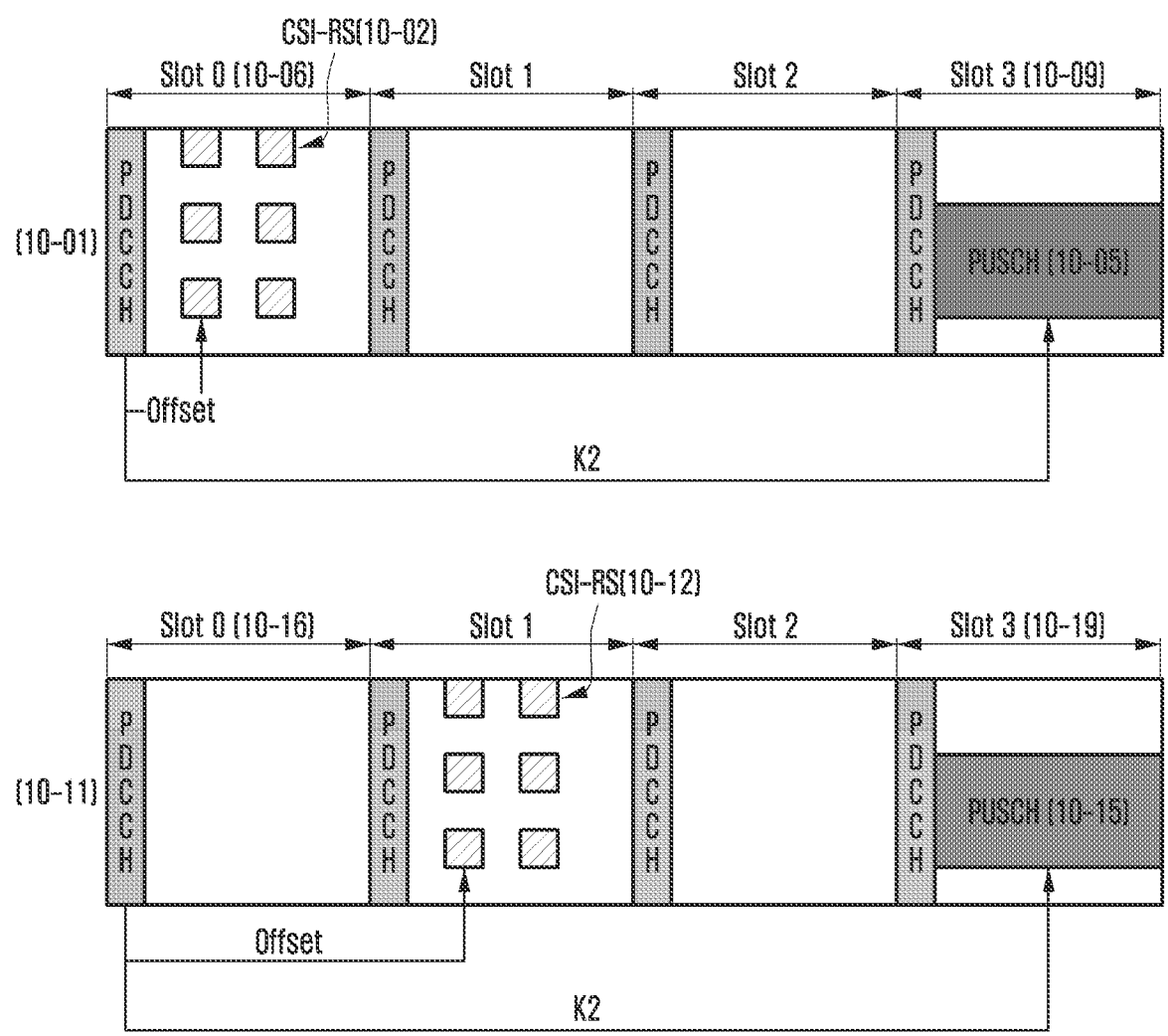
FIG. 10 illustrates an example of an aperiodic CSI reporting method in a wireless communication system according to an embodiment of the disclosure.

The UE may perform measurement on the CSI resource in the CSI trigger state triggered by the CSI request field, and may generate CSI (including at least one of the above-described CQI, PMI, CRI, SSBRI, LI, RI, or L1-RSRP). The UE may transmit the acquired CSI using the PUSCH scheduled by the corresponding DCI format 0_1. When 1 bit corresponding to an uplink data indicator (UL-SCH indicator) in DCI format 0_1 indicates "1", the UE may multiplex the uplink data (UL-SCH) and the acquired CSI into the PUSCH resource scheduled by DCI format 0_1 and transmit the same. When 1 bit corresponding to the uplink data indicator (UL-SCH indicator) in DCI format 0_1 indicates "0", the UE may perform transmission by mapping only CSI without uplink data (UL-SCH) to the PUSCH resource scheduled by DCI format 0_1. FIG. 10 illustrates an example of an aperiodic CSI reporting method in a wireless communication system according to an embodiment of the disclosure.

In an embodiment of FIG. 10, a UE may acquire DCI format 0_1 or 0_2 by monitoring a PDCCH 10-01, and may acquire scheduling information and CSI request information for a PUSCH 10-05 therefrom. The UE may acquire resource information for a CSI-RS 10-02 to be measured from the received CSI request indicator. The UE may determine a time point at which the CSI-RS 10-02 resource to be transmitted should be measured, based on a time point at which DCI format 0_1 or 0_2 is received and the CSI resource set configuration (e.g., a parameter (the above described aperiodicTriggeringOffset) with regard to an offset in the NZP CSI-RS resource set configuration (NZP-CSI-RS-ResourceSet)). More specifically, the UE may receive configuration of the offset value X of the parameter aperiodicTriggeringOffset in the NZP-CSI-RS resource set configuration by higher layer signaling from the base station, and the configured offset value X may denote an offset between a slot in which DCI for triggering aperiodic CSI reporting and a slot in which the CSI-RS resource is transmitted. For example, the aperiodicTriggeringOffset parameter value and the offset value X may have a mapping relationship described in Table 41 below.

TABLE 41

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

FIG. 10 shows an example in which the above-described offset value is configured as X=0. Here, the UE may receive the CSI-RS 10-02 in a slot (corresponding to slot 0 in FIG. 10) in which DCI format 0_1 for triggering aperiodic CSI reporting is received, and may report CSI information, which is measured using the received CSI-RS, to the base station through the PUSCH 10-05. The UE may acquire scheduling information for the PUSCH 10-05 for CSI reporting (pieces of information corresponding to each field of the DCI format 0_1 described above) from DCI format 0_1. For example, in DCI format 0_1, the UE may acquire information about a slot in which the PUSCH 10-05 is to be transmitted, from the above described time domain resource allocation information for the PUSCH 10-05. In an example of FIG. 10, the UE has acquired K2 value corresponding to the slot offset value for the PDCCH-to-PUSCH as 3, and accordingly, the PUSCH 10-05 may be transmitted at a time when the PDCCH 10-01 has been received, that is, in slot 3 10-09 which is three slots away from slot 0 10-06. Another embodiment of FIG. 10, the UE may acquire DCI format 0_1 by monitoring a PDCCH 10-11, and may acquire scheduling information and CSI request information with regard to a PUSCH 10-15 therefrom. The UE may acquire resource information on the CSI-RS 10-12 to be measured from the received CSI request indicator. FIG. 10 shows an example in which the offset value for the aforementioned CSI-RS is configured as X=1. Here, the UE may receive a CSI-RS 10-12 in the following slot (slot 1 of FIG. 10) of a slot in which DCI format 0_1 for triggering aperiodic CSI reporting is received (corresponding to slot 0 10-16 of FIG. 10), and may report the CSI information measured using the received CSI-RS to the base station through the PUSCH 10-15.

In the NR system, a tracking RS (that is, TRS) may be configured for fine time/frequency tracking of the base station. The TRS can be referred to as another term such as CSI-RS for tracking in the standard. However, in the specification, it will be referred to as TRS for convenience of explanation. The TRS may be transmitted in one (X=1) or two (X=2) consecutive slots according to a specific period such as 10 ms or 20 ms, and this is called TRS burst.

Figure 11:
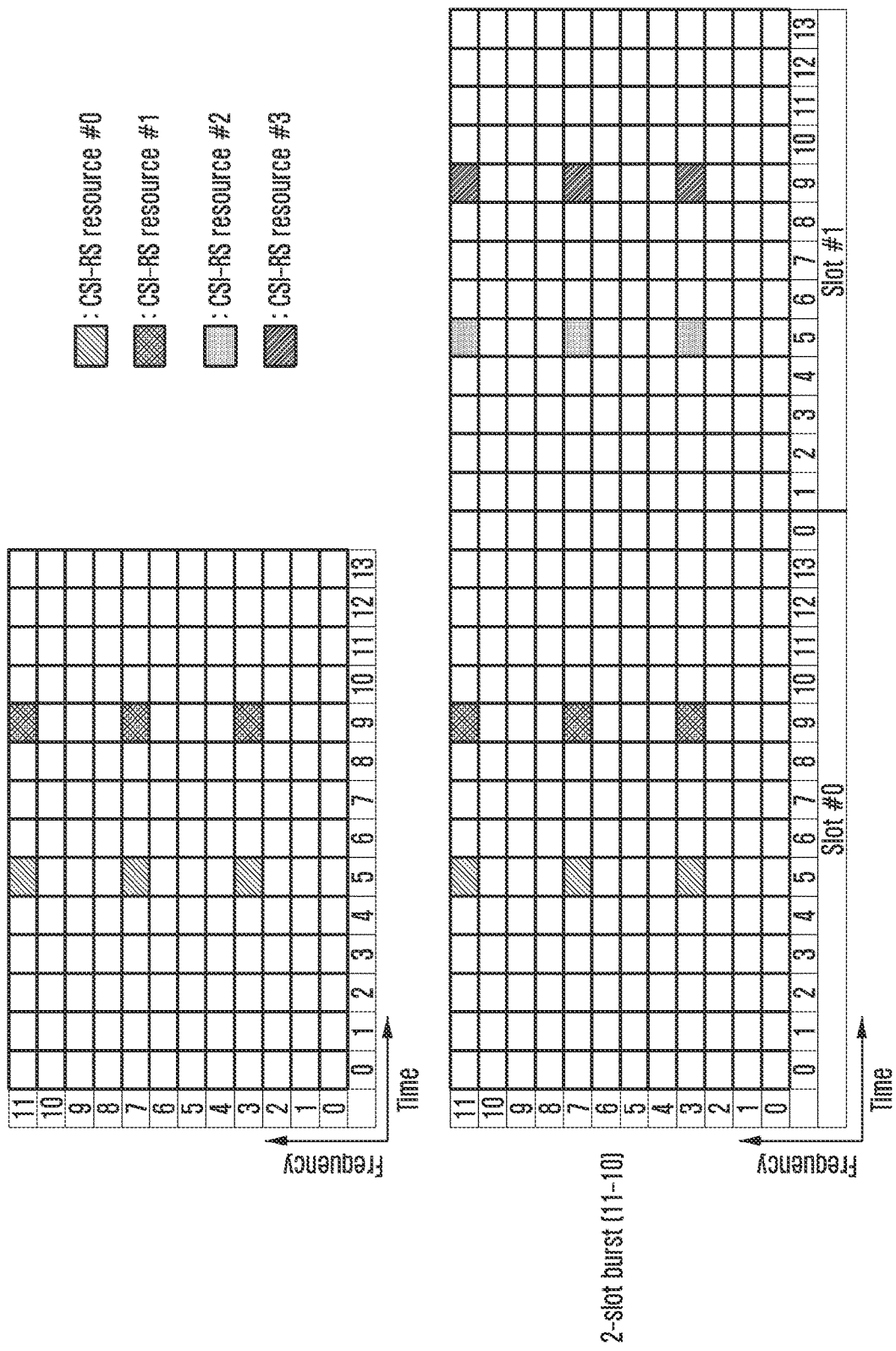
FIG. 11 illustrates an RE pattern of a tracking reference signal (TRS) according to some embodiments.

FIG. 11 illustrates an RE pattern of a TRS according to some embodiments.

Referring to FIG. 11, examples of possible TRS patterns within one slot are shown. As shown in FIG. 11, the TRS may include multiple single-port CSI-RS resources having a frequency RE density of 3 REs per 1RB (3 RE/RB), and the number of CSI-RS resources that can be located within one slot may be two. According to some embodiments, in a frequency band of 6 GHz or less which is referred to as frequency range 1 (FR1), TRS may be transmitted as indicated by reference numeral 11-10 over two consecutive slots, that is, X=2. A symbol pair in which the CSI-RS resource may be located within each slot may be one of [{5th, 9th}, {6th, lath}, and {7th, 11th}]. That is, one TRS transmission may be configured by four CSI-RS resources spanning two consecutive slots.

In a frequency band of 6 GHz or higher which is referred to as frequency range 2 (FR2), a TRS transmission structure (indicated by reference numeral 11-00) configured by two CSI-RS resources, transmitted within one slot, that is, X=1, may be used together with the TRS burst structure of FR1. Here, symbol pairs in which the CSI-RS resource may be located in a slot are [{1st, 5th}, {2nd, 6th}, {3rd, 7th}, {4th, 8th}, {5th, 9th}, {6th, 10th}, {7th, 11th}, {8th, 12th}, {9th, 13th}, and {10th, 14th}]. It should be noted that the OFDM symbol position in FIG. 11 is an example of TRS configuration, and the actual transmission position may be changed according to base station transmission.

Figure 12:
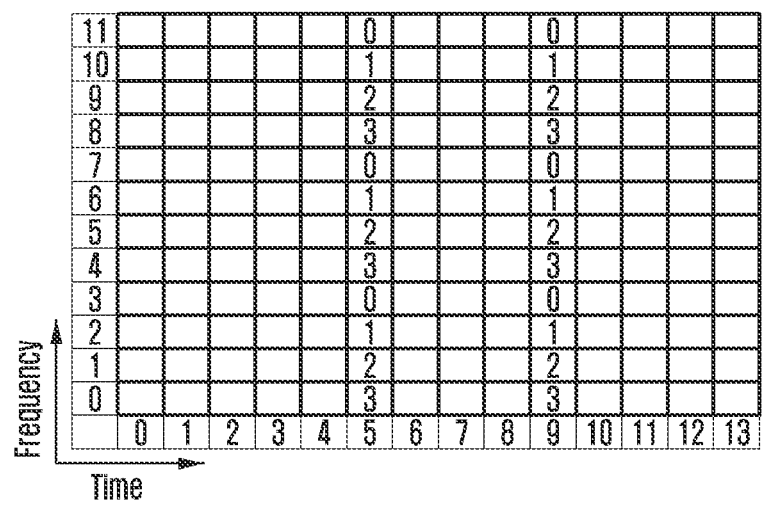
FIG. 12 illustrates a single port CSI-RS configuration according to some embodiments.

FIG. 12 illustrates a single-port CSI-RS configuration according to some embodiments.

Referring to FIG. 12, an example of a single-port CSI-RS configuration for covering the TRS pattern of FIG. 11 is shown. A base station may configure one CSI resource set in one CSI resource configuration (CSI resource config) and configure up to four CSI-RS resources therein. Here, the frequency density of the CSI-RS is configured to be 3 RE/RB/port. If X=1 TRS burst is used, the base station may configure CSI-RS resources #0 and #1, and if X=2 TRS burst is used, the base station may configure all of CSI-RS resources #0, #1, #2, and #3. In case that X=1 or X=2 TRS burst, the UE may assume the same antenna port having the same port index with regard to the CSI-RS resources configured in one resource set, and based on this, enable continuous time/frequency tracking to be performed. When CSI-RS resources in one CSI resource set are used as TRS, the base station may configure the trs-Info parameter in the CSI resource set to be 'true'. Here, since CSI reporting is not required for the CSI-RS resource used as the TRS, the report setting (CSI-ReportConfig) corresponding to the CSI resource set is caused not to be configured (that is, there is no report setting referring to the CSI-RS resource), or the setting value of the report setting is caused to be 'none', so that it can be ensured that the UE uses the corresponding CSI-RS resources for time/frequency tracking and does not need to generate a CSI report.

In FIG. 12, subcarrier positions and OFDM symbol positions of 1-port CSI-RS resources may be properly changed according to the TRS subcarrier position of FIG. 11.

The TRS can be transmitted in various forms, such as periodic and aperiodic. The periodic TRS (P-TRS) may be transmitted periodically until RRC reconfiguration according to the period and slot offset value configured by the RRC. The aperiodic TRS (A-TRS) may be triggered and transmitted by a MAC CE or DCI without configuring a period or slot offset value. Here, A-TRS triggering and A-TRS transmission timing can have an offset configured via a higher layer or follow a predetermined value (e.g., A-TRS is transmitted in the same slot as that of A-TRS triggering).

The aperiodic TRS may be associated with periodic TRS because it may be difficult to measure channel statistical characteristics due to insufficient number of time-domain REs. The association between A-TRS and P-TRS can be supported through various methods such as quasi co-location (QCL). For example, the base station may configure at least one P-TRS in the A-TRS as a QCL reference RS to enable extraction of channel statistics values such as delay spread, average delay, Doppler spread, and Doppler shift (QCL type A), or to enable extraction of spatial parameters such as TX beam and RX beam (QCL type D).

In addition, the TRS receives allocation of bandwidth information from the higher layer parameter freqBand. In case that the bandwidth of the BWP through which the TRS is transmitted is less than 52 RB, the bandwidth of the TRS is the same as the bandwidth of the BWP, and in case that the bandwidth of the BWP through which the TRS is transmitted is equal to or greater than 52 RB, the bandwidth of the TRS is configured to be 52 RB.

Next, a sounding reference signal (SRS) for uplink channel measurement will be described in detail. The base station may instruct the UE to transmit SRS for uplink channel measurement, and the UE may transmit the SRS according to the instruction.

Figure 13:
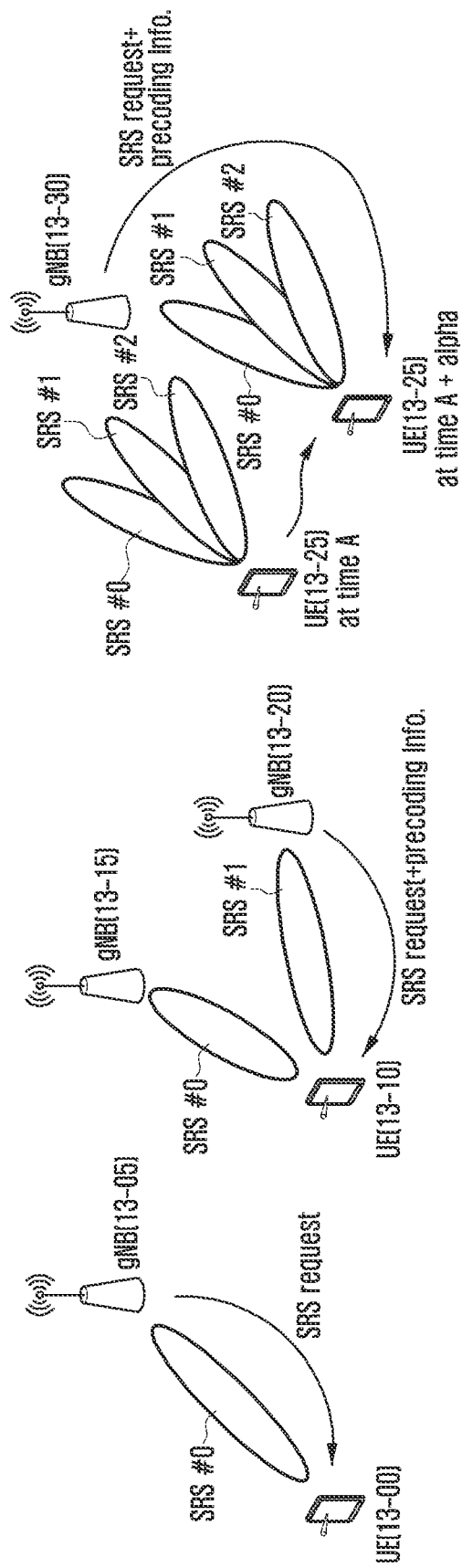
FIG. 13 illustrates examples of various operating scenarios of SRS.

FIG. 13 illustrates examples of various operating scenarios of SRS.

Referring to FIG. 13, it is possible to consider at least the following three SRS operation scenarios in an NR system.
1) A base station 13-05 may configure a beam in one direction to a UE 13-00 (in the specification, configuring the beam/precoding in one direction may include not applying the beam/precoding or applying a wide beam (cell-coverage or sector coverage). In a case of periodic SRS or semi-persistent SRS, the UE 13-00 transmits the SRS according to the transmission period and offset of the SRS, and in a case of aperiodic SRS, the UE 13-00 transmits the SRS according to the SRS request of the base station (at a predetermined time after the SRS request). Here, additional information for beam/precoding is not required for the SRSs.
2) Base stations 13-15 and 13-20 may configure beams to a UE 13-10 in one or more directions, and the UE 13-10 may transmit multiple SRS beamformed in the one or more directions. For example, as in the example of FIG. 13, it is possible to configure SRS resource (or port) #0 to be beamformed to the base station 13-15 and SRS resource (or port) #1 to be beamformed to the base station 13-20. Here, the base stations 13-15 and 13-20 need to notify of not only the SRS request but also the SRS beam/precoding information, differently from the method 1).
3) A base station 13-30 may configure beams in one or more directions to a UE 13-25, and the UE 13-25 may transmit multiple SRS beamformed in the one or more directions. For example, as in the example of FIG. 13, the base station may configure for the UE to transmit the SRS by applying different beams/precodings to SRS resource (or port) #0, SRS resource (or port) #1, and SRS resource (or port) #2. Through this, even when the mobility of the UE is high, stable communication can be performed through beam/precoder diversity. For example, the UE 13-25 may provide channel state information to the base station 13-30 with SRS #2 at time A, and provide channel state information to the base station 13-30 with SRS #0 at time A+alpha. Here, the base station 13-30 needs to notify of not only the SRS request but also the SRS beam/precoding information, unlike the method 1).

Although the above descriptions are based on SRS transmission, similarly, it is possible to extend to other UL channel and/or RS transmissions such as PRACH, PUSCH, and PUCCH, and detailed descriptions of all cases are omitted so as not to obscure the gist of the disclosure.

Figure 14:
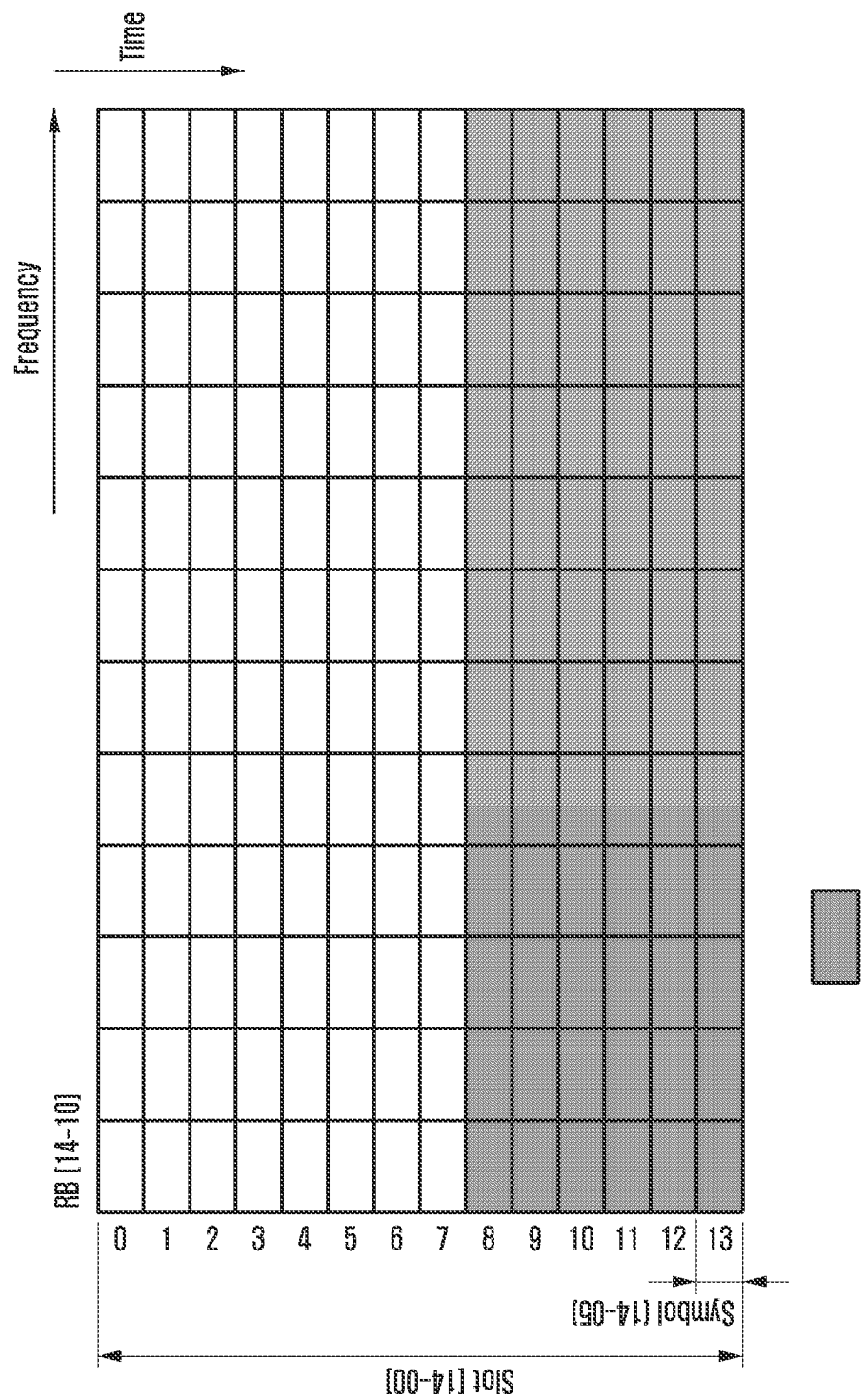
FIG. 14 illustrates an uplink transmission structure of a wireless communication system according to an embodiment of the disclosure.

FIG. 14 illustrates an uplink transmission structure of a wireless communication system according to an embodiment of the disclosure.

Referring to FIG. 14, the transmission basic unit of the 5G or NR system is a slot 14-00, and assuming a general cyclic prefix (CP) length, each slot may be configured by 14 symbols 14-05, and one symbol may correspond to one UL waveform (CP-OFDM or DFT-S-OFDM) symbol.

A resource block (RB) 14-10 is a resource allocation unit corresponding to one slot based on the time domain, and may be configured by 12 subcarriers based on the frequency domain.

The uplink structure may be largely divided into a data region and a control region. Unlike the LTE system, in the 5G or NR system, the control region may be configured and transmitted at a random position in the uplink. Here, the data region includes a series of communication resources including data such as voice and packets transmitted to each UE, and corresponds to the remaining resources except for the control region in a subframe. The control region includes a series of communication resources for a downlink channel quality report from each UE, reception ACK/NACK for a downlink signal, an uplink scheduling request, and the like.

The UE may transmit its own data and control information simultaneously in the data region and the control region. According to an embodiment, a symbol through which the UE can periodically transmit SRS in one slot may be the last six symbol periods 14-15, and may be transmitted through a preconfigured SRS transmission band within the UL BWP based on the frequency domain. However, this is an example, and a symbol capable of transmitting the SRS may be extended to another time interval or transmitted through a frequency band. RBs capable of transmitting SRS are transmitted in multiples of 4 RBs when transmitted in the frequency domain and may be transmitted in a maximum of 272 RBs.

In addition, according to an embodiment, the number of symbols N of the SRS may be configured to 1, 2, or 4, and may be transmitted as consecutive symbols. In addition, the 5G or NR system allows repeated transmission of SRS symbols. Specifically, the repetition factor (r) of the SRS symbol is $r \in \{1,2,4\}$, and here may be configured as $r \leq N$. For example, when one SRS antenna is mapped to one symbol and transmitted, up to 4 symbols may be repeatedly transmitted. Meanwhile, four different antenna ports may be transmitted in four different symbols. Here, since each antenna port is mapped to one symbol, repeated transmission of the SRS symbol is not allowed. The above-described example is only an example, and the number of symbols N and the repetition factor r of the SRS may be extended to other values.

The SRS may be configured with a constant amplitude zero auto correlation (CAZAC) sequence. In addition, CAZAC sequences configuring each SRS transmitted from several UEs have different cyclic shift values. In addition, CAZAC sequences generated through cyclic shift from one CAZAC sequence have a characteristic of having a correlation value of zero with sequences having a cyclic shift value different from that of each CAZAC sequence. Using this characteristic, SRSs simultaneously allocated to the same frequency domain may be classified according to a CAZAC sequence cyclic shift value configured for each SRS by the base station.

SRSs of several UEs may be classified according to frequency positions as well as cyclic shift values. The frequency position may be divided into SRS subband unit allocation or Comb. Comb2 and comb4 may be supported in the 5G or NR system. In a case of comb2, one SRS may be allocated only to the even-numbered or odd-numbered subcarriers in the SRS subband. Here, each of the even-numbered subcarriers and the odd-numbered subcarriers may configure one comb.

Each UE may be allocated with an SRS subband based on the tree structure. In addition, the UE may perform hopping on the SRS allocated to each subband at each SRS transmission time point. Accordingly, all transmission antennas of the UE may transmit the SRS by using the entire uplink data transmission bandwidth.

Figure 15:
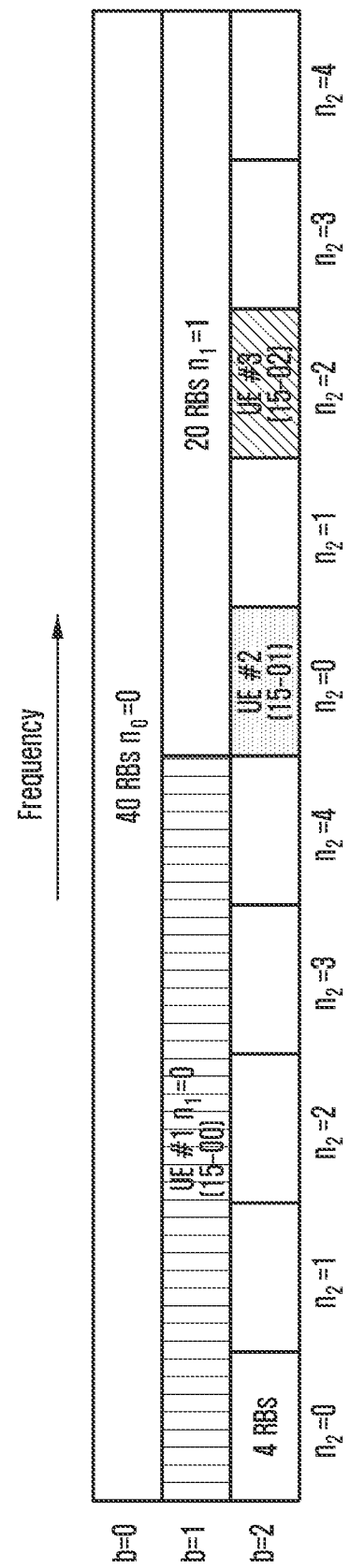
FIG. 15 illustrates a structure in which a sounding reference signal (SRS) is allocated for each sub-band.

FIG. 15 illustrates a structure in which SRS is allocated for each subband.

Referring to FIG. 15, when a data transmission band corresponding to 40 RBs in frequency is provided, an example in which SRS is allocated to each UE according to a tree structure configured by the base station is shown.

When the level index of the tree structure in FIG. 15 is "b", the highest level (b=0) of the tree structure may be configured by one SRS subband having a bandwidth of 40 RBs. In the second level (b=1), two SRS subbands with a bandwidth of 20 RBs may be generated from the SRS subbands of the b=0 level. Accordingly, two SRS subbands may exist in the entire data transmission band of the second level (b=1). In the third level (b=2), 5 4 RB SRS subbands are generated from one 20 RB SRS subband at the level immediately above (b=1), and 10 4RB SRS subbands exist in one level.

The tree structure may have various levels, SRS subband sizes, and the number of SRS subbands per level according to the configuration of the base station. Here, $N_b$ is the number of SRS subbands in level b generated from one SRS subband of a higher level, and index for the $N_b$ SRS subbands may be defined as $n_b=\{0, \ldots, N_b-1\}$. As the subbands per level change in this way, as shown in FIG. 15, a UE may be allocated to each subband per level. For example, UE 1 15-00 is allocated to the first SRS subband ($n_1=0$) among two SRS subbands having a 20 RB bandwidth at the b=1 level, and UE 2 15-01 and UE 3 15-02 may be allocated to the first SRS subband ($n_2=0$) and the third SRS subband ($n_2=2$) below the second 20 RB SRS subband, respectively. Through these processes, multiple UEs can simultaneously transmit SRS in multiple SRS subbands within one CC.

Specifically, for the above-described SRS subband configuration, NR supports SRS bandwidth configurations as shown in Table 42 below.

TABLE 42

| $C_{SRS}$ | $D_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |

TABLE 42-continued

| $C_{SRS}$ | $D_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

In addition, NR supports SRS frequency hopping based on the values of Table 42, and the detailed procedure follows Table 43 below.

TABLE 43

When SRS is transmitted on a given SRS resource, the sequence $r^{(p_i)}(n,l')$ for each OFDM symbol l' and for each of the antenna ports of the SRS resource shall be multiplied with the amplitude scaling factor $\beta_{SRS}$ in order to conform to the transmit power specified in [5, 38.213] and mapped in sequence starting with $r^{(p_i)}(0,l')$ to resource elements (k,l) in a slot for each of the antenna ports $p_i$ according to $$a^{(p_i)}_{K_{TC}k'+k_0^{(p_i)},l'+l_0} = \begin{cases} \dfrac{1}{\sqrt{N_{ap}}} \beta_{SRS} r^{(p_i)}(k',l') & k'=0,1,\ldots,M_{sc,b}^{SRS}-1 \; l'=0,1,\ldots,N_{symb}^{SRS}-1 \\ 0 & \text{otherwise} \end{cases}$$

The length of the sounding reference signal sequence is given by
$$M_{sc,b}^{SRS} = m_{SRS,b} N_{sc}^{RB}/K_{TC}$$
where $m_{SRS,b}$ is given by a selected row of Table 6.4.1.4.3-1 with $b = B_{SRS}$ where $B_{SRS} \in \{0, 1, 2, 3\}$ is given by the field b-SRS contained in the higher-layer parameter freqHopping. The row of the table is selected according to the index $C_{SRS} = \{0,1,\ldots,63\}$ given by the field c-SRS contained in the higher-layer parameter freqHopping.
The frequency-domain starting position $k_0^{(p_i)}$ is defined by $$k_0^{(p_i)} = \overline{k_0}^{(p_i)} + \sum_{b=0}^{B_{SRS}} K_{TC} M_{sc,b}^{SRS} n_b$$

where $$\overline{k_0}^{(p_i)} = n_{shift} N_{sc}^{RB} + k_{TC}^{(p_i)}$$

$$k_{TC}^{(p_i)} = \begin{cases} (\overline{k}_{TC} + K_{TC}/2) \bmod K_{TC} & \text{if } n_{SRS}^{cs} \in \{n_{SRS}^{cs,max}/2,\ldots,n_{SRS}^{cs,max}-1\} \text{ and} \\ & N_{ap}^{SRS} = 4 \text{ and } p_i \in \{1001,1003\} \\ \overline{k}_{TC} & \text{otherwise} \end{cases}$$

If $N_{BWP}^{start} \le n_{shift}$ the reference point for $k_0^{(p_i)} = 0$ is subcarrier 0 in common resource block 0, otherwise the reference point is the lowest subcarrier of the BWP.
The frequency domain shift value $n_{shift}$ adjusts the SRS allocation with respect to the reference point grid and is contained in the higher-layer parameter freqDomainShift in the SRS-Config IE. The transmission comb offset $\overline{k}_{TC} \in \{0,1,\ldots,K_{TC}-1\}$ is contained in the higher-layer parameter transmissionComb in the SRS-Config IE and $n_b$ is a frequency position index. Frequency hopping of the sounding reference signal is configured by the parameter $b_{hop} \in (0, 1, 2, 3)$, given by the field b-hop contained in the higher-layer parameter freqHopping. If $b_{hop} \ge B_{SRS}$, frequency hopping is disabled and the frequency position index $n_b$ remains constant (unless re-configured) and is defined by
$$n_b = \lfloor 4n_{RRC}/m_{SRS,b} \rfloor \bmod N_b$$
for all $N_{symb}^{SRS}$ OFDM symbols of the SRS resource. The quantity $n_{RRC}$ is given by the higher-layer parameter freqDomainPosition and the values of $m_{SRS,b}$ and $N_b$ for $b = B_{SRS}$ are given by the selected row of Table 6.4.1.4.3-1 corresponding to the configured value of $C_{SRS}$.
If $b_{hop} < B_{SRS}$, frequency hopping is enabled and the frequency position indices $n_b$ are defined by $$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}$$

where $N_b$ is given by Table 6.4.1.4.3-1, $$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS}/\prod_{b'=b_{hop}}^{b-1} N_{b'} \rfloor & \text{If } N_b \text{ odd} \end{cases}$$

and where $N_{b_{hop}} = 1$ regardless of the value of $N_b$. The quantity $n_{SRS}$ counts the number of SRS transmissions. For the case of an SRS resource configured as aperiodic by the higher-layer parameter resourceType, it is given by $n_{SRS} = \lfloor l'/R \rfloor$ within the slot in which the $N_{symb}^{SRS}$ symbol SRS resource is transmitted. The quantity $R \le N_{sym}^{SRS}$ is the repetition factor given by the field repetitionFactor contained in the higher-layer parameter resourceMapping.

As described above, the 5G or NR UE supports the single user (SU)-MIMO technique and has a maximum of 4 transmission antennas. In addition, the NR UEs may simultaneously transmit SRSs to multiple CCs or multiple SRS subbands within the CC. In a case of the 5G or NR system, unlike the LTE system, various numerology is supported, SRS transmission symbols may be configured in various ways, and repeated transmission for SRS transmission through a repetition factor may be allowed. Therefore, it is necessary to count SRS transmission in consideration of this. Counting the SRS transmission may be used in various ways. For example, counting SRS transmission may be utilized to support antenna switching according to SRS transmission. Specifically, at which SRS transmission time, an SRS corresponding to which antenna is transmitted in which band may be determined by SRS transmission counting.

The base station may configure configuration information for transmission of an uplink reference signal to the UE. Specifically, as shown in Table 44, the base station may indicate, to the UE, SRS configuration information for each uplink BWP in the form of higher layer signaling srs-Config.

TABLE 44

BWP-UplinkDedicated ::=    SEQUENCE {
pucch-Config            SetupRelease { PUCCH-Config }
OPTIONAL, -- Need M (PUCCH configuration for one BWP of support cell)
pusch-Config            SetupRelease { PUSCH-Config }
OPTIONAL, -- Need M (PUSCH configuration for one BWP of support cell)
configuredGrantConfig   SetupRelease { ConfiguredGrantConfig }
OPTIONAL, -- Need M (Configuration for type 1 or type 2 of the configured grant Configured-Grant:
)
srs-Config              SetupRelease { SRS-Config }
OPTIONAL, -- Need M (Uplink sounding reference signal (SRS) configuration)
beam FailureRecoveryConfig  SetupRelease { BeamFailureRecovery Config }
OPTIONAL, -- Cond SpCellOnly (Configuration for beam failure recovery)
...,
}

According to an embodiment, the detailed structure of the higher layer signaling srs-Config may include at least some of the parameters listed in Table 45.

TABLE 45

SRS-Config ::            SEQUENCE {
srs-ResourceSetToReleaseList    SEQUENCE (SIZE(1..maxNrofSRS-ResourceSets)) OF SRS-ResourceSetId    OPTIONAL, -- Need N
(List of SRS resource sets being release)
srs-ResourceSetToAddModList    SEQUENCE (SIZE(1..maxNrofSRS-ResourceSets)) OF SRS-ResourceSet    OPTIONAL, -- Need N
(List of SRS resource sets being added or modified)
srs-ResourceToReleaseList    SEQUENCE (SIZE(1..maxNrofSRS-Resources)) OF SRS-ResourceId    OPTIONAL, -- Need N
(List of SRS resources being released)
srs-ResourceToAddModList    SEQUENCE (SIZE(1..maxNrofSRS-Resources)) OF SRS-Resource    OPTIONAL, -- Need N
(List of SRS resources being added or modified)
tpc-Accumulation    ENUMERATED {disabled}
OPTIONAL, -- Need S
(Indicate whether to perform accumulation of TPC command)
...
}
SRS-ResourceSet ::=    SEQUENCE {
srs-ResourceSetId    SRS-ResourceSetId,
(SRS resource set identifier)
srs-ResourceIdList    SEQUENCE (SIZE(1..maxNrofSRS- TABLE 45-continued ResourcesPerSet)) OF SRS-ResourceId OPTIONAL, -- Cond Setup
(Identifiers of SRS-resources included in the corresponding SRS resource set)
resource Type            CHOICE { (Configure time domain operation of
SRS resource)
aperiodic            SEQUENCE { (Aperiodic SRS configuration)
aperiodicSRS-ResourceTrigger    INTEGER (1..maxNrofSRS-TriggerStates-1),( DCI code point for SRS transmission according to SRS resource set configuration of corresponding region)
csi-RS                NZP-CSI-RS-ResourceId
OPTIONAL, -- Cond NonCodebook (CSI-RS resource identifier associated with SRS resource set)
slotOffset            INTEGER (1..32)
OPTIONAL, -- Need S (Slot offset between DCI triggering time point and transmission of actual SRS resource set)
...,
[[
aperiodicSRS-ResourceTriggerList    SEQUENCE (SIZE(1..maxNrofSRS-TriggerStates-2))OF INTEGER (1..maxNrofSRS-TriggerStates-1)
OPTIONAL
-- Need M (List of additional DCI codepoints for SRS transmission according to SRS resource set configuration of corresponding region Semi-persistent)
]]
},
semi-persistent        SEQUENCE { (Semi-persistent SRS configuration)
associatedCSI-RS        NZP-CSI-RS-ResourceId
OPTIONAL, -- Cond NonCodebook (CSI-RS resource identifier associated with non-codebook based SRS resource set)
...
},
periodic            SEQUENCE { (Periodic SRS configuration)
associatedCSI-RS        NZP-CSI-RS-ResourceId
OPTIONAL, -- Cond NonCodebook
...
}
},
usage            ENUMERATED {beamManagement, codebook, nonCodebook, antennaSwitching}, (Indicate where to use the SRS resource
set)
alpha            Alpha        OPTIONAL, --
Need S (Alpha value for SRS power control)
p0            INTEGER (−202..24)
OPTIONAL, -- Cond Setup (P0 value for SRS power control)
pathlossReferenceRS        CHOICE {( Reference signal for SRS path loss estimation)
ssb-Index        SSB-Index (Path loss reference SSB/PBCH block index)
csi-RS-Index        NZP-CSI-RS-ResourceId (Path Loss Reference CSI-RS Resource Index)
}            OPTIONAL, -- Need M
srs-PowerControlAdjustmentStates    ENUMERATED { sameAsFci2, separateClosedLoop}    OPTIONAL, -- Need S (Indicate SRS power control adjustment performing method)
...
}
SRS-ResourceSetId ::=        INTEGER (0..maxNrofSRS-ResourceSets-1)
SRS-Resource ::=        SEQUENCE {
srs-ResourceId        SRS-ResourceId,( SRS resource identifier)
nrofSRS-Ports        ENUMERATED {port1, ports2, ports4},
( Number of SRS ports)
ptrs-PortIndex        ENUMERATED {n0, n1 }
OPTIONAL, -- Need R (PTRS port index of SRS resource for non-codebook based uplink MIMO support)
transmissionComb        CHOICE { (SRS comb value and comb offset, configure as comb value of 2 or 4)
n2        SEQUENCE {
combOffset-n2        INTEGER (0..1),( when comb value is 2, comb
offset)
cyclicShift-n2        INTEGER (0..7)( when comb value is 2, configure cyclic shift)
},
n4            SEQUENCE {

TABLE 45-continued

```
combOffset-n4        INTEGER (0..3), (when comb value is 4,
comb
offset)
cyclicShift-n4       INTEGER (0..11)(when comb value is 4,
configure cyclic shift)
}
},
resourceMapping      SEQUENCE { (OFDM symbol position
information of SRS resource)
startPosition        INTEGER (0..5),( Time domain SRS resource
position, 0 is mapped with last symbol, and 1 is mapped with second last
symbol)
nrofSymbols          ENUMERATED {n1, n2, n4},( Number of
OFDM symbols)
repetitionFactor     ENUMERATED {n1, n2, n4} ( Repetition
factor)
},
freqDomainPosition       INTEGER (0..67),( Frequency domain
position of SRS resource)
freqDomainShift          INTEGER (0..268), (Frequency domain shift
value of SRS resource)
freqHopping          SEQUENCE { (Frequency hopping information
of
SRS resource)
c-SRS          INTEGER (0..63),( CSRS information)
b-SRS          INTEGER (0..3),( BSRS information)
b-hop          INTEGER (0..3)( bhop information)
},
groupOrSequenceHopping       ENUMERATED { neither,
groupHopping, sequenceHopping },( Information on whether to perform
group hopping or sequence hopping on SRS resource)
resource Type         CHOICE {
aperiodic            SEQUENCE {
...
},
semi-persistent      SEQUENCE {
periodicity AndOffset-sp       SRS-PeriodicityAndOffset, (Period and slot
offset information for semi-persistent SRS resource)
...
},
periodic      SEQUENCE {
periodicity AndOffset-p        SRS-PeriodicityAndOffset, (Period and
slot offset information for periodic SRS resource)
...
}
},
sequenceId           INTEGER (0..1023),( Initial sequence identifier for
performing group hopping and sequence hopping)
spatialRelationInfo       SRS-SpatialRelationInfo
OPTIONAL, -- Need R (Configuration information of spatial relationship
between target SRS and reference RS)
...
}
SRS-Periodicity AndOffset ::=      CHOICE {
sl1            NULL,
sl2            INTEGER(0..1),
sl4            INTEGER(0..3),
sl5            INTEGER(0..4),
sl8            INTEGER(0..7),
sl10           INTEGER(0..9),
sl16           INTEGER(0..15),
sl20           INTEGER(0..19),
sl32           INTEGER(0..31),
sl40           INTEGER(0..39),
sl64           INTEGER(0..63),
sl80           INTEGER(0..79),
sl160          INTEGER(0..159),
sl320          INTEGER(0..319),
sl640          INTEGER(0..639),
sl1280         INTEGER(0..1279),
sl2560         INTEGER(0..2559)
}
```

One or more SRS resource sets may be included in srs-Config. One SRS resource set is configured by one or more SRS resources having the same time domain operation and usage. A time domain operation configurable for the SRS resource set may be one of 'periodic', 'semi-persistent', and 'aperiodic'. Meanwhile, the usage of the aforementioned SRS resource set is configured as a usage parameter in the SRS resource set, and may have a value of one of 'beamManagement: beam management', 'codebook: codebook-based uplink transmission', 'nonCodebook: non-codebook-based uplink transmission', and 'antennaSwitching: acquisition of downlink channel information using reciprocity'.

Meanwhile, time-frequency axis resource allocation information and frequency hopping information of SRS resources can be configured independently for each SRS resource. In addition, a spatial domain transmission filter to be used when the UE transmits an SRS resource can also be configured independently for each SRS resource. The spatial domain transmission filter may be indicated by a spatialRelationInfo parameter, and the parameter may include an index of a downlink or uplink reference signal. In case that the spatialRelationInfo parameter indicates the index of the CSI-RS resource or SSB, it can be understood that the UE uses the same spatial domain transmission filter as the spatial domain receive filter used when receiving the referenced CSI-RS resource or SSB. Alternatively, when spatial relation info refers to another SRS resource index, it can be understood that the UE uses the spatial domain transmission filter used when transmitting the referenced SRS resource.

Next, a rate matching operation and a puncturing operation will be described in detail.

When time and frequency resource A for transmission of predetermined symbol sequence A overlaps predetermined time and frequency resource B, a rate matching or puncturing operation may be considered as the transmission/reception operation of channel A in consideration of resource C corresponding to a region in which the resource A and the resource B overlap. A specific operation may follow the details below.

Rate Matching Operation

A base station may map the channel A to only the remaining resource regions except for resource C among the entire resource A for transmission of symbol sequence A to a UE, the resource C corresponding to a region in which the resource B overlap the resource A, and transmit the same. For example, when symbol sequence A is configured by {symbol #1, symbol #2, symbol #3, symbol 4}, the resource A is configured by {resource #1, resource #2, resource #3, resource #4}, and resource B is configured by {resource #3, resource #5}, the base station may sequentially map the symbol sequence A to {resource #1, resource #2, resource #4}, which are the remaining resources except for {resource #3} corresponding to the resource C among the resource A, and transmit the same. As a result, the base station may map the symbol sequence {symbol #1, symbol #2, symbol #3} to {resource #1, resource #2, resource #4}, respectively, and transmit the same.

The UE may determine the resource A and the resource B through scheduling information for symbol sequence A from a base station, and accordingly, the UE may determine resource C corresponding to a region where the resource A and the resource B overlap. The UE may receive the symbol sequence A under an assumption that the symbol sequence A is mapped to the remaining regions except for the resource C among the entire resource A and transmitted. For example, when the symbol sequence A is configured by {symbol #1, symbol #2, symbol #3, symbol 4}, the resource A is configured by {resource #1, resource #2, resource #3, resource #4}, and the resource B is configured by {resource #3, resource #5}, the UE may receive the symbol sequence A under an assumption that the symbol sequence A is sequentially mapped to the remaining resources {resource #1, resource #2, resource #4} except for {resource #3} corresponding to the resource C among the resource A. As a result, the UE assumes that the symbol sequence {symbol #1, symbol #2, symbol #3} are mapped to {resource #1, resource #2, resource #4}, respectively, and transmitted, and may perform a subsequent series of reception operations.

Puncturing Operation

When there is resource C corresponding to a region, in which resource B overlaps the resource A for transmission of symbol sequence A to a UE, a base station may map the symbol sequence A to the entire resource A. However, the base station may not perform transmission in a resource region corresponding to the resource C, and may perform transmission to only the remaining resource regions except for the resource C among the entire resource A. For example, when symbol sequence A is configured by {symbol #1, symbol #2, symbol #3, symbol 4}, resource A is configured by {resource #1, resource #2, resource #3, resource #4}, and resource B is configured by {resource #3, resource #5}, the base station may map the symbol sequence A {symbol #1, symbol #2, symbol #3, symbol #4} to the resource A {resource #1, resource #2, resource #3, resource #4}, respectively. Further, the base station may transmit only the corresponding symbol sequence {symbol #1, symbol #2, symbol #4} to {resource #1, resource #2, resource #4}, which are the remaining resources except for {resource #3} corresponding to the resource C among the entire resource A, and may not transmit {symbol #3} mapped to {resource #3} corresponding to the resource C. As a result, the base station may map the symbol sequence {symbol #1, symbol #2, symbol #4} to {resource #1, resource #2, resource #4}, respectively, and transmit the same.

The UE may determine the resource A and the resource B through scheduling information for symbol sequence A from the base station, and accordingly, the UE may determine the resource C corresponding to a region where the resource A and the resource B overlap. The UE may receive the symbol sequence A under an assumption that the symbol sequence A is mapped to the entire resource A but transmitted in the remaining regions except for the resource C among the resource A. For example, when the symbol sequence A is configured by {symbol #1, symbol #2, symbol #3, symbol 4}, the resource A is configured by {resource #1, resource #2, resource #3, resource #4}, and the resource B is configured by {resource #3, resource #5}, the UE may assume that the symbol sequence A {symbol #1, symbol #2, symbol #3, symbol 4} are mapped to {resource #1, resource #2, resource #3, resource #4}, respectively, and that {symbol #3} mapped to {resource #3} corresponding to resource C is not transmitted, and the UE may receive the symbol sequence A under an assumption that the corresponding symbol sequence {symbol #1, symbol #2, symbol #4} are mapped to {resource #1, resource #2, resource #4}, which are the remaining resources except for {resource #3} corresponding to resource C among resource A, and transmitted. As a result, the UE assumes that the symbol sequence {symbol #1, symbol #2, symbol #4} are mapped to {resource #1, resource #2, resource #4}, respectively, and transmitted, and may perform a subsequent series of reception operations.

[Rate Matching Resource]

Figure 16:
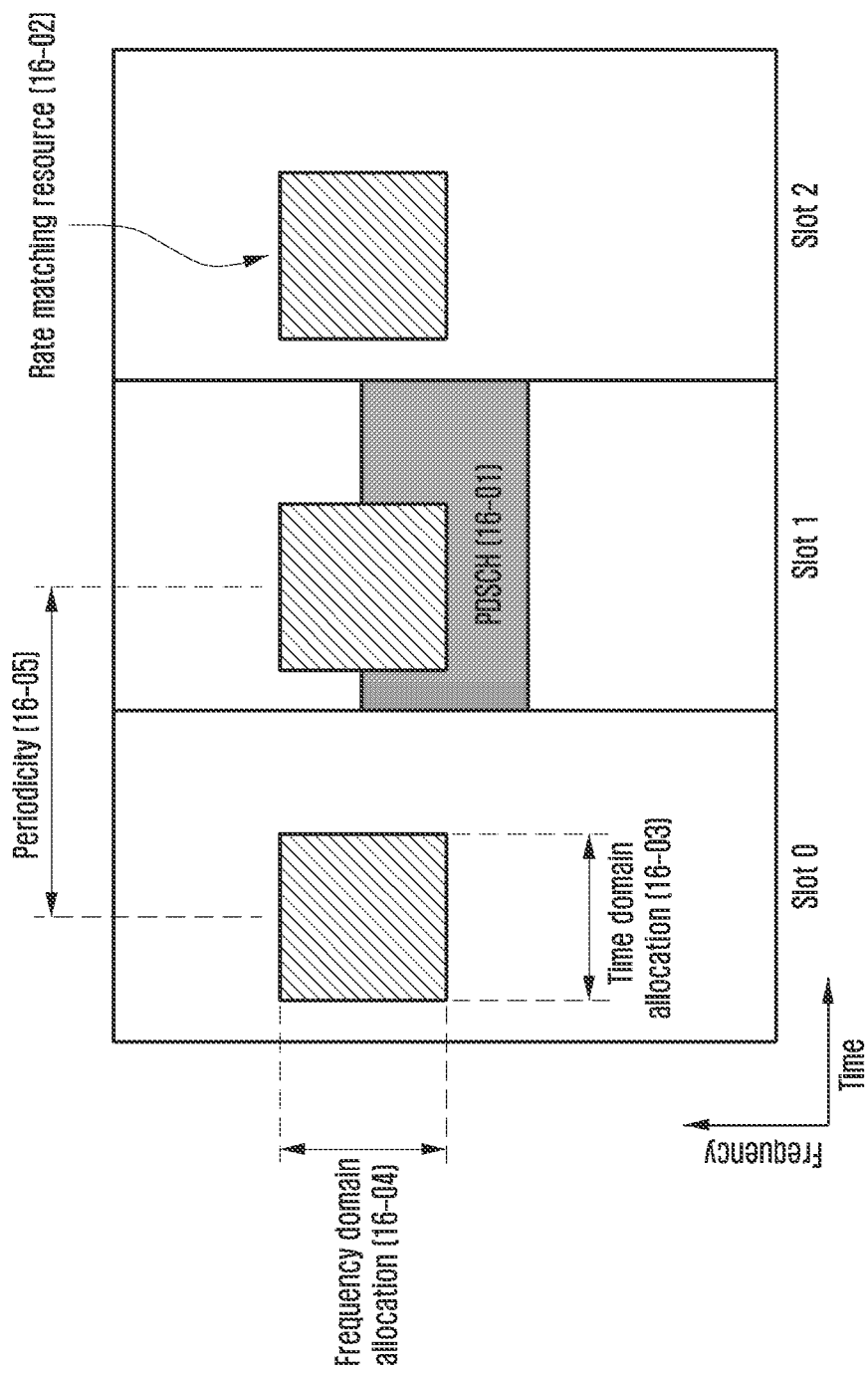
FIG. 16 illustrates a method in which a base station and a UE transmit or receive data by considering a downlink data channel and a rate matching resource.

FIG. 16 illustrates a method in which a base station and a UE perform data transmission or reception by considering a downlink data channel and a rate matching resource according to an embodiment of the disclosure.

FIG. 16 shows a downlink data channel (PDSCH) 16-01 and a rate matching resource 16-02. The base station may configure one or more rate matching resources 16-02 in the UE through higher layer signaling (e.g., RRC signaling). Configuration information of the rate matching resource 16-02 may include time-domain resource allocation information 16-03, frequency-domain resource allocation information 16-04, and period information 16-05. In the following description, a bitmap corresponding to the frequency-domain resource allocation information 16-04 is called a "first bitmap", a bitmap corresponding to the time-domain resource allocation information 16-03 is called a "second bitmap", and a bitmap corresponding to the period information 16-05 is called a "third bitmap". When some or all of the time and frequency resources of the scheduled data channel 16-01 overlap the configured rate matching resource 16-02, a base station may rate-match the data channel 16-01 in the rate matching resource part 16-02 and transmit the same. A UE may perform data reception and decoding after assuming that the data channel 16-01 has been rate-matched in the rate matching resource part 16-02.

The base station may dynamically notify the UE of whether the data channel will be rate-matched in the configured rate matching resource part through DCI through an additional configuration (corresponding to a "rate matching indicator" in the DCI format described above). Specifically, the base station may select some of the configured rate matching resources, may group the selected resources into a rate matching resource group, and may indicate whether the data channel has been rate-matched with each rate matching resource group through DCI using a bitmap method to the UE. For example, when four rate matching resources RMR #1, RMR #2, RMR #3 and RMR #4 have been configured, the base station may configure RMG #1={RMR #1, RMR #2} and RMG #2={RMR #3, RMR #4} as rate matching groups, and may indicate whether rate matching in each of RMG #1 and RMG #2 has been performed using 2 bits of a DCI field to the UE in the form of a bitmap. For example, the base station may indicate "1" if rate matching needs to be performed, and may indicate "0" if rate matching does not need to be performed.

The 5G system supports the granularity of "RE level" and "RB symbol level" as a method of configuring the above-described rate matching resource in the UE. More specifically, the following configuration method may be followed.

RB Symbol Level

The UE may receive up to four RateMatchPattern for each bandwidth part via higher layer signaling, and one RateMatchPattern may include the following contents.

A reserved resource in a bandwidth part may include a resource, in which a time and frequency resource region of the corresponding reserved resource is configured as a combination of an RB-level bitmap and a symbol-level bitmap on the frequency axis. The reserved resource may span over one or two slots. The UE may be additionally configured with a time-domain pattern (periodicityAndPattern) in which the time and frequency domain including a pair of RB level and symbol level bitmaps are repeated.

A time and frequency domain resource region configured as a control resource set in a bandwidth part and a resource region corresponding to a time-domain pattern configured as a search space configuration in which the resource region is repeated may be included.

RE Level

The UE may be configured with the following information through higher layer signaling.

Configuration information (lte-CRS-ToMatchAround) for RE corresponding to an LTE cell-specific reference signal (LTE CRS) or common reference signal (CRS) pattern may include the number of ports (nrofCRS-Ports) and LTE-CRS-vshift(s) value (v-shift) of LTE CRS, center subcarrier location information (carrier-FreqDL) of an LTE carrier from the reference frequency point (e.g., reference point A), the bandwidth size (carrierBandwidthDL) information of the LTE carrier, subframe configuration information (mbsfn-SubframConfigList) corresponding to a multicast-broadcast single-frequency network (MBSFN), and the like. The UE may determine the location of the CRS in the NR slot corresponding to the LTE subframe based on the above-described information.

Configuration information for a resource set corresponding to one or multiple zero power (ZP) CSI-RSs in the bandwidth part may be included.

Next, an uplink and downlink configuration for each symbol/slot considered in an embodiment of the disclosure will be described in detail.

Figure 17:
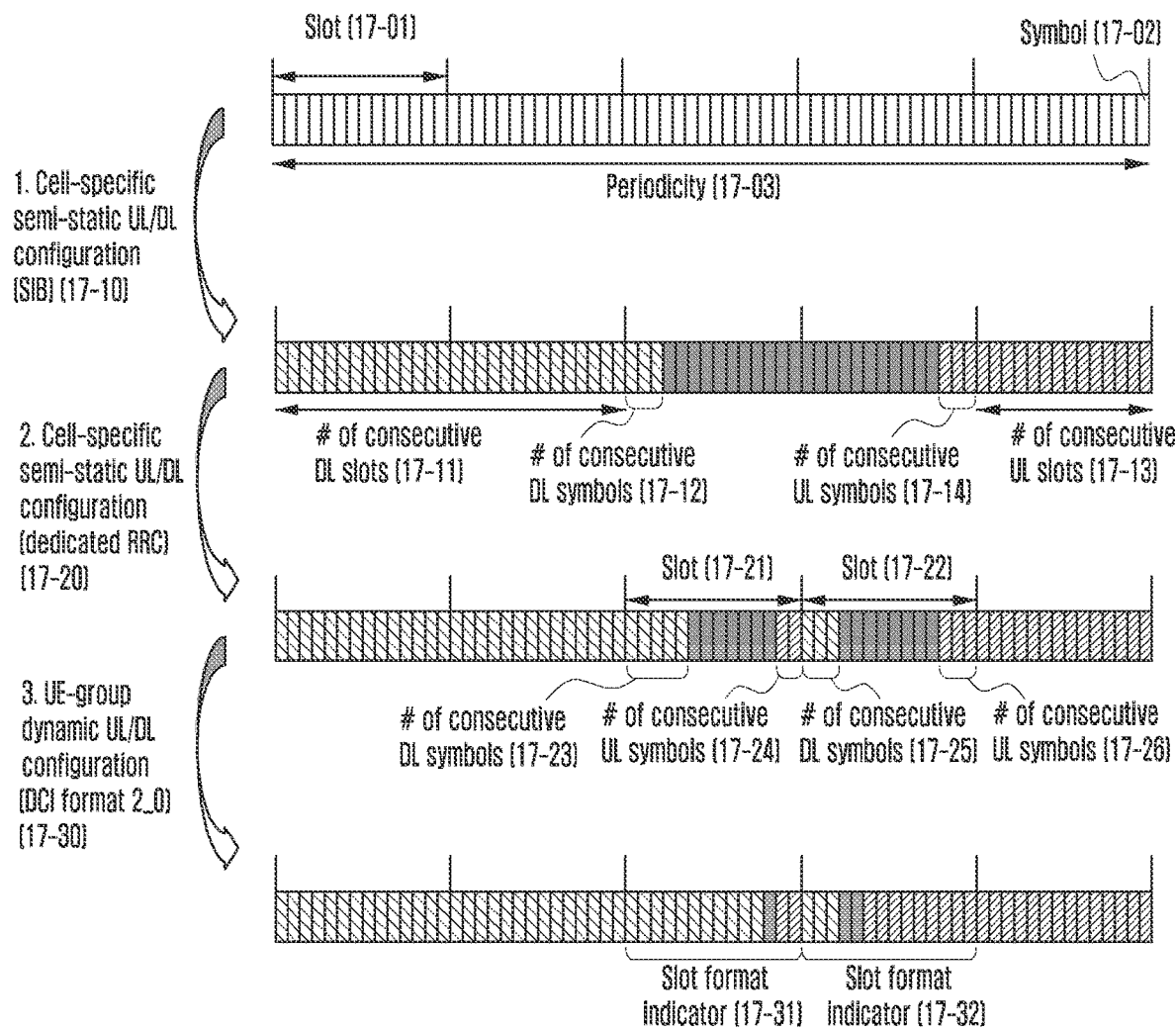
FIG. 17 illustrates an example of an uplink-downlink configuration considered in a 5G communication system.

FIG. 17 illustrates an uplink-downlink configuration considered in a 5G communication system as an example.

Uplink-downlink configuration of symbols/slots in the 5G communication system may be configured in three stages. First, the uplink-downlink of the symbol/slot may be configured semi-statically through cell-specific configuration information 17-10 through system information in a symbol unit. Specifically, the cell-specific uplink-downlink configuration information through the system information may include uplink-downlink pattern information and reference subcarrier information. The uplink-downlink pattern information may indicate a pattern periodicity 17-03, the number of consecutive downlink slots 17-11 from the start point of each pattern, the number of symbols 17-12 of the next slot, the number of consecutive uplink slots 17-13 from the end of the pattern, and the number of symbols 17-14 of the next slot. Here, the UE may determine the slots and symbols, which are not indicated for uplink and downlink, as flexible slots/symbols.

Second, through user-specific configuration information through dedicated higher layer signaling, slots 17-21 and 17-22 including a flexible slot or a flexible symbol may indicate the number of consecutive downlink symbols 17-23 and 17-25 from the start symbol of each slot and the number of consecutive uplink symbols 17-24 and 17-26 from the end of the slot, or may indicate the total downlink of a slot or the total uplink of a slot.

Finally, in order to dynamically change downlink signal transmission and uplink signal transmission intervals, slot format indicators (SFIs) 17-31 and 17-32 included in a downlink control channel may indicate whether each of symbols indicated by the flexible symbols in each slot (that is, symbols not indicated by downlink and uplink) is a downlink symbol, an uplink symbol, or a flexible symbol. The slot format indicator may select one index from a table in which the uplink-downlink configuration of 14 symbols in one slot is preconfigured as shown in Table 46 below.

TABLE 46

| Format | \multicolumn{14}{c}{Symbol number in a slot} |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |

TABLE 46-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | F | F | U | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | | | | | | | Reserved | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

Figure 18:
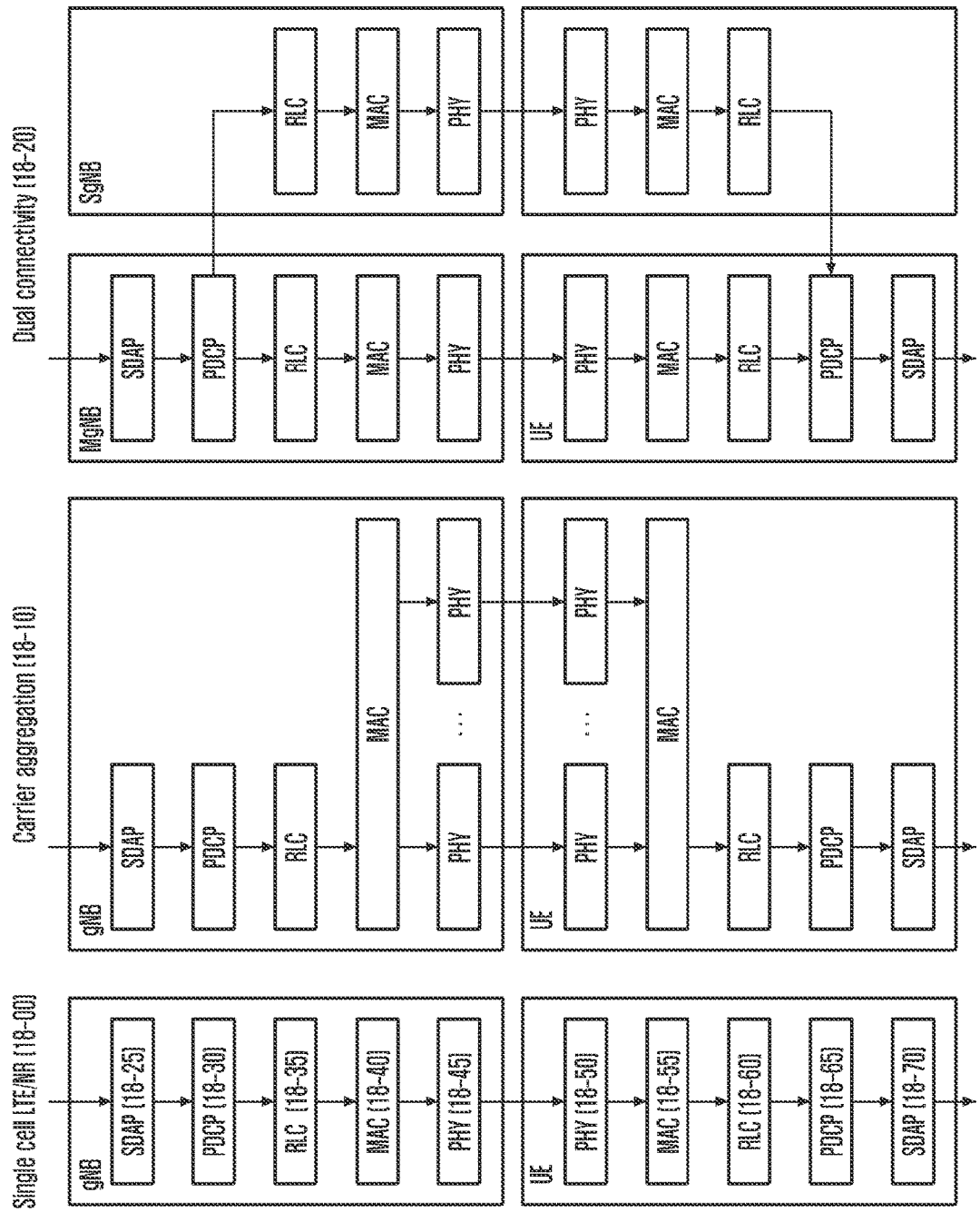
FIG. 18 illustrates the radio protocol structure of a base station and a UE when performing single cell, carrier aggregation, and dual connectivity according to an embodiment of the disclosure.

FIG. 18 illustrates a radio protocol structure of a base station and a UE when performing a single cell, carrier aggregation, and dual connectivity according to an embodiment of the disclosure.

Referring to FIG. 18, the radio protocol of a next generation mobile communication system includes NR service data adaptation protocols (NR SDAPs) 18-25 and 18-70, NR packet data convergence protocols (NR PDCPs) 18-30 and 18-65, and NR radio link controls (NR RLCs) 18-35 and 18-60, and NR medium access control (NR MACs) 18-40 and 18-55, in a UE and an NR base station, respectively.

The main functions of the NR SPAPs 18-25 and 18-70 may include some of the following functions.

Transfer of user plane data
Mapping between a QoS flow and a data bearer (DRB) for both DL and UL
Marking QoS flow ID in both DL and UL packets
Reflective QoS flow to DRB mapping for the UL SDAP PDUs.

With respect to the SDAP layer device, a UE may receive, through an RRC message, a configuration associated with whether to use a header of the SDAP layer device or whether to use a function of the SDAP layer device, according to each PDCP layer device, each bearer, and each logical channel. When the SDAP header is configured, a base station may instruct the UE to update or reconfigure mapping information between a data bearer and a QoS flow of uplink and downlink, using a one-bit NAS reflective QoS indicator (NAS reflective QoS) and a one-bit AS reflective QoS indicator (AS reflective QoS) of the SDAP header. The SDAP header may include QoS flow ID information indicating QoS. The QoS information may be used as a data processing priority for supporting smooth services, scheduling information, or the like.

The main functions of the NR PDCPs 18-30 and 18-65 may include some of the following functions.

Header compression and decompression: ROHC only
Transfer of user data
In-sequence delivery of higher layer PDUs
Out-of-sequence delivery of higher layer PDUs
PDCP PDU reordering for reception
Duplicate detection of lower layer SDUs
Retransmission of PDCP SDUs
Ciphering and deciphering
Timer-based SDU discard in uplink In the above, a reordering function of the NR PDCP device refers to a function of sequentially reordering PDCP PDUs, received from a lower layer, based on a PDCP sequence number (SN), and may include a function of transmitting data to a higher layer in the sequence of reordering. Alternatively, the reordering function of the NR PDCP device may include a function of transmitting data without considering the sequence, a function of reordering the sequence and recording missing PDCP PDUs, a function of providing a state report on the missing PDCP PDUs to a transmission side, and a function of requesting retransmission for the missing PDCP PDUs.

The main functions of the NR RLCs 18-35 and 18-60 may include some of the following functions.

Transfer of higher layer PDUs
In-sequence delivery of higher layer PDUs
Out-of-sequence delivery of higher layer PDUs
Error Correction through ARQ
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment In the above, the in-sequence delivery function of the NR RLC device refers to a function of transmitting RLC SDUs, received from a lower layer, to a higher layer in the sequence of reception. The in-sequence delivery function of the NR RLC device may include: if one RLC SDU is originally segmented into multiple RLC SDUs and received, a function of reassembling and transmitting the multiple RLC SDUs; a function of reordering the received RLC PDUs based on an RLC sequence number (SN) or PDCP SN; a function of reordering the sequence and recording missing RLC PDUs; a function of providing a state report on the missing RLC PDUs to a transmission side; and a function of requesting retransmission for the missing RLC PDUs. If the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if a predetermined timer expires although there is a missing RLC SDU. Alternatively, the in-sequence delivery function of the NR RLC device may include a function of sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and may be transmitted to a PDCP device out of sequence delivery. In a case of segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

In the above, the out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 18-40 and 18-55 may be connected to multiple NR RLC layer devices configured in one UE, and the main functions of the NR MAC may include some of the following functions.

Mapping between logical channels and transport channels
Multiplexing/de-multiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 18-45 and 18-50 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

Details of the radio protocol structures may be changed variously according to a carrier (or cell) operating method. For example, when the base station transmits data to the UE based on a single carrier (or cell), the base station and the UE use a protocol structure having each layer with a single structure as in reference numeral 18-00. When the base station transmits data to the UE based on carrier aggregation (CA) using multiple carriers at a single TRP, the base station and the UE use a protocol structure in which up to an RLC has a single structure but PHY layers are multiplexed through a MAC layer as in reference numeral 18-10. In another example, when the base station transmits data to the UE based on dual connectivity (DC) using multiple carriers at multiple TRPs, the base station and the UE use a protocol structure in which up to an RLC has a single structure but PHY layers are multiplexed through MAC layers as in reference numeral 18-20.

In LTE and NR, the UE may perform a procedure of reporting the UE-supported capability to the corresponding base station while being connected to a serving base station. In the description below, this is referred to as a UE capability report. The base station may transmit a UE capability enquiry message requesting a capability report to the UE which is in a connected state. The message may include a UE capability request for each radio access technology (RAT) type of the base station. The request for each RAT type may include frequency band information for requesting UE capability. Further, the UE capability enquiry message may make a request for multiple RAT types through one RRC message container, or the base station may transmit multiple UE capability enquiry messages including a request for each RAT type to the UE. That is, the UE capability enquiry may be repeated multiple times, and the UE may configure a UE capability information message corresponding to the repeated UE capability enquiry and make multiple reports of the UE capability information message. In the next generation telecommunication system, a UE capability request for MR-DC including NR, LTE, and EN-DC may be performed. Further, in general, the UE capability enquiry message is transmitted initially after the UE establishes a connection with the base station. However, the UE capability enquiry message may be requested under any condition if the base station needs.

In the above operation, the UE, which has received a request for a UE capability report from the base station, configures UE capability according to frequency band information and a RAT type, which are requested by the base station. A method for configuring a UE capability by a UE in the NR system may be summarized as follows.

1. If the UE receives lists of LTE and/or NR frequency bands according to a UE capability request from a base station, the UE configures a band combination (BC) of EN-DC and NR stand-alone (SA). That is, the UE configures a candidate BC list for EN-DC and NR SA, based on frequency bands requested, through FreqBandList, from the base station. Further, the bands are prioritized in the order described in the FreqBandList.

2. If the base station requests the UE capability report by setting the "eutra-nr-only" flag or the "eutra" flag, the UE removes matters relating to NR SA BCs among the configured BC candidate list. This operation may occur only if the LTE base station (eNB) requests "eutra" capability.

3. Thereafter, the UE removes fallback BCs from the candidate BC list configured in the above operation. Here, the fallback BCs refer to BCs obtainable by removing a band corresponding to at least one SCell band from a random super set BC, and may be omitted because the super set BC may already cover the fallback BC. This operation is further applied to multi-RAT dual connectivity (MR-DC), i.e., LTE bands. The BCs remaining after performing this operation are included in the final "candidate BC list".

4. The UE selects BCs to be reported by selecting BCs suitable for the requested RAT type from the final "candidate BC list". In this operation, the UE configures the supportedBandCombinationList in a predetermined order. That is, the UE configures BCs and a UE capability to be reported according to a predetermined order of RAT type (nr→eutra-nr→eutra). Further, the UE configures featureSetCombination for the configured supportedBandCombinationList and configures a list of "candidate feature set combinations" from a candidate BC list from which a list of fallback BCs (including the same or lower level capabilities) has been removed. The above "candidate feature set combinations" include all of feature set combinations for NR and EUTRA-NA BC, and may be obtained from feature set combinations of containers of UE-NR-Capabilities and UE-MRDC-Capabilities.

5. Further, if the requested RAT type is EUTRA-NR and makes some influence, featureSetCombinations is included in both containers of the UE-MRDC-Capabilities and UE-NR-Capabilities. However, the feature set of NR includes only UE-NR-Capabilities.

The UE capability is configured and then the UE transmits a UE capability information message including the UE capability to the base station. Thereafter, the base station performs suitable scheduling and transmission/reception management for the corresponding UE, based on the UE capability received from the UE.

Figure 19:
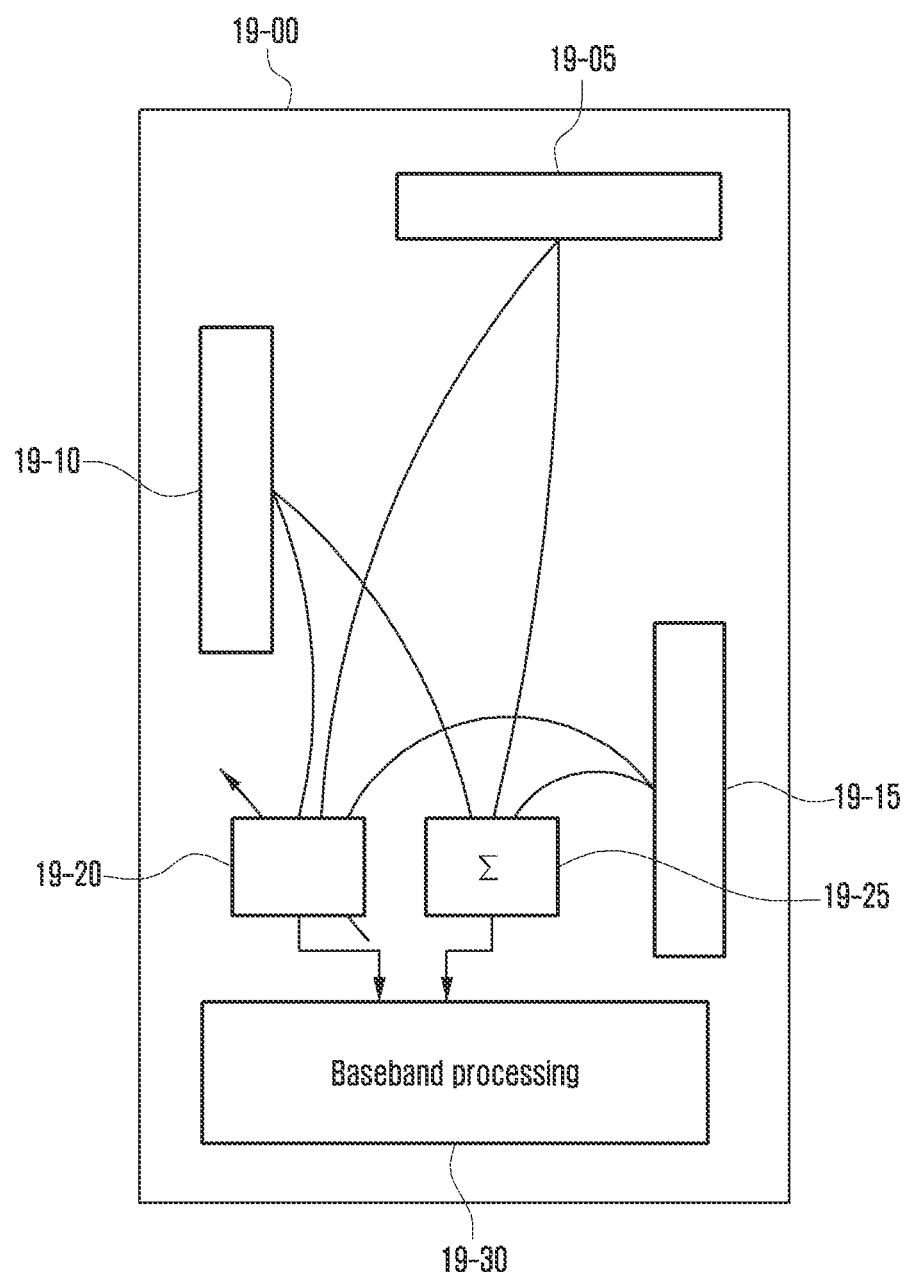
FIG. 19 illustrates a structure of a signal processing apparatus including an antenna port/antenna panel/baseband processor of a UE according to an embodiment of the disclosure.

FIG. 19 illustrates a structure of a signal processing apparatus including an antenna port/antenna panel/baseband processor of a UE according to an embodiment of the disclosure.

Referring to FIG. 19, a UE 19-00 may be configured with multiple antenna ports or panels 19-05, 19-10, and 19-15. In FIG. 19, the UE is shown as including three antenna ports or a panel structure. However, this is an example, and in actual application, all UEs use a larger or smaller number of antenna ports or panel structures without being limited thereto. The multiple antenna ports or panels may be connected to an antenna port/panel selector (antenna selection module) 19-20 according to various environments and conditions such as the manufacturing cost of UE, the target performance, the operating frequency band such as FR1 or FR2, or may be connected to a baseband processing module 19-30 through an antenna port/panel gain combiner (antenna combining module/MIMO module) 19-25 or the like. For convenience of explanation, in the following description, modules such as the antenna port/panel selector (antenna selection module) 19-20 and the antenna port/panel gain combiner (antenna combining module/MIMO module) 19-25 are collectively referred to as "antenna signal processor". The signal processor (baseband processing module) 19-30 may receive the RF signal or digital signal, having passed through the antenna signal processor, and may measure a reference signal according to the above-described procedure to perform a TCI/QCL procedure or measure a data symbol to perform data demodulation. Most existing terminals may selectively use the antenna port/panel selector (antenna selection module) 19-20 for the purpose of reducing power consumption or complexity/cost, or the antenna port/panel gain combiner (antenna combining module/MIMO module) 19-25 for the purpose of expanding wireless communication coverage or capacity.

On the other hand, in a case of future UEs, it is possible to simultaneously implement multiple antenna signal processors or to introduce a complex antenna signal processor capable of performing various functions in order to appropriately obtain the various gains according to antenna selection/combination/combination depending on the situation. This trend may accelerate since as the frequency operating band of wireless communication increases (for example, FR2 band of 6 GHz or more or FR4 band of 52.6 GHz or more), the module size of the antenna port/panel and the minimum required distance between each module are shortened in inversely proportional to the frequency (in proportional to wavelength), and thus the number of antenna ports/panels of one UE will gradually increase.

In a 5G or NR wireless communication system, handover of the UE does not occur frequently in an environment in which the mobility of the UE is small, and the time variation of the channel is relatively low. On the other hand, in an environment in which UE mobility is very high, such as high speed train (HST) and in-vehicle UEs on highways, large signaling overhead is accompanied due to frequent handovers, and the channel time variation of the UE also becomes large due to high Doppler shift and Doppler spread, to reduce the reception reliability thereby significantly.

Unlike scenarios and requirements applied to a cellular channel in an urban environment, the communication channel on the HST should consider unique characteristics such as a strong line of sight (LOS) component and high Doppler shift.

Compared to frequency communication on FR1, which is currently mainly considered, HST communication in mmWave frequency band may cause problems such as increased inter-carrier interference due to larger Doppler shift.

Figure 20:
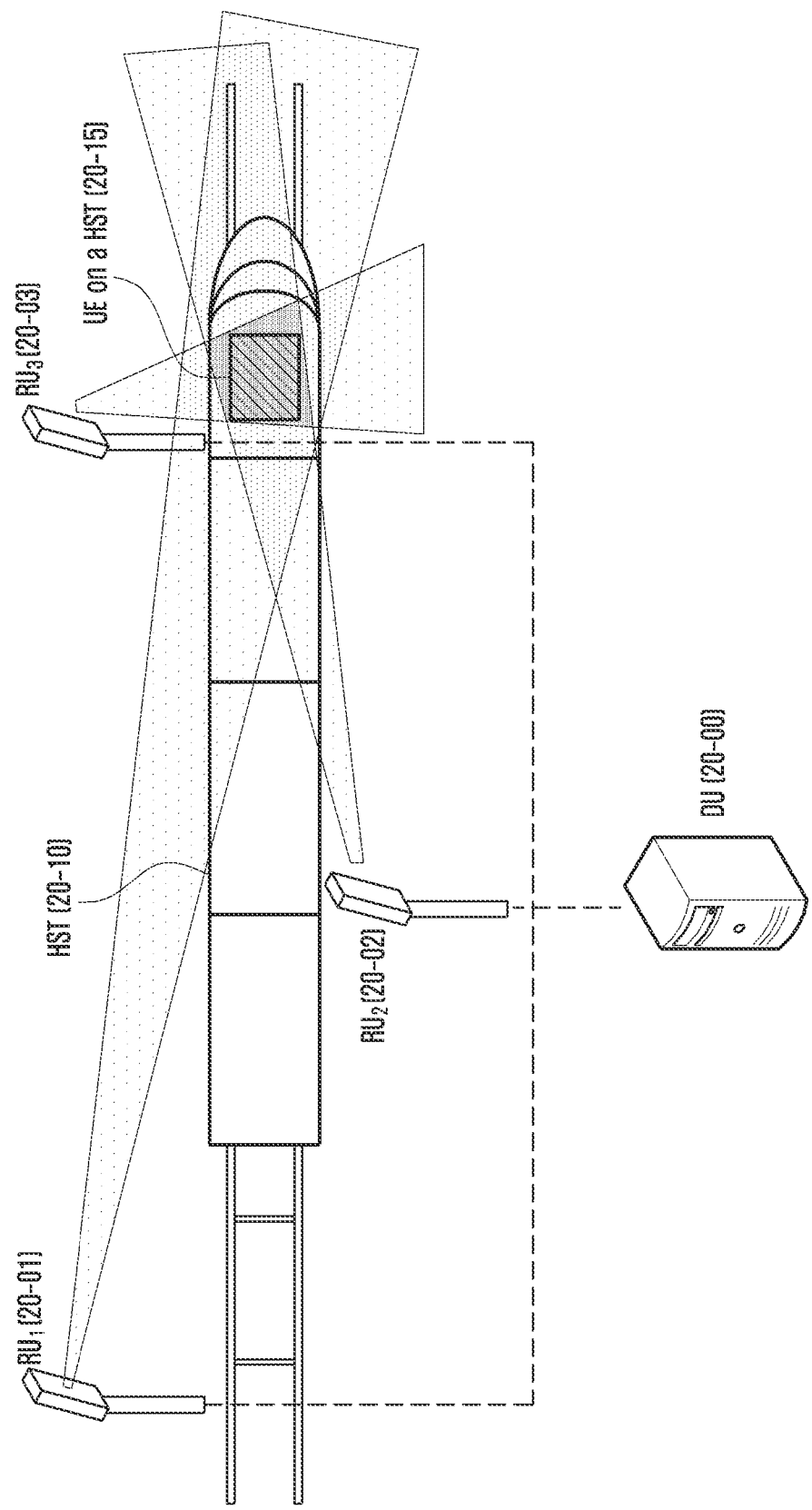
FIG. 20 illustrates a scenario in which mmWave communication is applied in a 5G or NR wireless communication system on a high speed train (HST)

FIG. 20 illustrates a scenario in which mmWave communication, communicating using a FR2 band or a higher frequency band of a 5G or NR wireless communication system on a high speed train (HST), is applied.

Referring to FIG. 20, an HST communication scenario may be configured by multiple transceivers (RU1 to RU3) 20-01 to 20-03 and a user equipment 20-15 on an HST 20-10 along a railroad track. A radio unit (RU) may be connected to one or more digital units (DUs) 20-00 capable of coordinating signal transmission in the RU and a handover procedure of the UE. In the disclosure, a DU may be expressed as a controller of a base station, and an RU may be expressed as a transmission reception point (TRP). The base station may be understood as a communication object including one DU and at least one RU, or each DU and RU may be understood as base stations.

The disclosure considers a single frequency network (SFN) transmission, in which multiple base stations/cells/RUs/TRPs transmit the same downlink signal to a UE by using the same time and frequency resource, in order to prevent frequent handovers that may occur due to high-speed movement such as HST and improve communication link quality of the UE.

Meanwhile, in an HST-SFN channel for communication with a UE using multiple RUs, multiple high Doppler shifts may occur due to the high speed of the HST. When N RUs perform transmission in the SFN transmission scheme, the Doppler shift $f_{D,n}$ experienced by a channel between the nth RU and the UE may be expressed as in Equation 3 below.

$$f_{D,n}(t) = \frac{f_c v_n(t)}{c}, n = 1, \ldots, N \qquad \text{Equation 3}$$

In Equation 3, f c is the carrier frequency, v_n(t) is the relative speed of the UE with respect to the nth RU, and c is the speed of light.

Here, since each RU may have a different relative speed v_n(t) with respect to the UE, even if signals transmitted from multiple RUs are transmitted according to the SFN transmission method, the UE may receive the signals at different frequencies by the Doppler shift.

That is, when relative speeds between a UE and each TRP performing transmission using the SFN method are different from each other, the received signal of the UE has multiple Doppler shift components corresponding to each relative speed. Here, the received signal may denote DM-RS, CSI-RS, TRS, and the like of PDSCH/PDCCH as well as PDSCH and PDCCH.

As can be seen in Equation 3, since the Doppler shift is proportional to a carrier frequency, in a case of communication using the mmWave frequency (e.g., about 28 GHz), the Doppler shift more than 10 times higher than the FR1 frequency (e.g., about 2 GHz) may occur. Therefore, HST-SFN communication in the mmWave channel performing communication in the FR2 region may be very limited.

On the other hand, in order to prevent communication quality degradation caused by such Doppler shift, the UE may perform Doppler shift mitigation by itself. In order to perform the Doppler shift mitigation, the UE detecting each Doppler shift component from the received signal and decoding data requires high reception complexity of the UE. In particular, in an environment where TRPs are arranged in a line 20-01 to 20-03 in the front and rear of the UE, such as a high-speed rail, and thus the relative speed difference between each TRP and the UE is large, a higher UE complexity occurs.

In the disclosure, TRPs participating in SFN transmission transmit a signal after pre-compensating the Doppler shift, thereby causing a UE to experience only a single Doppler shift so as to reduce the UE reception complexity.

<Example: Doppler Shift Pre-Compensation Method of SFN Transmission TRP and Post-Compensation Method of a UE>

This embodiment provides a method in which TRPs participating in SFN transmission pre-compensate the Doppler shift experienced by a UE and the UE processes post-compensation therefor. The procedure for performing the corresponding pre-compensation and post-compensation may be configured by higher layer signaling, dynamically indicated by L1 signaling (e.g., DCI or MAC-CE), or configured and indicated by a combination of higher layer signaling and L1 signaling. In the disclosure, pre-compensation may refer to changing a frequency before transmitting a specific signal in consideration of the Doppler effect, and post-compensation may refer to additionally applying compensation to a signal to which pre-compensation is applied. Compensating the frequency in the disclosure refers to subtracting or increasing the frequency of a signal to be transmitted or received in consideration of the Doppler effect.

Figure 21:
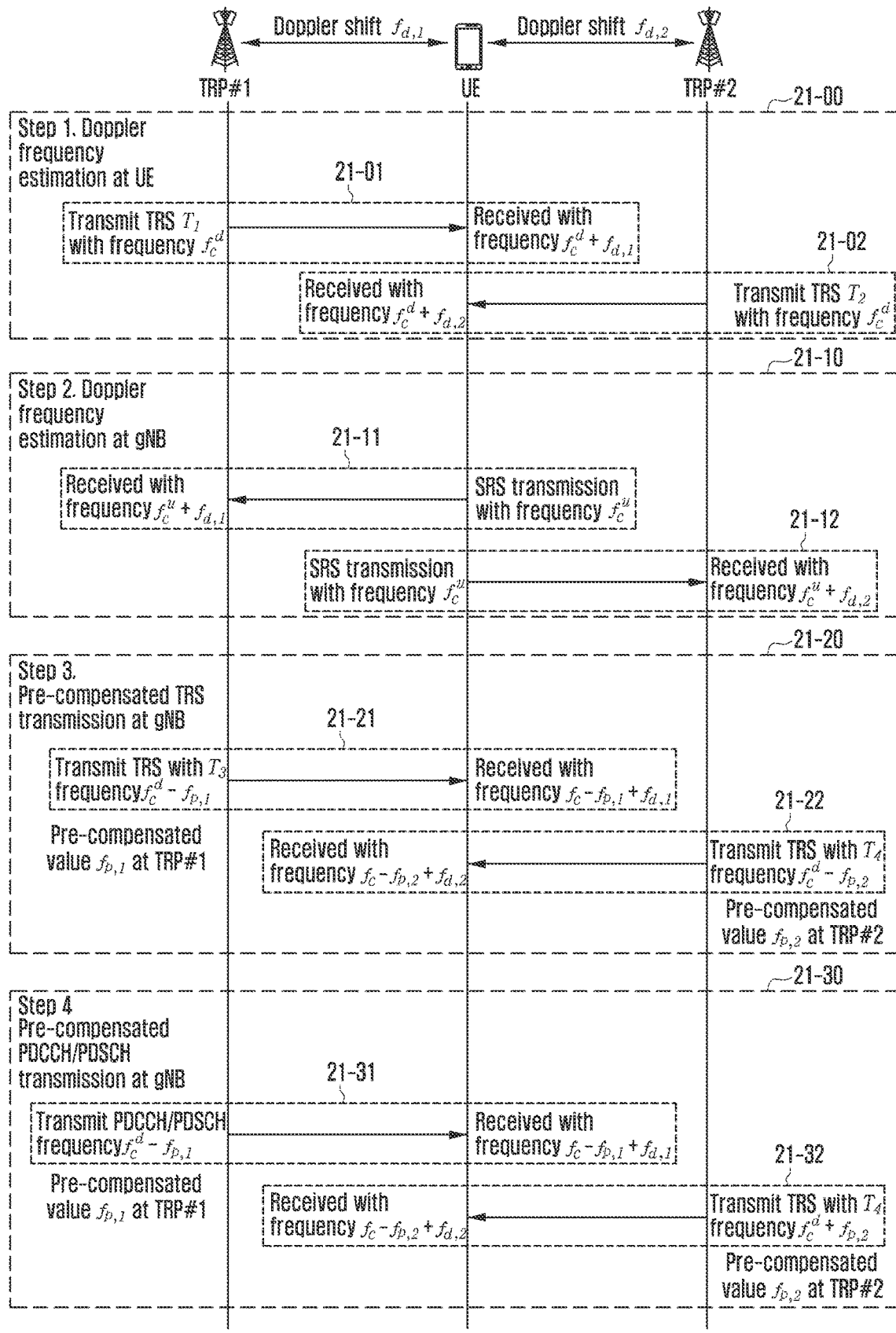
FIG. 21 illustrates a method of pre-compensating a Doppler shift experienced by a UE in a transmission/reception point (TRP)

FIG. 21 illustrates a method of pre-compensating for Doppler shift experienced by a UE in TRP. For convenience of explanation, in this drawing, TRPs participating in SFN transmission are assumed to be a total of two, TRP #1 and TRP #2, but this is only an example, and this embodiment may be applied to a case in which the number of TRPs is three or more.

The Doppler shift pre-compensation may be largely configured by four stages. In the first stage 21-00, a UE may measure the Doppler shift of a channel between the TRP and the UE. More specifically, in the first stage, TRPs participating in SFN transmission may transmit TRS at a carrier frequency $f_c^d$ for Doppler shift measurement of the UE (indicated by reference numerals 21-01 and 21-02).

In a QCL framework currently applied in 5G NR, since only one TRS is allowed as a reference for measuring the Doppler effect for the channel of each port, SFN transmission has to be applied to the TRS resource. However, in this case, since the UE needs to measure multiple Doppler shifts from the RS transmitted using SFN, the complexity of the UE may increase. Therefore, in the disclosure, each TRP may transmit each TRS as needed without such limitations. That is, TRS transmitted from TRP #1, which is $T_1$, and TRS transmitted from TRP #2, which is $T_2$, may be resources independent of each other (i.e., SFN transmission is not applied thereto) ($T_1 \neq T_2$) or the TRSs may be the same resource as each other ($T_1 = T_2$) transmitted simultaneously (SFN transmission). In the former case ($T_1 \neq T_2$), the UE may receive different TRSs from each TRP, and measure the Doppler shift of the channel between the TRP and the UE from each TRS, and in the drawing, the UE may measure $f_{d,1}$, which is Doppler shift between TRP #1 and the UE from $T_1$ and $f_{d,2}$, which is Doppler shift between TRP #2 and the UE from $T_2$. Here, since each TRP uses a different TRS, when a TCI state related to the TRS is configured in the TRP, the UE may receive the TRS by applying the related QCL relationship. In the latter case ($T_1 = T_2$), the UE may receive the SFNed TRS from the two TRPs, and the TRS undergoes Doppler shift from multiple TRPs, for example, $f_{d,1}$ and $f_{d,2}$ together, and thus the UE measures both $f_{d,1}$ and $f_{d,2}$ from the TRS.

On the other hand, in the above first stage 21-00, the UE may, before receiving the TRS from the base station, receive information on each TRS ($T_1$, $T_2$) and/or configuration information for measuring Doppler shift through higher layer signaling, L1 signaling, or a combination thereof.

In the second stage, the base station measures the Doppler shift of a channel between the TRP and the UE (indicated by reference numeral 21-10). More specifically, in the second stage, the UE transmits uplink resources, for example SRS, to TRP #1 and TRP #2 for Doppler shift measurement of the base station (indicated by reference numerals 21-11 and 21-12). The UE may transmit different SRS resources to each TRP, or may transmit the same SRS to all TRPs. A carrier frequency used by the UE during transmission of the uplink resource may be expressed as feu. TRP #1 and TRP #2 receive the SRS, and when each TRP knows the uplink carrier frequency of the UE, the Doppler shifts $f_{d,1}$ and $f_{d,2}$ between each TRP-UE channel can be known from the SRS, respectively. If each TRP does not know the uplink carrier frequency of the UE, after measuring the received carrier frequency for each TRP from the SRS, the base station may know the difference value $f_{d,1} - f_{d,2}$ of the Doppler shift from the difference between the received carrier frequencies for each TRP. As another method, instead of the process (indicated by reference numeral 21-10), the UE may feedback the Doppler shift measured in the first stage to the base station through PUCCH or PUSCH. Here, the Doppler shift may be quantized in the form of UCI and included in PUCCH or PUSCH, and the PUCCH and PUSCH may follow the operation on time resources of periodic, semi-static, and aperiodic channel state reporting.

Meanwhile, in the second stage 21-10, the UE may, before transmitting SRS or feedback information to the base station, receive resource information for SRS transmission for measuring Doppler shift or feedback transmission for measured Doppler shift and/or configuration information related thereto through higher layer signaling, L1 signaling, or a combination thereof. In the third stage, a signal for which the Doppler shift is pre-compensated for is transmitted in each TRP (indicated by reference numeral 21-20). Here, the 'Doppler shift pre-compensation' denotes that a specific frequency value is first subtracted from the carrier frequency $f_c^d$ of the TRP transmission signal by considering the Doppler shift experienced by the UE. Here, the frequency subtraction process is a process for compensating for the frequency, and denotes that signal reception by a receiving terminal can be processed at a frequency desired by the transmitting terminal by considering that the frequency at the receiving terminal is changed compared to the frequency during original transmission due to the Doppler effect. Therefore, the frequency subtraction process may be used interchangeably with a concept including not only reducing the frequency to be transmitted but also increasing the same. The frequency value subtracted from TRP #1 is called $f_{p,1}$, and the frequency value subtracted from TRP #2 is called $f_{p,2}$. The $f_{p,1}$ and $f_{p,2}$ values may be determined based on the Doppler shift value estimated by the base station in the second stage. For example, when the base station knows both the Doppler shifts $f_{d,1}$ and $f_{d,2}$, $f_{p,1}=f_{d,1}$ and $f_{p,2}=f_{d,2}$ may be determined. As another example, when the base station knows the difference value $f_{d,1}-f_{d,2}$ of the Doppler shift, $f_{p,1}=0$ and $f_{p,2}=f_{d,1}-f_{d,2}$ or $f_{p,2}=f_{d,2}-f_{d,1}$ may be determined. Meanwhile, in the disclosure, the TRP #1 and the TRP #2 correspond to the RU of FIG. 20 and may be a communication object belonging to one base station. Therefore, the information received by TRP #1 and the information received by TRP #2 may be exchanged with each other, and the base station may know the information received by TRP #1 and the information received by TRP #2, and based on this, may determine a signal transmitted in the TRP.

In the above procedure, the formula applied for the subtraction processing in the Doppler shift pre-compensation procedure is simplified and expressed. However, the above formula is only an exemplary measure to easily explain the concept of the subtraction processing, and the actually applied pre-compensation may be applied based on the above formula or a method different from the above formula in consideration of a frequency used for transmission or a processing method applied during signal generation of a base station. That is, the pre-compensation procedure or subtraction processing of the disclosure refers to a transmission frequency processing procedure in which any modification applied to a signal before transmission including such that, in consideration of the Doppler shift with respect to SFN signals transmitted in different TRPs, signals received by the receiving terminal have the same frequency.

In case that the pre-compensated TRSs transmitted by TRP #1 and TRP #2 are named $T_3$ and $T_4$, respectively, $T_3$ and $T_4$ may be resources independent of each other ($T_3 \neq T_4$) or the TRSs may be the same resource ($T_3=T_4$) transmitted simultaneously (SFN transmission). Alternatively, the TRS of the first stage and the TRS of the third stage may be TRSs having different IDs. Alternatively, the TRSs may be expressed by the same ID and transmitted at different times. For example, $T_1$ and $T_3$ may be TRS resources transmitted at different times while having the same CSI-RS-Resource-Set ID, and the relationship between $T_2$ and $T_4$ may be the same as that between $T_1$ and $T_3$. As described above, when the TCI state, which is connected between TRSs, that is, QCL info is configured, the UE may receive each TRS by considering the configuration. In the third stage, pre-compensated TRSs are received and Doppler shift values after pre-compensation may be measured. On the other hand, when $T_3$ and $T_4$ are independent resources, the UE measures a Doppler shift for TRP #1 from $T_3$, for example $f_{p,1}-f_{d,1}$, and a Doppler shift for TRP #2 from $T_4$, for example $f_{p,2}-f_{d,2}$. When the $T_3$ and $T_4$ are the same resource, the UE measures both the Doppler shift components of the two TRPs, that is, $f_{p,1}-f_{d,1}$ and $f_{p,2}-f_{d,2}$ from the corresponding TRS.

The received signal and measurement value as described in the above may be utilized in a post-compensation procedure through channel equalization. In Equation 3 above, since the Doppler shift is given as a function of time, the Doppler shift information measured by the UE in the first stage 21-00 and the Doppler shift information measured by the base station in the second stage 21-10 may be different. That is, although pre-compensation of the base station is applied due to time variation of the channel, the signal received from the UE may not have the full effect of SFN transmission. Therefore, the UE may estimate the channel change over time through the channel equalization procedure and perform post-compensation processing on the received signal by using the estimated channel change, so as to further improve the reception performance. To this end, the UE may measure a change in the reception channel based on the signal received in the first stage and the signal received in the third stage, and accordingly may perform channel equalization. Here, as an example for performing channel equalization, a minimum mean square error (MMSE) technique may be applied. The UE may estimate, with regard to a signal received thereafter, a residual Doppler frequency according to time change through the above channel equalization, and perform compensation for the signal.

Meanwhile, in the above third stage 21-20, the UE may, before receiving TRS from the base station, receive information on each TRS ($T_3$ and $T_4$) and/or configuration information for measuring Doppler shift from each TRS and estimating residual Doppler shift through higher layer signaling, L1 signaling, or a combination thereof. In the fourth stage, PDCCH or PDSCH for which the Doppler shift is pre-compensated for is transmitted in each TRP (indicated by reference numeral 21-30).

Meanwhile, the base station may determine whether to pre-compensate for the Doppler shift according to circumstances. For example, when the speed of the UE is dynamically changed, the base station may pre-compensate for the Doppler shift when the UE is at a high speed, whereas the Doppler shift is not pre-compensated for when the UE is at a low speed. Here, since the reception operation of the UE may be different depending on whether or not the Doppler shift is pre-compensated, the base station may notify the UE of whether or not the Doppler shift is pre-compensated during transmission of the PDCCH or the PDSCH. In addition, the value for which the Doppler shift is pre-compensated for each TRP may be the value described in the second stage 21-10. Meanwhile, the PDCCH or PDSCH transmission may be SFN transmission. That is, the same PDCCH or PDSCH may be transmitted through the same time/frequency transmission resource using a different TCI state for each TRP.

On the other hand, the UE may apply the post-compensation determined based on the change in the Doppler shift value measured in the first stage 21-00 and the third stage 21-20 described above, so as to increase the reception power of the SFN transmitted control signal or data signal or increase the data transmission amount. Here, in order to enhance the pre-compensated PDCCH or PDSCH reception performance, the pre-compensated PDCCH or PDSCH transmission (indicated by reference numeral 21-30) may be performed together in the third stage 21-20. That is, in order to reduce an error caused by a channel change according to time, the transmission time 21-30 of the PDCCH or PDSCH to be transmitted to the UE and the transmission time 21-20 of the TRS required for post-compensation application may be simultaneous or may have a very short interval (within the same slot).

Figure 22:
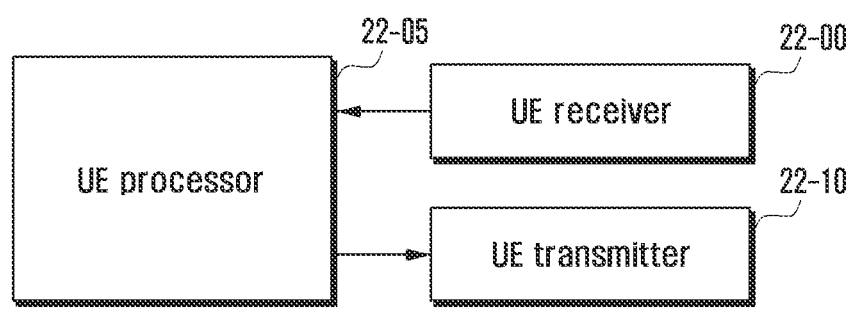
FIG. 22 is a block diagram of a UE according to an embodiment of the disclosure.

Meanwhile, in the fourth stage 21-30, the UE may, before receiving the PDCCH or PDSCH from the base station, receive information for reception—that is, reception resource information of the PDCCH or PDSCH, TCI state information for each TRP, and/or information related to the application of post-compensation for the received PDCCH or PDSCH—through higher layer signaling, L1 signaling, or a combination thereof. FIG. 22 is a block diagram of a UE according to an embodiment of the disclosure.

Referring to FIG. 22, the UE may include a transceiver referring to a UE receiver 22-00 and a UE transmitter 22-10, a memory (not shown), and a UE processor 22-05 (or a UE controller or processor). According to the communication method of the UE described above, the UE transceiver 22-00 or 22-10, the memory, and the UE processor 22-05 may operate. However, the elements of the UE are not limited to the above-described example. For example, the UE may include more or fewer elements than the aforementioned elements. In addition, the transceiver, the memory, and the processor may be implemented in the form of a single chip.

The transceiver may transmit/receive a signal to/from a base station. Here, the signal may include control information and data. To this end, the transceiver may include an RF transmitter for up-converting and amplifying a frequency of a transmitted signal, and an RF receiver for low-noise amplifying a received signal and down-converting a frequency of the received signal. However, this is only an embodiment of the transceiver, and elements of the transceiver are not limited to the RF transmitter and the RF receiver.

In addition, the transceiver may receive a signal through a wireless channel and output the received signal to the processor, and may transmit a signal output from the processor through the wireless channel.

The memory may store programs and data required for the operation of the UE. In addition, the memory may store control information or data included in a signal transmitted and received by the UE. The memory may include a storage medium such as a ROM, a RAM, a hard disk, a CD-ROM, and a DVD, or a combination of storage media. In addition, multiple memories may exist.

In addition, the processor may control a series of processes so that the UE may operate according to the above-described embodiment. For example, the processor may control elements of the UE so as to receive DCI configured by two layers and simultaneously receive multiple PDSCHs. Multiple processors may exist, and the processor may perform an operation of controlling the elements of the UE by executing programs stored in the memory.

Figure 23:
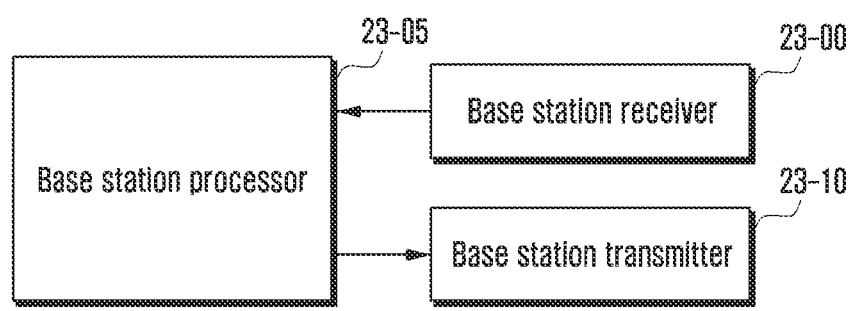
FIG. 23 is a block diagram of a base station according to an embodiment of the disclosure.

FIG. 23 illustrates a block diagram of a base station according to an embodiment of the disclosure.

Referring to FIG. 23, the base station may include a transceiver referring to a base station receiver 23-00 and a base station transmitter 23-10, a memory (not shown), and a base station processor 23-05 (or a base station controller or processor). According to the communication method of the base station described above, the base station transceiver 23-00 or 23-10, the memory, and the base station processor 23-05 may operate. However, the elements of the base station are not limited to the above-described example. For example, the base station may include more or fewer elements than the aforementioned elements. In addition, the transceiver, the memory, and the processor may be implemented in the form of a single chip.

The transceiver may transmit/receive a signal to/from a UE. Here, the signal may include control information and data. To this end, the transceiver may include an RF transmitter for up-converting and amplifying a frequency of a transmitted signal, and an RF receiver for low-noise amplifying a received signal and down-converting a frequency of the received signal. However, this is only an embodiment of the transceiver, and elements of the transceiver are not limited to the RF transmitter and the RF receiver.

In addition, the transceiver may receive a signal through a wireless channel and output the signal to the processor, and may transmit the signal output from the processor through the wireless channel.

The memory may store programs and data necessary for the operation of the base station. In addition, the memory may store control information or data included in a signal transmitted and received by the base station. The memory may include a storage medium such as a ROM, a RAM, a hard disk, a CD-ROM, and a DVD, or a combination of storage media. In addition, multiple memories may exist.

The processor may control a series of processes so that the base station may operate according to the above-described embodiment. For example, the processor may control elements of the base station so as to configure DCI of two layers including allocation information regarding multiple PDSCHs and transmit the configured DCI. Multiple processors may exist, and the processor may perform an operation of controlling the elements of the base station by executing programs stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Further, although the above embodiments have been described by way of the FDD LTE system, other variants based on the technical idea of the embodiments may be implemented in other systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in the methods of the disclosure, some or all of the contents of each embodiment may be combined without departing from the essential spirit and scope of the disclosure.

Various embodiments of the disclosure have been described above. The above description of the disclosure is for the purpose of illustration, and is not intended to limit embodiments of the disclosure to the embodiments set forth herein. Those skilled in the art will appreciate that they may be easily modified into other specific forms without changing the technical idea or essential features of the disclosure. The scope of the disclosure should be determined not by the above detailed description but by the appended claims, and all changes or modifications derived from the meaning and scope of the claims and equivalent concepts thereof shall be construed as falling within the scope of the disclosure.

The invention claimed is:

1. A method performed by a base station in a wireless communication system, the method comprising:
transmitting, to a user equipment (UE), multiple first tracking reference signals (TRSs) through multiple transmission and reception points (TRPs);
receiving, from the UE, multiple sounding reference signals (SRSs) through the multiple TRPs;
measuring a second frequency shift for each of the multiple SRSs corresponding to each of the multiple TRPs;
based on the second frequency shift for each of the multiple SRSs, determining a carrier frequency for each of multiple second TRSs; and
transmitting, to the UE, the multiple second TRSs on the determined carrier frequency through the multiple TRPs; and
transmitting, to the UE, multiple downlink signals based on the second frequency shift,
wherein the multiple downlink signals are received by the UE on a single frequency and the single frequency is associated with a channel equalization at the UE based on a first frequency shift and a third frequency shift for each of the multiple second TRSs.

2. The method of claim 1, wherein the multiple first TRSs transmitted through the multiple TRPs are transmitted using different resources.

3. The method of claim 1, further comprising:
receiving, from the UE, information on a first frequency shift for each of the multiple first TRSs.

4. A method performed by a user equipment (UE) in a wireless communication system, the method comprising:
receiving, from a base station, multiple first tracking reference signals (TRSs) from multiple transmission and reception points (TRPs);
measuring a first frequency shift for each of the multiple first TRSs;
transmitting, to the base station, multiple sounding reference signals (SRSs) the multiple TRPs;
receiving, from the base station, multiple second TRSs from the multiple TRPs;
measuring a third frequency shift for each of the multiple second TRSs;
performing a channel equalization based on the first frequency shift and the third frequency shift; and
receiving, from the base station, multiple downlink signals on a single frequency based on the channel equalization.

5. The method of claim 4, wherein the multiple first TRSs received from the multiple TRPs are received using different resources.

6. The method of claim 4, further comprising:
transmitting, to the base station, information on the measured first frequency shift.

7. A base station in a wireless communication system, the base station comprising:
a transceiver; and
a controller coupled with the transceiver;
and configured to:
transmit, to a user equipment (UE), multiple first tracking reference signals (TRSs) through multiple transmission and reception points (TRPs),
receive, from the UE, multiple sounding reference signals (SRSs) through the multiple TRPs,
measure a second frequency shift for each of the multiple SRSs corresponding to each of the multiple TRPs,
based on the second frequency shift for each of the multiple SRSs, determine a carrier frequency for each of multiple second TRSs,
transmit, to the UE, the multiple second TRSs on the determined carrier frequency through the multiple TRPs, and
transmit, to the UE, multiple downlink signals based on the second frequency shift, wherein the multiple downlink signals are received by the UE on a single frequency and the single frequency is associated with a channel equalization at the UE based on a first frequency shift and a third frequency shift for each of the multiple second TRSs.

8. The base station of claim 7, wherein the multiple first TRSs transmitted through the multiple TRPs are transmitted using different resources.

9. The base station of claim 7, wherein the controller is further configured to:
receive, from the UE, information on a first frequency shift for each of the multiple first TRSs.

10. A user equipment (UE) in a wireless communication system, the UE comprising:
a transceiver; and
a controller coupled with the transceiver, and configured to:
   receive, from a base station, multiple first tracking reference signals (TRSs) from multiple transmission and reception points (TRPs),
   measure a first frequency shift for each of the multiple first TRSs,
   transmit, to the base station, multiple sounding reference signals (SRSs) to the multiple TRPs,
   receive, from the base station, multiple second TRSs from the multiple TRPs,
   measure a third frequency shift for each of the multiple second TRSs,
   perform a channel equalization based on the first frequency shift and the third frequency shift, and
   receive, from the base station, multiple downlink signals on a single frequency based on the channel equalization.

11. The UE of claim 10, wherein the multiple first TRSs received from the multiple TRPs are received using different resources.

12. The UE of claim 10, wherein the controller is further configured to;
   transmit, to the base station, information on the measured first frequency shift.

* * * * *